(12) United States Patent
Taguchi et al.

(10) Patent No.: US 8,168,694 B2
(45) Date of Patent: May 1, 2012

(54) INK COMPOSITION, INK SET, INK FOR INKJET RECORDING, INK SET FOR INKJET RECORDING, AND INK CARTRIDGE FOR INKJET RECORDING

(75) Inventors: Toshiki Taguchi, Shizuoka (JP); Sachiko Arai, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 932 days.

(21) Appl. No.: 11/169,572

(22) Filed: Jun. 30, 2005

(65) Prior Publication Data
US 2006/0004125 A1 Jan. 5, 2006

(30) Foreign Application Priority Data
Jun. 30, 2004 (JP) .................. P.2004-194012

(51) Int. Cl.
| | |
|---|---|
| A61K 9/16 | (2006.01) |
| B32B 7/12 | (2006.01) |
| B41J 2/01 | (2006.01) |
| B41J 2/17 | (2006.01) |
| B41J 2/19 | (2006.01) |
| B41J 2/175 | (2006.01) |
| C07D 209/76 | (2006.01) |
| C07D 243/08 | (2006.01) |
| C08F 8/30 | (2006.01) |
| C08G 18/80 | (2006.01) |
| C08J 3/00 | (2006.01) |
| C08K 5/00 | (2006.01) |
| C08K 5/16 | (2006.01) |
| C08K 5/23 | (2006.01) |
| C08K 5/34 | (2006.01) |
| C08K 5/48 | (2006.01) |
| C08L 39/00 | (2006.01) |
| C09B 67/00 | (2006.01) |
| C09D 5/00 | (2006.01) |
| C09D 11/00 | (2006.01) |
| G01D 11/00 | (2006.01) |

(52) U.S. Cl. ............ 523/160; 347/1; 347/84; 347/86; 347/92; 347/95; 347/100; 523/161; 524/86; 524/87; 524/88; 524/89; 524/90; 524/91; 524/92; 524/186; 524/190; 524/543; 524/555

(58) Field of Classification Search ............... 347/1, 84, 347/86, 92, 95, 100; 523/160, 161; 524/86, 524/87, 88, 89, 90, 91, 92, 186, 190, 543, 524/555

See application file for complete search history.

(56) References Cited

U.S. PATENT DOCUMENTS

| | | | |
|---|---|---|---|
| 6,623,092 B2 * | 9/2003 | Kim et al. .................. | 347/7 |
| 6,624,219 B1 | 9/2003 | Heger et al. | |
| 2001/0023265 A1 * | 9/2001 | Hidaka et al. .............. | 523/161 |
| 2005/0004260 A1 | 1/2005 | Taguchi | |

FOREIGN PATENT DOCUMENTS

| | | |
|---|---|---|
| EP | 1 347 022 A1 | 9/2003 |
| EP | 1 405 884 A1 | 4/2004 |
| EP | 1 473 336 A1 | 11/2004 |
| JP | 55-161856 A | 12/1980 |
| JP | 61-36362 A | 2/1986 |
| JP | 63-280681 A | 11/1988 |
| JP | 64-006072 A | 1/1989 |
| JP | 2-212566 A | 8/1990 |
| JP | 05-229133 * | 9/1993 |
| JP | 11-504958 A | 5/1999 |
| JP | 11-269418 A | 10/1999 |
| JP | 2001-226659 A | 8/2001 |
| JP | 2002-105272 A | 4/2002 |
| JP | 2002-121417 A | 4/2002 |
| JP | 2002-127591 A | 5/2002 |
| JP | 2002-220558 A | 8/2002 |
| JP | 2003-064287 A | 3/2003 |
| JP | 2003-231850 A | 8/2003 |
| JP | 2003-292844 A | 10/2003 |
| JP | 2004-83609 A | 3/2004 |
| JP | 2004-83610 A | 3/2004 |
| JP | 2004-506761 A | 3/2004 |
| JP | 2004-123838 A | 4/2004 |
| JP | 2004-315808 A | 11/2004 |

OTHER PUBLICATIONS

European Search Report dated Oct. 7, 2005.
Japanese Office Action issued Jun. 15, 2010 in corresponding Japanese application No. 2004-194012.

* cited by examiner

*Primary Examiner* — Patrick Niland
(74) *Attorney, Agent, or Firm* — Sughrue Mion, PLLC

(57) ABSTRACT

An ink composition is provided and includes: a dye; and at least one polymer of an oxidation-resistant polymer having a weight-average molecula weight of 3,000 or more, an association-accelerating polymer and an amidic polymer. An image printed with the ink composition has an ozone degradation rate of 1/5 or less of that of an image printed with an ink composition free of the at least one polymer. The ink composition has an extremely high image durability.

15 Claims, No Drawings

INK COMPOSITION, INK SET, INK FOR INKJET RECORDING, INK SET FOR INKJET RECORDING, AND INK CARTRIDGE FOR INKJET RECORDING

FIELD OF THE INVENTION

The present invention relates to an ink composition excellent in image durability, and an ink for inkjet recording, an ink set for inkjet recording and an ink cartridge for inkjet recording using the ink composition.

BACKGROUND OF THE INVENTION

In recent years, with the spread of computers, inkjet printers have been widely used to print on paper, film, cloth, etc. at offices as well as at home.

Examples of inkjet recording method include a method which allows a piezoelectric element to give pressure that causes a droplet to be ejected, a method which comprises heating the ink to generate bubbles, causing a droplet to be ejected, a method involving the use of ultrasonic wave, and a method which uses electrostatic force to suck and discharge a droplet. As inks for these inkjet recording methods there are used aqueous inks, oil-based inks and solid (melt type) inks. Among these inks, aqueous inks are mainly used from the standpoint of producibility, handleability, odor, safety, etc.

The coloring agents to be incorporated in these inks for inkjet recording are required to exhibit a high solubility in solvents, allow a high density recording and have a good hue and an excellent fastness to light, heat, air, water and chemical, a good fixability to image-receiving materials, difficulty in running, an excellent preservability, no toxicity and a high purity and be available at a low cost. However, it is extremely difficult to seek coloring agents meeting these requirements to a high extent.

Various dyes and pigments have been already proposed for inkjet recording and have been actually used. However, no coloring agents meeting all these requirements have been found yet. Known dyes and pigments provided with color index (C.I.) can difficultly satisfy both the hue and fastness requirements for inks for inkjet recording.

As a dye for enhancing fastness there has been proposed an azo dye derived from aromatic amine and 5-membered heterocyclic amine in JP-A-55-161856. However, such a dye is disadvantageous in that it has an undesirable hue in the yellow and cyan range and thus deteriorates color reproducibility.

The JP-A-61-36362 and JP-A-2-212566 disclose an ink for inkjet recording intended to accomplish both desirable hue and light-fastness. However, the dyes used in these patent references leave something to be desired in solubility in water when applied to water-soluble ink. The dyes disclosed in these patent references are also disadvantageous in that they leave something to be desired in fastness to heat and moisture when applied to water-soluble ink for inkjet recording.

As approaches for solving these problems there have been proposed compounds and ink compositions in JP-A-11-504958. Further, an ink for inkjet recording which comprises a pyrazolylaniline azo dye incorporated therein to improve hue and light-fastness has been disclosed (JP-2003-231850). However, these inks for inkjet recording leave something to be desired in both color reproducibility and fastness of outputted image.

It is known that a pigment ink normally exhibits an excellent durability and water resistance but leaves something to be desired in image gloss or image smoothness on a high density area. A problem solution technique involving the reduction of the particle size of pigment or the coating of the surface of pigment with a resin is known as a related art technique in the art.

It is known, however, that when the pigment particles are finely divided an extent such that the texture gloss of image is sufficient also on a high density area, the durability of the pigment itself deteriorates to the same level as that of dyes.

Unlike photographic process, the image recording method involving inkjet allows free selection of inks of hues other than C, M and Y. To date, SEIKO EPSON CORPORATION has announced and marketed systems comprising a dark yellow ink (dye), a blue ink (pigment) and a red ink (pigment). Further, Canon Inc. announced and marketed a system comprising a red ink (dye).

These inks have been developed to provide an image with a high density and a high quality while suppressing the "ink capacity per unit are", which is the greatest weak point of inkjet-recording method. However, the greatest difference of inkjet recording, method from image formation using a photographic light-sensitive material is that a black ink can be used as in image recording by printing.

Under these circumstances, the various manufacturers have announced and marketed systems involving the use of ink sets comprising some kinds of inks, including dyes and pigments, having different densities. To date, the printing of letters on document have normally been made by the use of carbon black as a black pigment. However, carbon black is not suitable for the formation of a high quality photographic image. It has thus been desired to use a high quality black dye for the purpose of attaining a desired photographic image quality.

The inventors made studies of inks for inkjet recording comprising dyes (as disclosed in Japanese Patent Application No. 2002-214066, Japanese Patent Application No. 2002-244930, JP-A-2004-83609 and JP-A-2004-83610). In the art, too, the enhancement of fastness of image have been under studies. An inkjet system involving the use of dye ink marketed by SEIKO EPSON CORPORATION in October 2003 has an concept called "Tsuyoink (strong ink)" that is intended to provide a dye ink with an enhanced durability. In particular, various studies have been made of the enhancement of resistance to fading of image by ozone gas occurring in a slight amount in the air, i.e., ozone resistance of dyes. However, it is the status of quo that no water-soluble dye inks which exhibit a stability comparable to pigments when printed on a porous medium to form an image have been obtained yet.

SUMMARY OF THE INVENTION

An object of an illustrative, non-limiting embodiment of the invention is to provide an ink composition, an ink for inkjet recording, an ink set for inkjet recording and an ink cartridge for inkjet recording, which are useful in order to form an image having an extremely high image durability.

The above-described object of the invention can be accomplished by the following constitutions.

1) An ink composition comprising: a dye; and at least one polymer of an oxidation-resistant polymer having a weight-average molecular weight of 3,000 or more, an association-accelating polymer and an aminic polymer, wherein an image printed with the ink composition has an ozone degration rate of 1/5 or less of that of an image printed with an ink composition fee of the at leant one polymer.

2) An ink composition comprising: a dye; and an oxidation-resistant polymer having a weight-average molecular weight of 3,000 or more, wherein an image printed with the ink composition has an ozone degration rate of 1/5 or less of that of an image printed with an ink composition free of the oxidation-resistant polymer.

3) An ink composition comprising: a dye; and an association-accelerating polymer, wherein an image printed with the ink composition has an ozone degration rate of 1/5 or less of that of an image printed with an ink composition free of the association-accelerating polymer.

4) An ink composition comprising: a dye; and an aminic polymer, wherein an image printed with the ink composition has an ozone degration rate of 1/5 or less of that of an image printed with an ink composition free of the aminic polymer.

5) The ink composition as defined in any one of Clauses 1 to 4, wherein the oxidation-resistant polymer, association-accelerating polymer and aminic polymer are deriviatives from a polymer dispersion.

6) The ink composition as defined in any one of Clauses 1 to 5, wherein the oxidation-resistant polymer, association-accelerating polymer and aminic polymer each are a water-soluble polymer.

7) The ink composition as defined in any one of Clauses 1 to 6, wherein the dye comprises a dye having at least two aromatic heterocyclic groups.

8) The ink composition as defined in any one of Clauses 1 to 7, wherein the dye comprises a dye having an oxidation potential of more positive than 1.0 V (vs SCE).

9) An inkjet recording ink comprising an ink composition as defined in any one of Clauses 1 to 8.

10) An ink set comprising at least one of an ink composition as described in any one of Clauses 1 to 9.

11) An ink cartridge comprising an ink composition as defined in any one of Clauses 1 to 8 or an ink set as defined in Clause 10.

12) An ink cartridge for inkjet recording comprising an ink composition as defined in Clause 9 or an ink set as defined in Clause 10.

13) The ink cartridge for inkjet recording as defined in Clause 12, which comprises an ink loading chamber having a pressure before printing lower than an atmospheric pressure.

14) The ink cartridge for inkjet recording as defined in Clause 12 or 13, which comprises a sponge.

15) The ink cartridge for inkjet recording as defined in any one of Clauses 12 to 14, wherein the sponge comprises a urethane polymer.

In accordance with the invention, the use of a specific polymer makes it possible to provide an ink composition, an ink for inkjet recording, an ink set for inkjet recording and an ink cartridge for inkjet recording, which are useful for providing an image extremely excellent in image durability such as ozone resistance, even in heat fastness and light-fastness.

DETAILED DESCRIPTION OF THE INVENTION

Exemplary embodiments of the invention will be further described hereinafter.

The ink composition as defined in Clause 2 (hereinafter referred to as "ink composition 1") includes a dye and an oxidation-resistant polymer.

The ink composition as defined in Clause 3 (hereinafter referred to as "ink composition 2") includes a dye and an association-accelerating polymer.

The ink composition as defined in Clause 4 (hereinafter referred to as "ink composition 3") includes a dye and an aminic polymer.

The ink compositions 1 to 3 (also referred to as "ink composition of the invention" if named generically) are characterized in that they include an oxidation-resistant polymer, an association-accelerating polymer or an aminic polymer (These three polymers are also generically named "polymer of the invention") to provide the dye with an extremely high ozone degradation resistance as compared with the case where they do not include the polymer of the invention incorporated therein.

The term "oxidation-resistant polymer" as used herein is meant to indicate a polymer having a weight-average molecular weight of 3,000 or more and capable of reducing the ozon degradation rate rate of printed images formed by an ink composition including the same to 1/5 or less of that of printed images formed by an ink composition free of the same.

In the invention, the association-accelerating polymer has an association-accelerating capability in addition to the aforementioned ozone degradation resistance. The term "association-accelerating capability" of the association-accelerating polymer as used herein is meant to indicate a capability of accelerating the associatiability of the dye and a capability of having an interaction that causes a great change of absorption spectrum of dye as defined below with reference to the criterion for judgment of whether or not association-accelerating capability exists from the case where the dye is singly in the form of diluted solution to the case where the dye has an interaction with the association-accelerating polymer.

Criterion of the invention for judgment of whether or not the association-accelerating polymer exists:

When the ratio of the dye molecular absorptivity coefficient ($\epsilon$) of a 0.01 mmol/l solution of single dye to a dye solution comprising an association-accelerating polymer incorporated therein in a solid content concentration of 50 mg/l as measured using a cell having a light path length of 1 cm ($\epsilon 0/\epsilon 1$ supposing that the dye molecular absorption coefficient of the solution of single dye and the dye solution comprising an association-accelerating polymer incorporated therein are $\epsilon 0$ and $\epsilon 1$, respectively) is 1.2 or more and the change of $\lambda$max of spectrum between the two solutions is 5 nm or more, it is defined that there is an association-accelerating capability. The change of $\lambda$max may be toward higher wavelength or lower wavelength.

The term "aminic polymer" as used herein is meant to indicate a polymer containing an aminic nitrogen atom.

The aminic nitrogen atom is a nitrogen atom that can exhibit basicity in the polymer molecule. Examples of the aminic nitrogen atom include nitrogen atoms contained in the following compounds. The aminic polymer to be used in the invention preferably has a residue of the following aminic nitrogen atom-containing compounds substituted by monomer units.

(1) Amine compounds such as compound that forms a primary amine, binary amine, tertiary amine or quaternary amine;

(2) Hydrazine compounds such as hydrazine, semicarbazide, thiosemicarbazide, sulfohydrazide and phosphohydrazide;

(3) Hydroxylamine compounds such as hydroxylamine and carbonyloxyamine;

(4) 5-Membered aromatic heterocyclic compounds contained in pyrazole, imidazole, triazole, tetrazole or condensed polycyclic aromatic heterocyclic compounds thereof (The nitrogen atom having its lone pair of electrons that do not belong to conjugated system is an aminic nitrogen atom);

(5) 6-Membered aromatic heterocyclic compounds such as pyridine, pyridazine, pyrimidine and pyrazine rings; and (6) Compounds such as amidine and guanidine (The nitrogen atom conjugated to imino group contained in these compounds is an aminic nitrogen atom)

Examples of the monomer units by which the residue of the compound containing aminic nitrogen atoms contained in the aminic polymer include those listed in the group of monomers constituting the polymer of the invention described later.

One of the polymers of the invention may be independent from two other polymers in the aforementioned technical scope but preferably shares the aforementioned technical scope with one or more other polymers.

In the invention, supposing that T2 (ozon degradation rate of printed image formed by an ink composition free of polymer of the invention)/T1 (ozone degradation rate of printed image formed by an ink composition comprising a polymer of the invention) is referred to as "ozone degradation rate", the ratio of ozone degradation rate of the invention is defined by the value determined as follows.

(1) C, M and Y monochromatic images having different densities or a gray pattern image is printed on a porous medium with the ink composition of the invention.

(2) An image having B, G, R and Dvis reflection densities of 1.0±0.1 as measured by a status A filter is selected from these images. The image thus selected is then stored in a chamber having an inner ozone gas concentration kept at 5 ppm.

(3) The image is withdrawn from the chamber every a certain period of time, and then measured for density. The time required until the density thus measured reaches 80% of the initial value is then measured as T1.

(4) The ink free of polymer of the invention, too, is measured in the same manner as described above to determine T2.

The ink composition of the invention has an ozone degradation rate ratio (T2/T1) is 1/5 or less, preferably from 1/1,000 to 1/5, more preferably from 1/100 to 1/10.

The term "porous medium" as used in the aforementioned step (1) is meant to indicate an image-receiving medium having a porous particulate layer formed by an inorganic particulate material such as silica and alumina or particulate polymer provided on the surface layer thereof which has been developed to be adapted to high speed printing for inkjet recording. There are various kinds of porous media. The porous medium to be used in the step (1) is not specifically limited so far as the same porous medium is used in the measurement of ozone degradation rate ratio.

As such an image-receiving medium there has been proposed an inkjet recording sheet having a colorant-receiving layer containing finely divided inorganic particles and a water-soluble resin and having a high porosity provided on a support in JP-A-10-119423 and JP-A-10-217601. Examples of commercially available image-receiving media include photographic paper produced by SEIKO EPSON CORPORATION, Prophotopaper (produced by Canon Inc.), Gasai (produced by Fuji Photo Film Co., Ltd.), and other various marketed products.

These porous media, particularly inkjet recording sheets comprising a colorant-receiving layer having a porous structure made of silica as inorganic particulate pigment, exhibit excellent ink absorbing properties and hence so high an ink-receptivity as to form a high resolution image and give a high gloss due to their structure.

The present inventors found out that there are some cases where an image recorded on a gloss paper of photographic image quality dedicated to inkjet recording exhibits a remarkably poor preservability when put on the wall of a indoor room. The present inventors presume that this phenomenon is attributed to some oxidizing gases such as ozone in the air. Further, the blockade of air flow by enclosure in a glass frame makes it difficult for this phenomenon to occur, but this limits the working conditions. This phenomenon is remarkable particularly with gloss paper of photographic image quality dedicated to inkjet recording and thus raises a great problem with the current inkjet recording process, which is required to provide a desired photographic quality image as one of important features.

Since these porous media have a porous structure, the image formed thereon is present on an area having an extremely great specific surface area where it is fully exposed to the air. Therefore, the oxidative degradation of the recorded image by a small amount of gases in the air, particularly ozone, proceeds faster than on ordinary paper. Accordingly, the image printed on these porous media can easily undergo fading by ozone gas in the air due to the great porosity of the media. In accordance with the invention, the use of the polymer of the invention makes it possible to extremely retard the fading of the recorded image.

The polymer of the invention preferably has a weight-average molecular weight of from 3,000 to 10,000,000, more preferably from 4,000 to 1,000,000, particularly from 5,000 to 100,000.

The polymer of the invention may occur in the form of a uniform solution of water-soluble polymer or a polymer dispersion, e.g., aqueous dispersion of water-insoluble polymer in the ink.

In the case where one of the polymers of the invention is derived from a polymer dispersion, it is preferred for the aim of the invention that the polymer derived from a polymer dispersion does not occur in a hard particulate form but form a somewhat uniform layer developed by the interaction of polymer particles on the medium after printing. To this end, it is necessary that the glass transition temperature (Tg) of the polymer derived from a polymer dispersion of the invention fall within a predetermined preferred range. In the invention, the glass transition temperature (Tg) of the polymer of the invention contained in the dispersion preferably falls within a range of from −50° C. to 100° C., particularly from −30° C. to 80° C., most preferably from −20° C. to 50° C.

The structure and other properties of the polymer of the invention are not limited so far as they are contrary to the aforementioned various conditions. Any polymers of the invention may be used singly or in combination. However, the polymer of the invention is preferably transparent or semi-transparent and colorless.

The polymer of the invention may be natural or synthetic singly or in combination, that is, semisynthetic.

As the polymer of the invention there may be used any polymer such as vinyl-polymerized polymer, polycondensed polymer and ring-opening polymerized polymer. A polymer synthesized by these polymerization methods in combination, too, may be used. The polymer of the invention may be either a homopolymer or copolymer.

Specific examples of the polymer of the invention include polymers capable of forming a film such as gelatins, rubbers, poly(vinylalcohol)'s (The expression in a plural form is meant to indicate that their homopolymers and copolymers are included. This applies to the following compounds expressed in a plural form), hydroxyethyl celluloses, cellulose acetates, cellulose acetate butyrates, poly(vinylpyrrolidone)'s, casein, starch, poly(acrylic acid)'s, poly(methylmethacrylic acid)'s, poly(vinyl chloride)'s, poly(methacrylic acid)'s, styrene-maleic anhydride copolymers, styrene acrylonitrile copolymers, styrene-butadiene copolymers, poly(vinylacetal)'s (e.g., poly(vinylformal), poly (vinylbutyral)), poly(ester)'s, poly(urethane)'s, phenoxy resin, poly(vinylidene chloride)'s, poly (epoxide)'s, poly(carbonate)'s, poly(vinyl acetate)'s, poly(olefine)'s, cellulose esters, and poly(amide)'s.

The polymer of the invention may be in an aqueous or organic solvent solution or emulsion from which a fin is formed to cover the printed image.

The monomer to be used in the synthesis of the polymer of the invention is not specifically limited. Any monomers which can be polymerized by an ordinary radical polymerization method or ionic polymerization method can be preferably used. As preferred monomers there can be selected independently and freely from the following groups of monomers (a) to (i). For example, monomers selected from the same group may be used singly or in combination. Alternatively, one or two or more monomers selected from two or more different groups may be used in combination.

Groups (a) to (i) of Monomer:
  (a) Conjugated dienes: 1,3-pentadiene, 1-phenyl-1,3-butadiene, 1-α-naphthyl-1,3-butadiene, 1-β-naphthyl-1,3-butadiene, cyclopentadiene, etc.;
  (b) Olefins: ethylene, propylene, vinyl chloride, vinylidene chloride, 6-hydroxy-1-hexene, 4-pentenic acid, methyl 8-nonenate, vinylsulfonic acid, trimethyl vinyl silane, trimethoxy vinyl silane, 1,4-divinyl cyclohexane, 1,2,5-trivinyl cyclohexane, etc.;
  (c) α, β-Unsaturated carboxylic acid esters: alkyl acrylate (e.g., methyl acrylate, ethyl acrylate, butyl acrylate, cyclohexyl acrylate, 2-ethylhexyl acrylate, dodecyl acrylate), substituted alkyl acrylate (e.g., 2-chloroethyl acrylate, benzyl acrylate, 2-cyanoethyl acrylate), alkyl methacrylate (e.g., methyl methacrylate, butyl methacrylate, 2-ethylhexyl methacrylate, dodecyl methacrylate), substituted alkyl methacrylate (e.g., 2-hydroxyethyl methacrylate, glycidyl methacrylate, glycerin monomethacrylate, 2-acetoxyethyl methacrylate, tetrahydrofuranyl methacrylate, 2-methoxyethyl methacrylate, polypropylene glycol monomethacrylate (number of mols of polyoxypropylene added: 2 to 100), 3-N,N-dimethyl aminopropyl methacrylate, chloro-3-N,N,N-trimethyl ammoniopropyl methacrylate, 2-carboxyethyl methacrylate, 3-sulfopropyl methacrylate, 4-oxysulfo butyl methacrylate, 3-trimethoxysilylpropyl methacrylate, allyl methacrylate, 2-isocyanatoethyl methacrylate), unsaturated dicarboxylic acid derivatives (e.g., monobutyl maleate, dimethyl maleate, monomethyl itaconate, dibutyl itaconate), polyfunctional e.g., ethylene glycol diacrylate, ethylene glycol dimethacrylate, 1,4-cyclohexane diacrylate, pentaerythritol tetramethacrylate, pentaerythritol triacrylate, trimethylolpropane triacrylate, trimethylolethane, triacrylate, dipentaerythritol pentamethacrylate, pentaerythritol hexaacrylate, 1,2,4-cyclohexane tetramethacrylate);
  (d) β-Unsaturated carboxylic acid amides: acrylamide, methacrylamide, N-methyl acrylamide, N,N-dimethyl acrylamide, N-methyl-N-hydroxyethyl methacrylamide, N-tert-butyl acrylamide, N-tert-octyl methacrylamide, N-cyclohexyl acrylamide, N-phenyl acrylamide, N-(2-acetoacetoxyethyl)acrylamide, N-acryloylmorpholine, diacetone acrylamide, diamide itaconate, N-methyl malaimide, 2-acrylamide methylopropanesulfonate, methylene bisacrylamide, dimethacryloyl piperadine;
  (e) Unsaturated nitriles: acrylonitrile, methacrylonitrile;
  (f) Styrene and derivatives: styrene, vinyl toluene, p-tert butyl styrene, vinylbenzoic acid, methyl vinylbenzoate, α-methylstyrene, p-chloromethyl styrene, vinyl naphthalene, p-hydroxymethyl styrene, sodium p-strene-sulfonate, potassium p-styrenesulfinate, p-aminomethylstyrene, 1,4-divinylbenzene;
  (g) Vinyl ethers: methyl vinyl ether, butyl vinyl ether, methoxy ethyl vinyl ether;
  (h) Vinyl esters: vinyl acetate, vinyl propionate, vinyl benzoate, vinyl salicylate, vinyl chloroacetate; and
  (i) Other polymerizable monomers: N-vinyl imidazole, 4-vinylpyridine, N-vinylpyrrolidone, 2-vinyloxazoline, 2-isopropenyl oxazoline, divinyl sulfone Specific examples of the monomers to be used in the synthesis of the polymer of the invention will be given below, but the invention is not limited theeto.

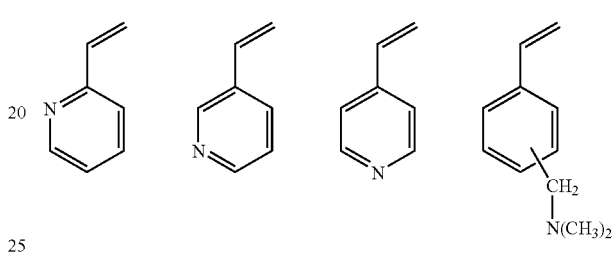

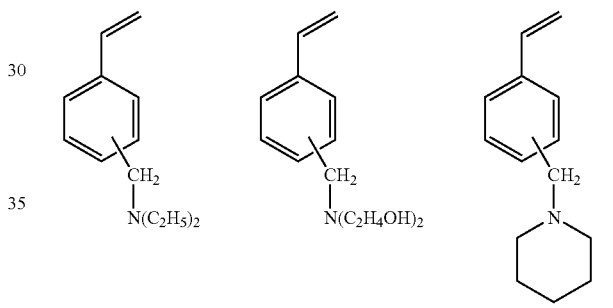

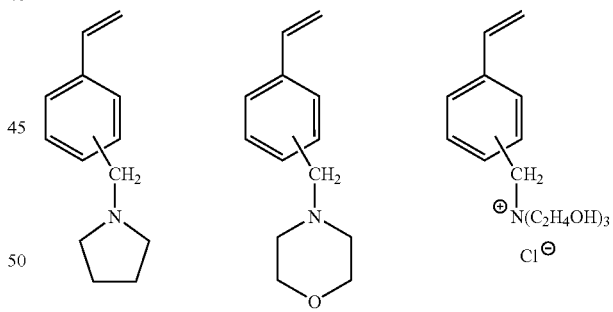

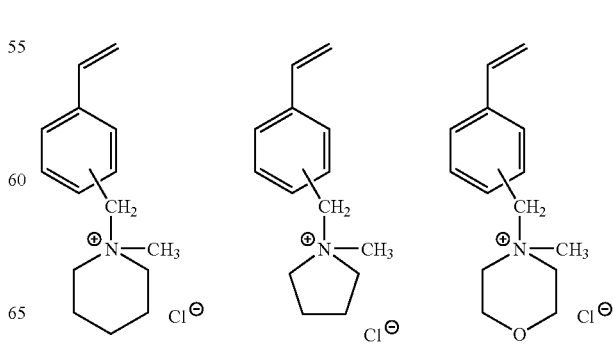

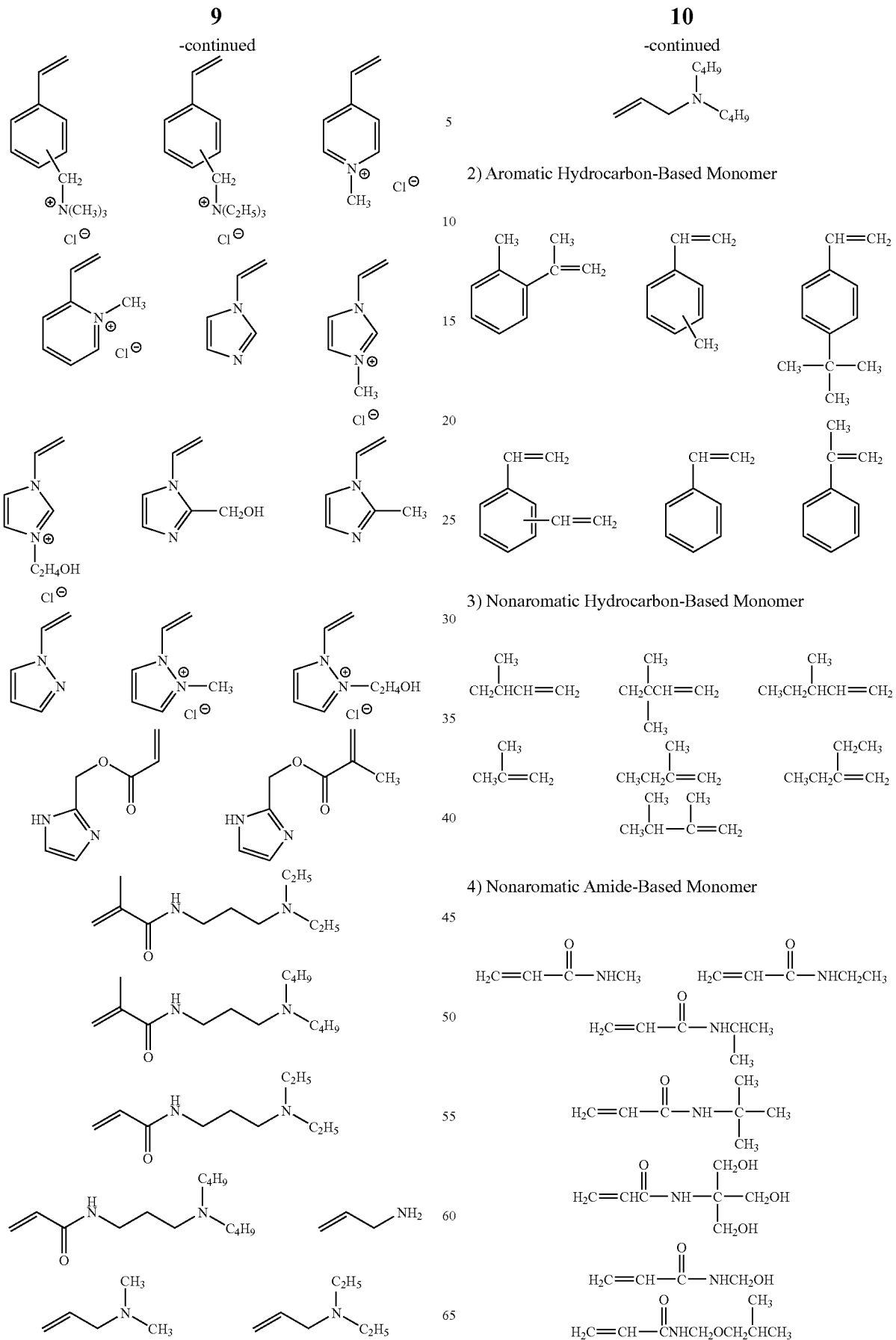
2) Aromatic Hydrocarbon-Based Monomer
3) Nonaromatic Hydrocarbon-Based Monomer
4) Nonaromatic Amide-Based Monomer

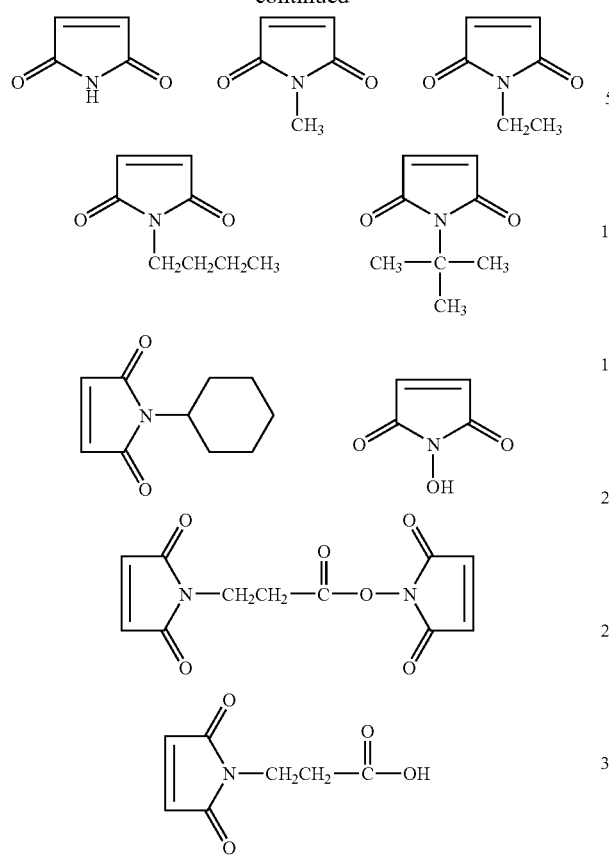
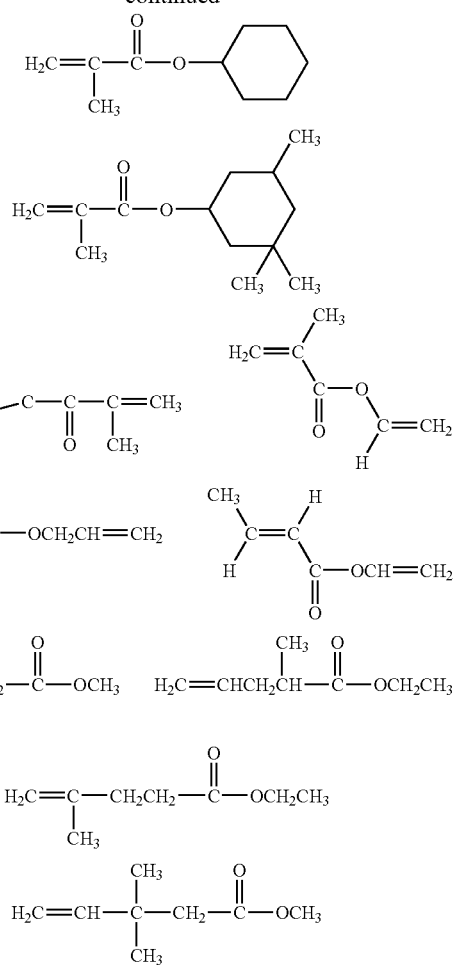
5) Nonaromatic Ester-Based Monomer
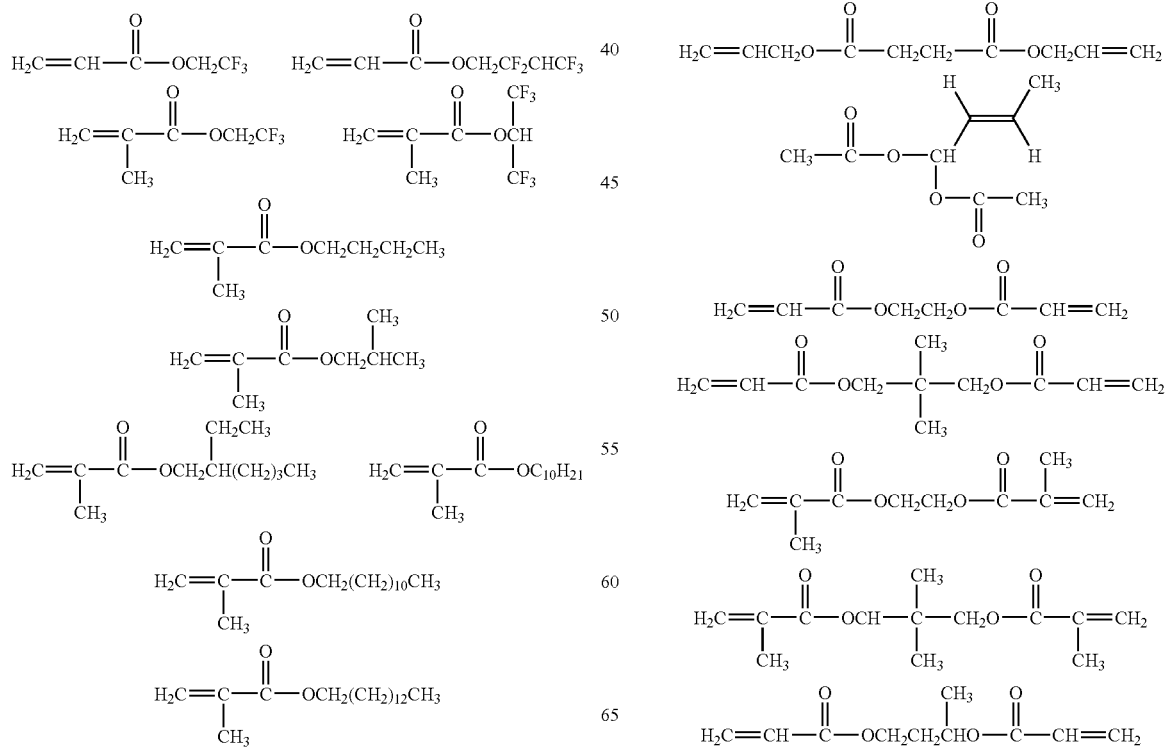

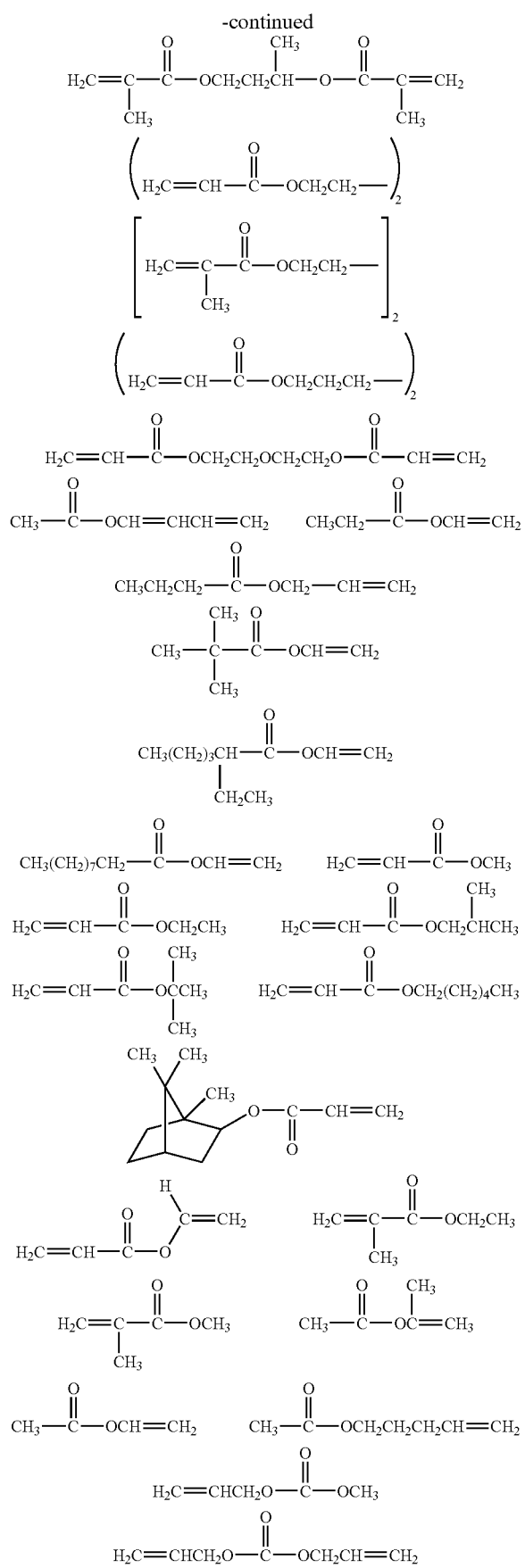
6) Nonaromatic Amide-Based, Acetal-Based or Epoxide-Based Monomer

7) Nonaromatic Sulfide-Based Monomer

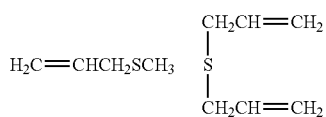

Preferred examples of the polymer of the invention obtained by the polymerization of the aforementioned monomer units will be given below, but the ink composition of the invention is of course not limited thereto. The ratio of copolymers is represented by molar ratio.

Examples of the Polymer of the Invention

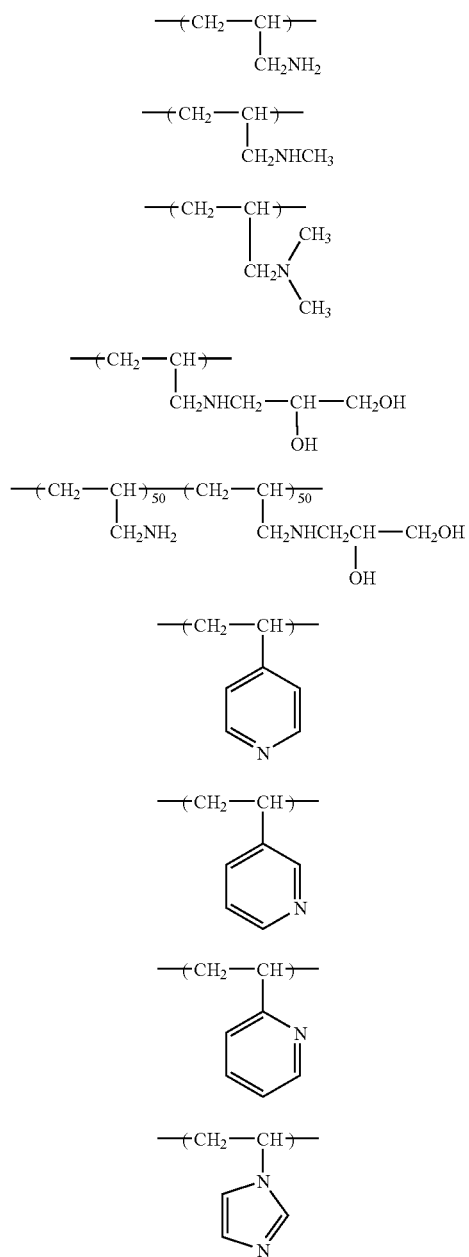

JS-1, JS-2, JS-3, JS-4, JS-5, JS-6, JS-7, JS-8, JS-9

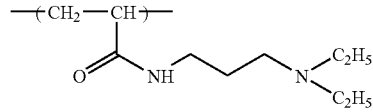

JS-10

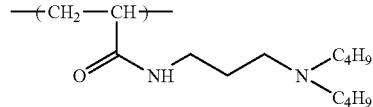

JS-11

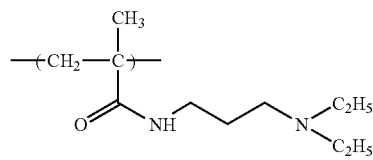

JS-12

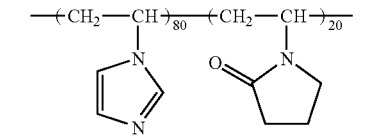

JS-13

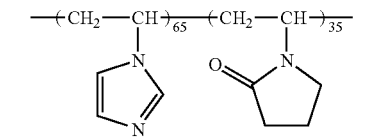

JS-14

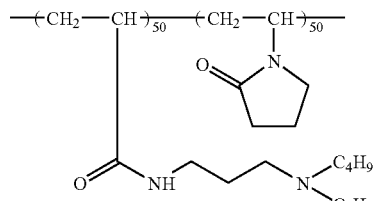

JS-15

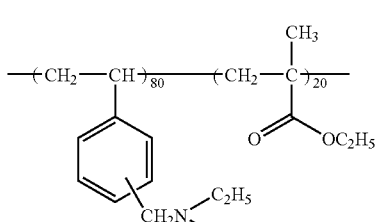

JS-16

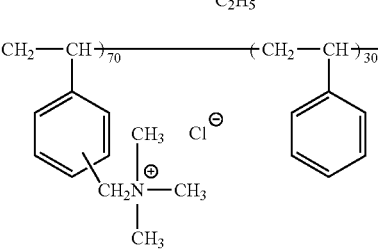

JS-17

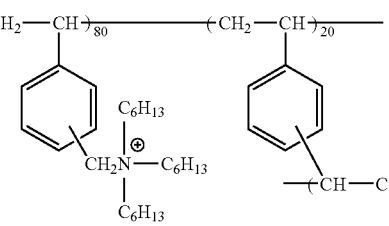

JS-18

-continued
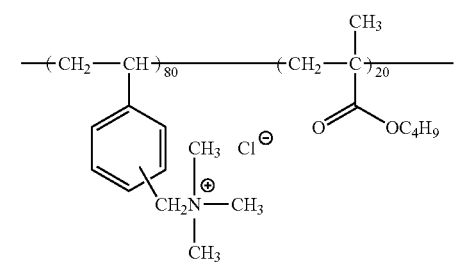
JS-19
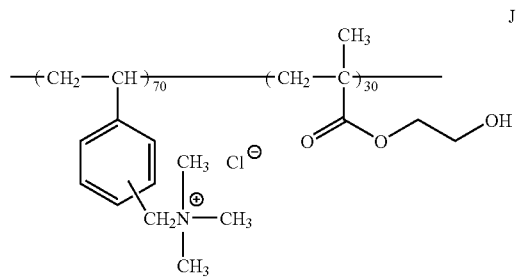
JS-20
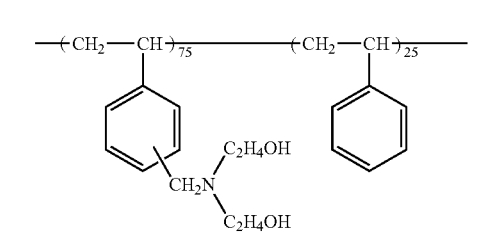
JS-21
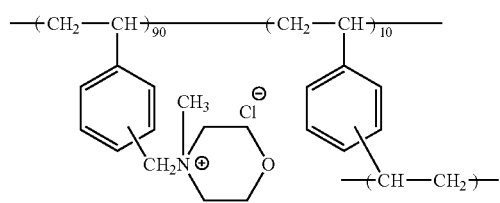
JS-22
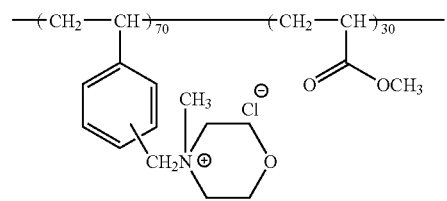
JS-23
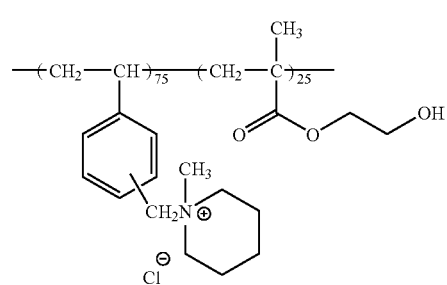
JS-24
-continued
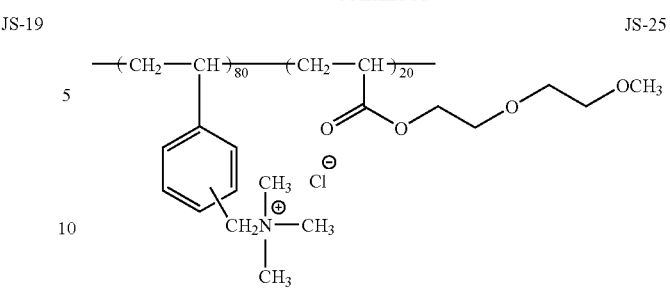
JS-25
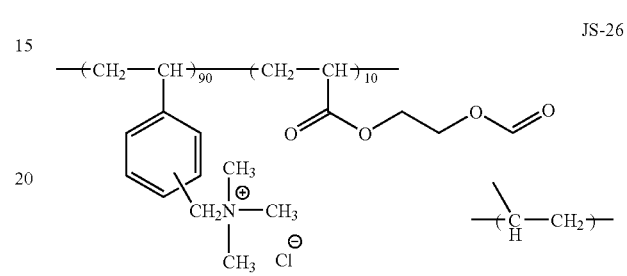
JS-26
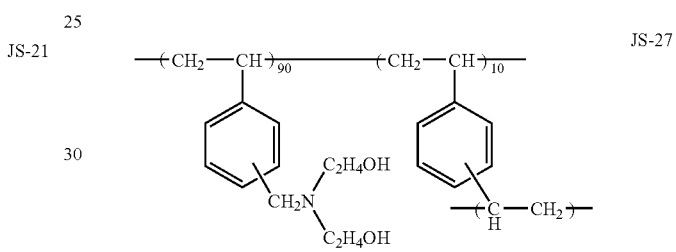
JS-27
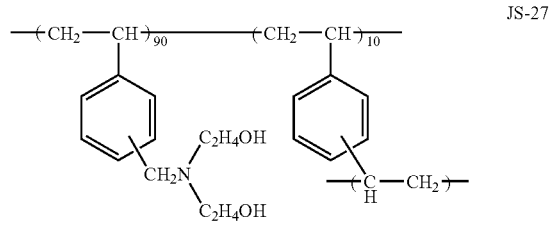
JS-28
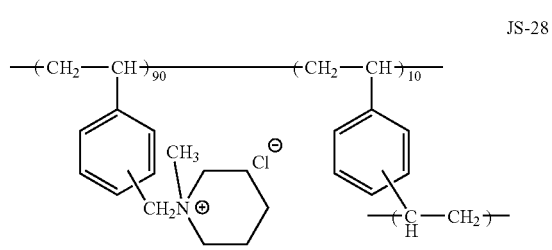
JS-29
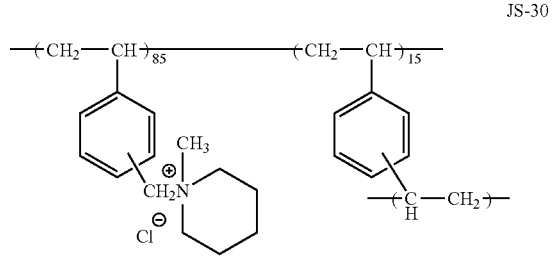
JS-30

JS-31 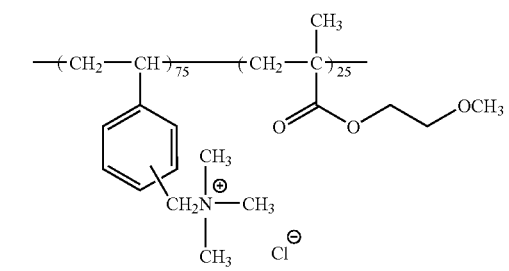
JS-32 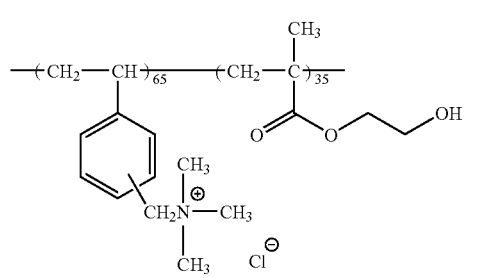
JS-33 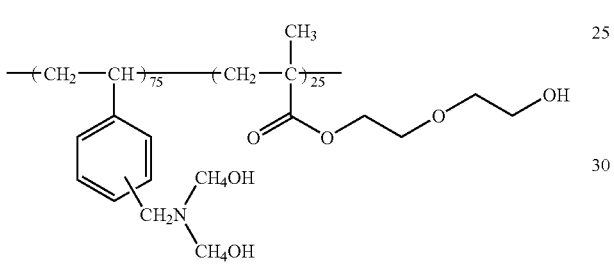
JS-34 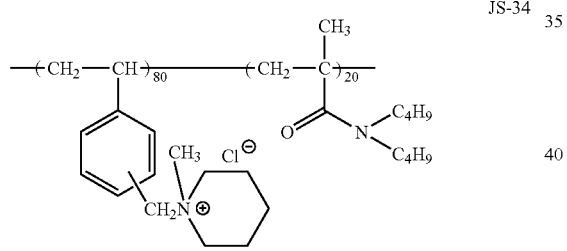
JS-35 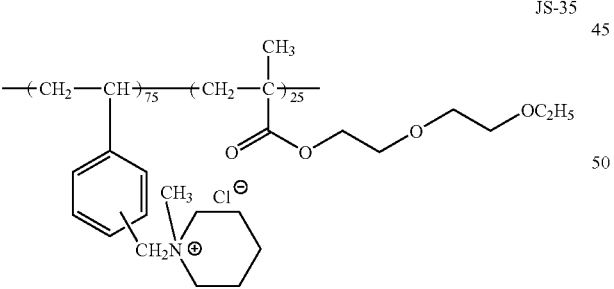
JS-36 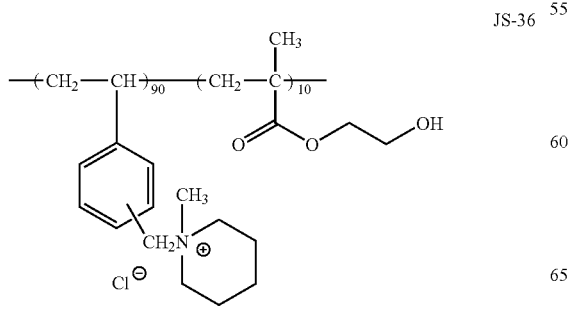
JS-37 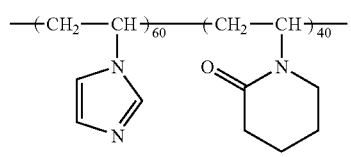
JS-38 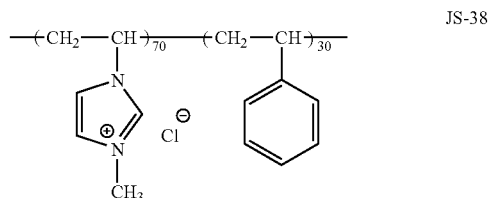
JS-39 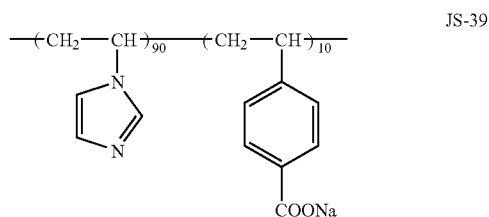
JS-40 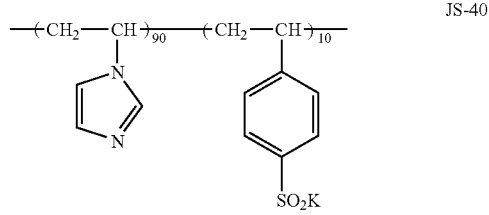
JS-41 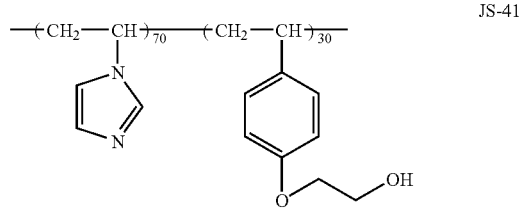
JS-42 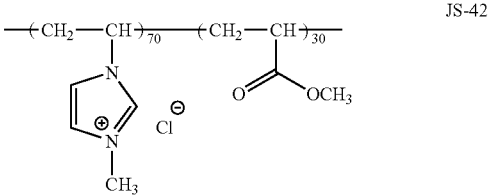
JS-43 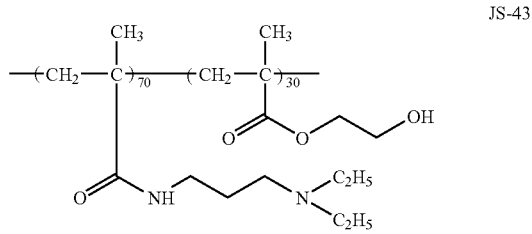
JS-44 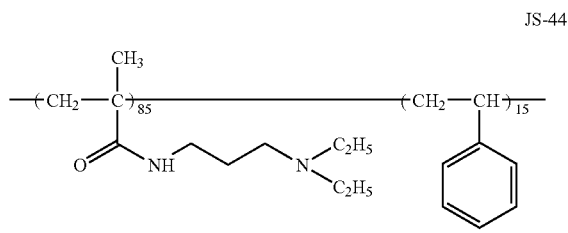

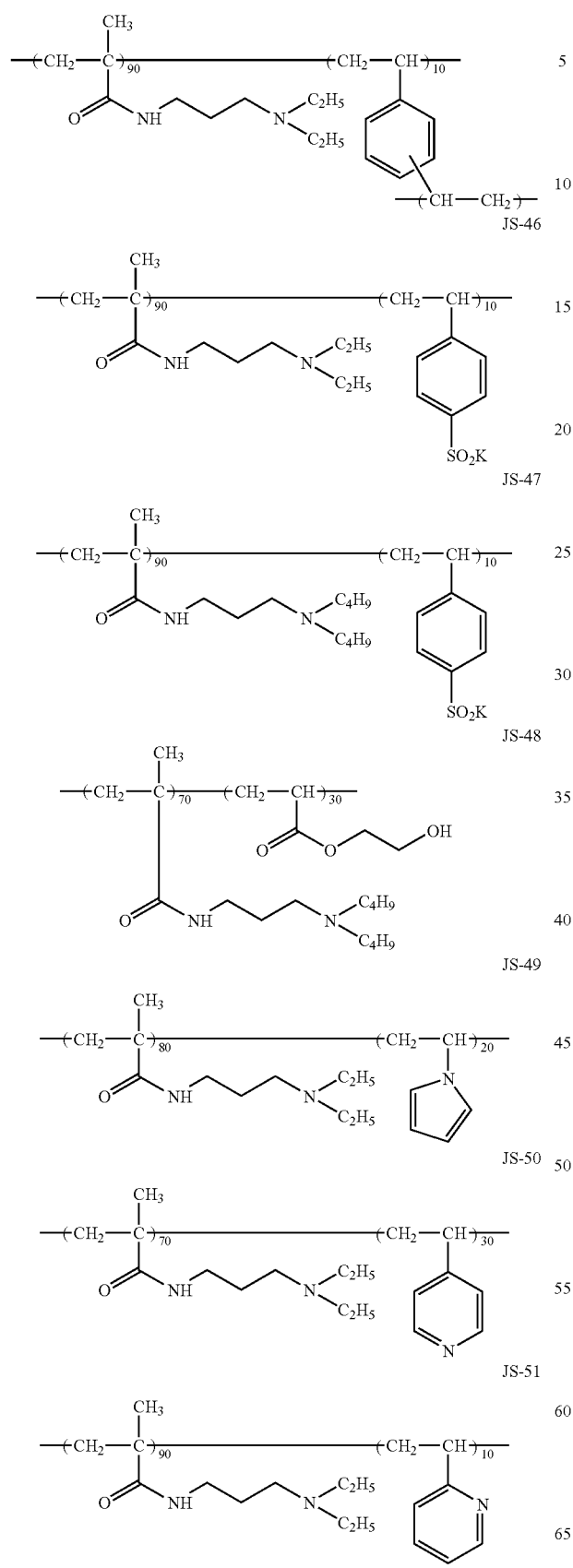
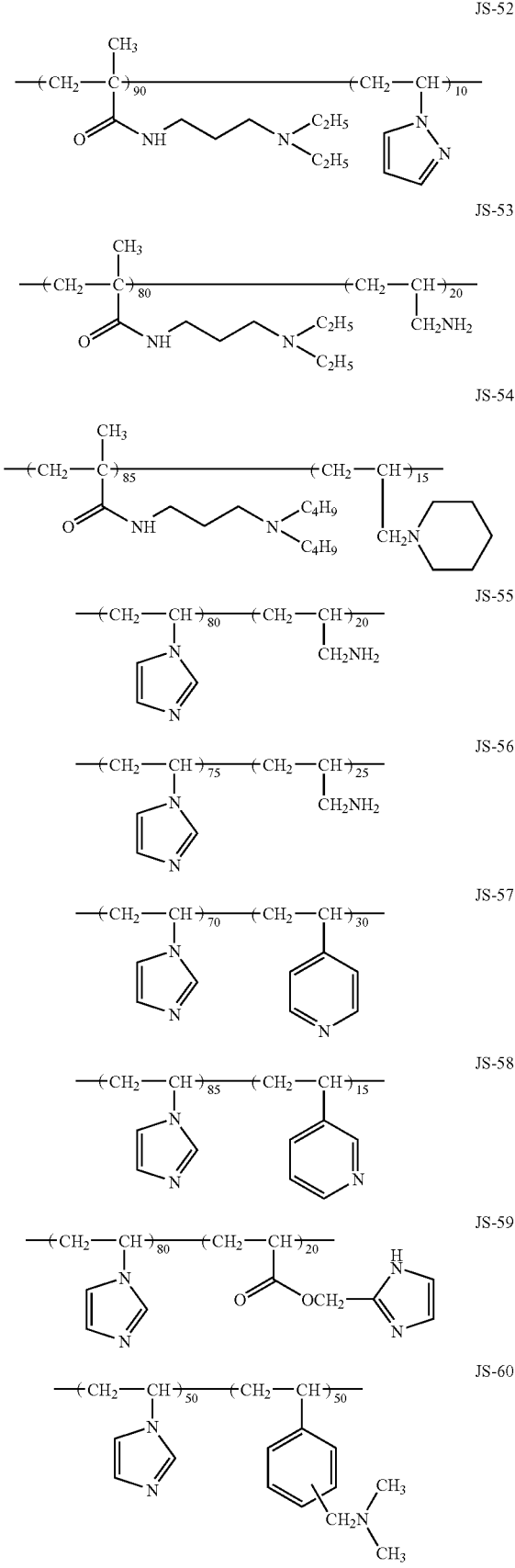

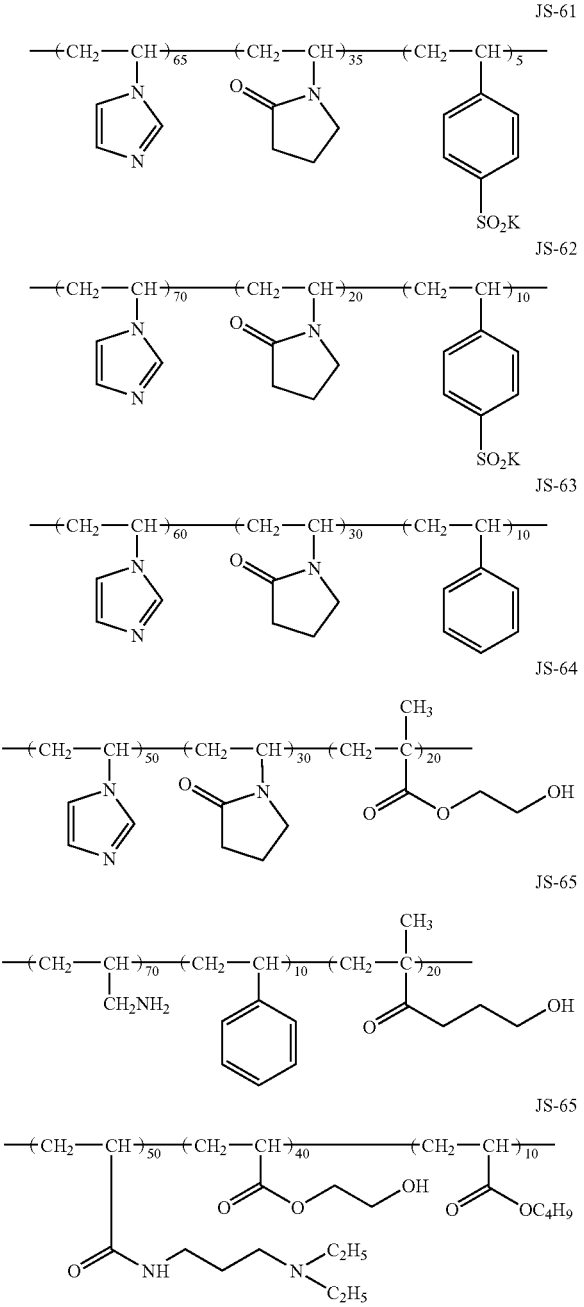

The ink composition of the invention means an ink composition essentially comprising at least a dye and a polymer of the invention incorporated therein. The ink composition of the invention may comprise a medium incorporated therein. An ink composition comprising a solvent as a medium is useful particularly as an ink for inkjet recording. The ink of the invention can be prepared by dissolving and/or dispersing a dye of the invention in a lipophilic medium or aqueous medium as a medium. Preferably, an aqueous medium is used. Examples of the ink composition of the invention include those free of medium. The ink composition of the invention may comprise other additives incorporated therein as necessary so far as the effect of the invention cannot be impaired. Examples of other additives employable herein include known additives such as drying inhibitor (wetting agent), fading inhibitor, emulsion stabilizer, penetration accelerator, ultraviolet absorber, preservative, mildewproofing agent, pH adjustor, surface tension adjustor, antifoaming agent viscosity adjustor, dispersant, dispersion stabilizer, rust preventive and chelating agent. These various additives are directly added to the ink solution which is a water-soluble ink composition. In the case where an oil-soluble dye is used in the form of dispersion, these additives are normally added to the dye dispersion which has been prepared but may be added to the oil phase or aqueous phase during preparation.

The ink composition of the invention is preferably an aqueous ink. The polymer of the invention, if it is a water-soluble polymer, may be added to the aqueous ink composition of the invention as it is. Even when the polymer of the invention is an oil-soluble polymer, a latex dispersion may be used as a polymer dispersion obtained by emulsion polymerization. Alternatively, a dispersion obtained by emulsion dispersion of a solution of an oil-soluble polymer in a solvent may be incorporated in the ink composition.

The amount of the polymer of the invention to be incorporated in the ink composition may fall within a wide range and is preferably from 0-001 to 50% by weight, more preferably from 0.01 to 20% by weight, particularly from 0.05 to 10% by weight based on the total amount of the ink composition as calculated in terms of solid content of polymer.

The dye to be incorporated in the ink composition of the invention is not specifically limited. Various dyes may be used in the invention. Examples of the dye employable in the art include various dyes such as direct dyes, indirect dyes, food dyes and photographic dyes. Specific examples of these dyes will be given below.

The ink composition of the invention: has a dye in an amount of preferably 0.01 to 40% by weight, more preferably 0.1 to 20% by weight, still more preferably 0.5 to 15% by weight.

The ink composition of the invention may be used to form not only a monochromatic image but also a full-color image. In order to form a full-color image, a magenta-toned ink composition, a cyan-toned ink composition and a yellow-toned ink composition may be used. Further, a black-toned ink composition may be used. At least one of these ink compositions may be used as an ink composition of the invention to provide an ink set preferably for inkjet recording. Moreover, the invention provides an ink cartridge comprising an ink composition of the invention or an ink set of the invention preferably for inkjet recording.

As a yellow dyestuff to be used herein there may be used an arbitrary yellow dyestuff.

Examples of yellow dyestuffs include aryl or heterylazo dyestuffs having heterocycles such as phenol, naphthol, aniline, pyrazolone and pyridone or closed-chain type active methylene compounds as coupling components hereinafter referred to as "coupler component"), azomethine dyestuffs having closed-chain type active methylene compounds as coupler components, methine dyestuffs such as benzylidene dyestuff and monomethine oxonol dyestuff and quinone-based dyestuffs such as naphthoquinone dyestuff and anthraquinone dyestuff. Other examples of yellow dyestuffs include quinophthalone dyestuff, nitro-nitroso dyestuff, acridine dyestuff, and acridinone dyestuff.

As a magenta dyestuff to be used herein there may be used an arbitrary magenta dyestuff.

Examples of magenta dyestuff include aryl or heterylazo dyestuffs having heterocycles such as phenol, naphthol, aniline and pyrazine as coupling components (hereinafter referred to as "coupler components"), azomethine dyestuffs having closed-chain type active methylene compounds as coupler components, and anthrapyridone dyestuffs.

As a cyan dyestuff to be used herein there may be used an arbitrary cyan dyestuff.

Examples of cyan dyestuff include aryl or heterylazo dyestuffs having phenols, naphthols or anilines as coupler components, azomethine dyestuffs having heterocycles such as phenol, naphthol and pyrrolotriazole as coupler components, polymethine dyestuff such as cyanine dyestuff, oxonol dyestuff and melocyanine dyestuff carbonium dyestuffs such as diphenylmethane dyestuff, triphenylmethane dyestuff and xanthene dyestuff, phthalocyanine dyestuffs, anthraquinone dyestuffs, and indigo-thioindigo dyestuff.

As a black dyestuff to be used herein there may be used an arbitrary black dyestuff.

Examples of black dyestuff include aryl or heterylazo dyestuffs having phenols, naphthols or anilines as coupler components, azomethine dyestuffs having heterocycles such as phenol, naphthol and pyrrolotriazole as coupler components, polymethine dyestuffs such as cyanine dyestuff oxonol dyestuff and melocyanine dyestuff, carbonium dyestuffs such as diphenylmethane dyestuff, triphenylmethane dyestuff and xanthene dyestuff, bisazo dyestuffs comprising these dyestuffs in various combinations, and polychromophore dyes such as trisazo dye.

These dyestuffs may assume their hues such as yellow and cyan only when chromophore is partly dissociated. In this case, the counter cation may be an inorganic cation such as alkaline metal ion and ammonium ion or an organic cation such as pyridinium ion and quaternary ammonium salt ion or may be contained in a polymer cation as a partial structure. The aforementioned polymer cation may be a polymer of the invention or other kinds.

In the invention, a dye having a heterocyclic group having an excellent light-fading resistance (also referred to as "heterocyclic dye") is particularly preferably used. As such a heterocyclic dye there is preferably used one having at least two aromatic heterocyclic groups. As the heterocyclic dye there is also preferably used one having a structure such that the heterocyclic group contributes to π-electron system that takes part in the color development of dye. Preferred among these heterocyclic dyes is a dye of the type having two or more heterocyclic groups in π-electron system. Preferred examples of the heterocyclic dye include azo dyes, and phthalocyanine dyes.

The term "aromatic heterocyclic group" as used herein is meant to indicate a ring containing hetero atoms in an aromatic 6π((4n+2)π)-electron system (in which n represents an integer of 1 or more). Preferred examples of the aromatic heterocyclic group include pyridine, pyrazine, pyrimidine, pyridazine, triazine, pyrazole, imidazole, benzimidazole, triazole, thiazole, benzothiazole, isothiazole, benzisothiazole, thiadiazole, and derivatives thereof.

The dye to be incorporated in the ink composition of the invention preferably includes a dye having an oxidation potential of more positive (nobler) than 1.0 V (vs SCE). The oxidation potential is preferably as much positive as possible, more preferably more positive than 1.10 V (vs SCE), most preferably more positive than 1.15 V (vs SCE). The ink composition comprising such a dye having an oxidation potential falling within this range incorporated therein in combination with a polymer of the invention exhibits much little fading with time and hence further improvements in image fastness such as age stability, gas resistance, light-resistance, heat resistance and water resistance.

The oxidation potential value (Eox) can be easily measured by those skilled in the art. For the details of the method for measuring the oxidation potential, reference can be made to P. Delahay, "New Instrumental Methods in Electrochemistry", Interscicence Publishers, 1954, A. J. Bard and et al, "Electrochemical Methods", John Wiley & Sons, 1980, and Akira Fujishima and et al, "Denki Kagaku Sokuteiho (Electrochemical Measuring Method)", Gihodo Shuppansha, 1984.

In some detail, the measurement of oxidation potential is carried out by dissolving the test specimen in a solvent containing a supporting electrolyte such as sodium perchlorate and tetrapropylammonium perchlorate in a concentration of from $1\times10^{-2}$ to $1\times10^{-6}$ mol/l, and then measuring the test solution for oxidation potential with respect to SCE (saturated calomel electrode) using cyclic voltammetry or the like. This value may deviate by scores of millivolts due to the effect of difference in potential between solutions or resistivity of test solution. However, the incorporation of a standard specimen (e.g., hydroquinone) makes it possible to assure the reproducibility of potential.

In order to unequivocally define potential, the potential (vs SCE) measured in dimethylformamide containing 0.1 mol/l of tetrapropylammonium perchlorate as a supporting electrolyte (concentration of dye: 0.001 mol/l) is defined as oxidation potential of dye.

The value of Eox indicates the transferability of electrons from the specimen to the electrode. The greater this value is (the more positive the oxidation potential is), the more difficultly can be transferred electrons from the specimen to the electrode, i.e., the more difficultly can be oxidized the specimen. With regard to the structure of the compound, the incorporation of electron-withdrawing group causes the oxidation potential to be more positive while the incorporation of electron-donative group causes the oxidation potential to be more negative. In the invention, in order to deteriorate the reactivity with ozone, which is an electron-withdrawing agent, it is preferred that an electron-withdrawing group be incorporated in the phthalocyanine skeleton to cause the oxidation potential to be more positive.

Examples of dyes excellent in fastness such as light-fading resistance to be incorporated in the ink composition of the invention include those disclosed in JP-A-2004-83609 and JP-A-2004-83610.

Preferred examples of dyes employable herein will be given below, but the invention is not limited thereto.
(Yellow Dye)

$$(A-N=N-B)n-L \quad (1)$$

In formula (1), A and B each independently represent a heterocyclic group which may be substituted. L represents a hydrogen atom, mere bond or divalent connecting group. The suffix n represents an integer of 1 or 2. However, when n is 1, L represents a hydrogen atom and A and B are each a monovalent heterocyclic group. When n is 2, L represents a mere bond or divalent connecting group and one of A and B is a monovalent heterocyclic group and the other is a divalent heterocyclic group. When n is 2, the two A's and B's may be the same or different, respectively.

Preferred examples of the heterocyclic group represented by A in formula (1) include 5-pyrazolone, pyrazole, triazole, oxazolone, isooxazolone, barbituric acid, pyridone, pyridine, rhodanine, pyrazolinedione, pyrazolopyridone, Meldrum's acid, and condensed heterocyclic group having an aromatic hydrocarbon ring or heterocyclic group condensed to these heterocyclic groups. Preferred among these heterocyclic groups are 5-pyrazolone, 5-aminopyrazole, pyridone, 2,6-diaminopyridine, and pyrazoloazoles. Particularly preferred among these heterocyclic groups are 5-aminopyrazole, 2-hydroxy-6-pyridone, 2,6-diaminopyridine, and pyrazoloazoles.

Examples of the heterocyclic group represented by B include pyridine, pyrazine, pyrimidine, pyridazine, triazine, quinoline, isoquinoline, quinazoline, cinnoline, phthaladine, quinoxaline, pyrrole, indole, furane, benzofurane, thiophene, benzothiophene, pyrazole, imidazole, benzoimidazole, triazole, oxazole, isoxazole, benzoxazole, thiazole, benzothiazole, benzothiazole, isothiazole, benzoisothiazole, thiadiazole, benzoisoxazole, pyrrolidine, piperidine, piperazine, imidazolidine, and thiazoline. Preferred among these heterocyclic groups are pyridine, quinoline, thiophene, pyrazole, imidazole, benzoimidazole, triazole, oxazole, isoxazole, benzoxazole, thiazole, benzothiazole, isothiazole, benzoisothiazole, thiadiazole, and benzoisoxazole. More desirable among these heterocyclic groups are quinoline, thiophene, pyrazole, benzoxazole, benzoisoxazole, isothiazole, imidazole, benzothiazole, and thiadiazole. Particularly preferred among these heterocyclic groups are pyrazole, benzoxazole, benzoxazole, imidazole, 1,2,4-thiadiazole, and 1,3,4-thiadiazole.

Examples of the substituents on A and B include halogen atoms, alkyl groups, alkenyl groups, aralkyl groups, alkenyl groups, alkinyl groups, aryl groups, heterocyclic groups, cyano groups, hydroxyl groups, nitro groups, alkoxy groups, aryloxy groups, silyloxy groups, heterocyclic oxy groups, acyloxy groups, carbamoyloxy groups, alkoxycarbonyloxy groups, aryloxycarbonyloxy groups, amino groups, acylamino groups, aminocarbonylamino groups, alkoxycarbonylamino groups, aryloxycarbonylamino groups, sulfamoylamino groups, alkylsulfonylamino groups, arylsulfonylamino groups, mercapto groups, alkylthio groups, arylthio groups, heterocyclic thio groups, sulfamoyl groups, alkylsulfinyl groups, arylsulfinyl groups, alkylsulfonyl groups, arylsulfonyl groups, acyl groups, amyloxycarbonyl groups, alkoxycarbonyl groups, carbamoyl groups, imide groups, phosphino groups, phosphinyl groups, phosphinyloxy groups, phosphinylamino groups, silyl groups, and ionic hydrophilic groups as listed below.

Preferred groups of the divalent connecting group represented by L include alkylene groups, arylene groups, heterocyclic residues, —CO—, —$SO_n$— (in which n is 0, 1 or 2), —NR— (in which R represents a hydrogen atom, alkyl group or aryl group), —O—, and divalent group formed by combining these groups. These divalent connecting groups may further have substituents listed with reference to the substituents on A and 8 or ionic hydrophilic groups.
(Cyan Dye)

Formula (2):

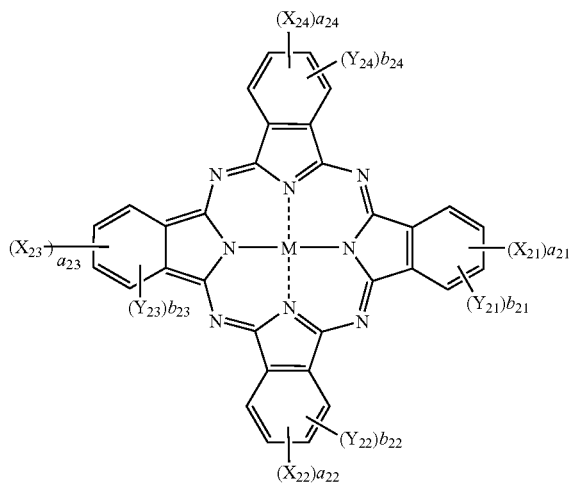

In formula (2), $X_{21}$, $X_{22}$, $X_{23}$ and $X_{24}$ each independently represent —SO—$Z_2$, —$SO_2$—$Z_2$, —$SO_2NR_{21}R_{22}$, sulfo group, —$CONR_{21}R_{22}$ or —$COOR_{21}$.

$Z_2$ each independently represent an alkyl group, cycloalkyl group, alkenyl group, aralkyl group, aryl group or heterocyclic group. These groups may be further substituted by other groups. $R_{21}$ and $R_{22}$ each independently represent a hydrogen atom, alkyl group, cycloalkyl group, alkenyl group, aralkyl groups aryl group or heterocyclic group. These groups may be further substituted by other groups. $Y_{21}$, $Y_{22}$, $Y_{23}$ and $Y_{24}$ each independently represent a monovalent substituent.

The suffixes $a_{21}$ to $a_{24}$ each represent the number of substituents on $X_{21}$ to $X_{24}$ and $Y_{21}$ to $Y_{24}$. The suffixes $a_{21}$ to $a_{24}$ each independently represent a number of from 0 to 4 but are not 0 at the same time. The suffixes $b_{21}$ to $b_{24}$ each independently represent a number of from 0 to 4. When $a_{21}$ to $a_{24}$ and $b_{21}$ to $b_{24}$ each represent a number of 2 or more, the plurality of $X_{21}$'s to $X_{24}$'s and $Y_{21}$'s to $Y_{24}$'s may be the same or different, respectively. M represents a hydrogen atom, metal atom or oxide, hydroxide or halide thereof.

In formula (2), $X_{21}$, $X_{22}$, $X_{23}$ and $X_{24}$ each independently represent —SO—$Z_2$, —$SO_2$—$Z_2$, —$SO_2NR_{21}R_{22}$, sulfo group, —$CONR_{21}R_{22}$ or —$CO_2R_{21}$. Preferred among these substituents are —SO—$Z_2$, —$SO_2$—$Z_2$, —$SO_2NR_{21}R_{22}$ and —$CONR_{21}R_{22}$. Particularly preferred among these substituents are —$SO_2$—$Z_2$ and —$SO_2NR_{21}R_{22}$. Most desirable among these substituents is —$SO_2Z_2$. When any of $a_{21}$ to $a_{24}$, which represent the number of substituents on $X_{21}$ to $X_{24}$, respectively, are a number of 2 or more, the plurality of $X_{21}$'s to $X_{24}$'s, if any, may be the same or different and each independently represent any of the aforementioned groups. $X_{21}$, $X_{22}$, $X_{23}$ and $X_{24}$ may be the same substituent. Alternatively, $X_{21}$, $X_{22}$, $X_{23}$ and $X_{24}$ may be a substituent which is of the same kind but is partly different, e.g., —$SO_2$—$Z_2$ in which $Z_2$ differs among $X_{21}$, $X_{22}$, $X_{23}$ and $X_{24}$. Alternatively, $X_{21}$, $X_{22}$, $X_{23}$ and $X_{24}$ may contain different substituents, e.g., —$SO_2$—$Z_2$ and —$SO_2NR_{21}R_{22}$.

The groups $Z_2$ each independently represent an alkyl group, cycloalkyl group, alkenyl group, aralkyl group, aryl group or heterocyclic group. Preferred among these groups are alkyl group, aryl group and heterocyclic group. Most desirable among these groups are substituted alkyl group, substituted aryl group and substituted heterocyclic group.

$R_{21}$ and $R_{22}$ each independently represent a hydrogen atom all group, cycloalkyl group, alkenyl group, aralkyl group, aryl group or heterocyclic group. Preferred among these groups are hydrogen atom, alkyl group, aryl group and heterocyclic group. Particularly preferred among these groups are hydrogen atom, substituted alkyl group, substituted aryl group and substituted heterocyclic group. However, it is not preferred that both $R_{21}$ and $R_{22}$ are a hydrogen atom.

The alkyl groups represented by $R_{21}$, $R_{22}$ and $Z_2$ each are preferably a $C_1$-$C_{30}$ alkyl group. For the purpose of enhancing the solubility of dye or ink stability, a branched alkyl group is particularly preferred. It is more desirable that the alkyl group have an asymmetric carbon (used in the form of racemate). The alkyl group may further have substituents. Examples of these substituents include those listed below with reference to the case where $Z_2$, $R_{21}$, $R_{22}$, $Y_{21}$, $Y_{22}$, $Y_{23}$ and $Y_{24}$ may further have substituents. Particularly preferred among these substituents are hydroxyl group, ether group, ester group, cyano group, amide group and sulfonamide group because they can enhance the associatiability of dye and hence the fastness thereof. The alkyl group may further have halogen atoms or ionic hydrophilic groups. The carbon atoms to be counted in the "number of carbon atoms in the alkyl group" do not include those in these substituents. This applies to other groups represented by $R_{21}$, $R_{22}$ and $Z_2$.

The cycloalkyl groups represented by $R_{21}$, $R_{22}$ and $Z_2$ each are a $C_5$-$C_{30}$ cycloalkyl group. For the purpose of enhancing the solubility of dye or ink stability, it is particularly preferred that the cycloalkyl group have an asymmetric carbon (used in the form of racemate). The cycloalkyl group may further have substituents. Examples of these substituents include those listed below with reference to the case where $Z_2$, $R_{21}$, $R_{22}$, $Y_{21}$, $Y_{22}$, $Y_{23}$ and $Y_{24}$ may further have substituents. Particularly preferred among these substituents are hydroxyl group, ether group, ester group, cyano group, amide group and sulfonamide group because they can enhance the associatiability of dye and hence the fastness thereof. The alkyl group may further have halogen atoms or ionic hydrophilic groups.

The alkenyl groups represented by $R_{21}$, $R_{22}$ and $Z_2$ each are a $C_2$-$C_{30}$ alkenyl group. For the purpose of enhancing the solubility of dye or ink stability, a branched alkenyl groups is preferred. It is particularly preferred that the alkenyl group have all asymmetric carbon (used in the form of racemate). The alkenyl group may further have substituents. Examples of these substituents include those listed below with reference to the case where $Z_2$, $R_{21}$, $R_{22}$, $Y_{21}$, $Y_{22}$, $Y_{23}$ and $Y_{24}$ may further have substituents. Particularly preferred among these substituents are hydroxyl group, ether group, ester group, cyano group, amide group and sulfonamide group because they can enhance the associatiability of dye and hence the fastness thereof. The alkyl group may hardier have halogen atoms or ionic hydrophilic groups.

The aralkyl groups represented by $R_{21}$, $R_{22}$ and $Z_2$ each are a $C_7$-$C_{30}$ aralkyl group. For the purpose of enhancing the solubility of dye or ink stability, a branched aralkyl groups is preferred. It is particularly preferred that the aralkyl group have an asymmetric carbon (used in the form of racemate). The aralkyl group may further have substituents. Examples of these substituents include those listed below with reference to the case where $Z_2$, $R_{21}$, $R_{22}$, $Y_{21}$, $Y_{22}$, $Y_{23}$ and $Y_{24}$ may further have substituents. Particularly preferred among these substituents are hydroxyl group, ether group, ester group, cyano group, amide group and sulfonamide group because they can enhance the associatiability of dye and hence the fastness thereof. The alkyl group may further have halogen atoms or ionic hydrophilic groups.

The aryl groups represented by $R_{21}$, $R_{22}$ and $Z_2$ each are a $C_6$-$C_{30}$ aryl group. The aryl group may further have substituents. Examples of these substituents include those listed below with reference to the case where $Z_2$, $R_{21}$, $R_{22}$, $Y_{21}$, $Y_{22}$, $Y_{23}$ and $Y_{24}$ may further have substituents. Particularly preferred among these substituents are electron-withdrawing groups because they can render the oxidation potential of dye more positive and hence enhance the fastness of dye. Examples of the electron-withdrawing groups employable herein include those having a positive Hammett's substituent constant op value. Preferred among these electron-withdrawing groups are halogen atom, heterocyclic group, cyano group, carboxyl group, acylamino group, sulfonamide group, sulfamoyl group, carbamoyl group, sulfonyl group, imide group, acyl group, sulfo group, and quaternary ammonium group. Even more desirable among these electron-withdrawing groups are cyano group, carboxyl group, sulfamoyl group, carbamoyl group, sulfonyl group, imide group, acyl group, sulfo group, and quaternary ammonium group.

The heterocyclic groups represented by $R_{21}$, $R_{22}$ and $Z_2$ each are a 5-membered or 6-membered ring which may be further condensed. The heterocyclic group may be either aromatic or nonaromatic. The heterocyclic groups represented by $R_{21}$, $R_{22}$ and $Z_2$ will be exemplified with their substitution positions omitted. However, the substitution is not limited. For example, pyridine may have substituents on the 2-position, 3-position or 4-position. Examples of the heterocyclic groups represented by $R_{21}$, $R_{22}$ and $Z_2$ include pyridine, pyrazine, pyrimidine, pyridazine, triazine, quinoline, isoquinoline, quinazoline, cinnoline, phthaladine, quinoxaline, pyrrole, indole, furane, benzofurane, thiophene, benzothiophene, pyrazole, imidazole, benzimidazole, triazole, oxazole, benzoxazole, thiazole, benzothiazole, benzothiazole, isothiazole, benzoisothiazole, thiadiazole, isooxazole, benzoisoxazole, pyrrolidine, piperidine, piperazine, imidazolidine, and thiazoline. Preferred among these heterocyclic groups are aromatic heterocyclic groups. Preferred examples of these aromatic heterocyclic groups include pyridine, pyrazine, pyridine, pyridazine, triazin, pyrazole, imidazole, benzimidazole, triazole, oxazole, thiazole, benzothiazole, isothiazole, benzisothiazole, and thiadiazole. These heterocyclic groups may further have substituents. Examples of these substituents include those listed below with reference to the case where $Z_2$, $R_{21}$, $R_{22}$, $Y_{21}$, $Y_{22}$, $Y_{23}$ and $Y_{24}$ may further have substituents. Preferred examples of these substituents are the same as listed above with reference to the aryl group. More desirable examples of these substituents are the same as listed above with reference to the aryl group.

$Y_{21}$, $Y_{22}$, $Y_{23}$ and $Y_{24}$ each independently represent a hydrogen atom, halogen atom, alkyl group, cycloalkyl group, alkenyl group, aralkyl group, aryl group, heterocyclic group, cyano group, hydroxyl group, nitro group, amino group, alkylamino group, alkoxy group, aryloxy group, acylamino group, arylamino group, ureido group, sulfamoyl group, alkylthio group, arylthio group, alkoxycarbonylamino group, sulfonamide group, carbamoyl group, sulfamoyl group, sulfonyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group, carboxyl group or sulfo group which may further have substituents.

Preferred among these groups are hydrogen atom, halogen atom, alkyl group, aryl group, cyano group, alkoxy group, amide group, ureido group, sulfonamide group, carbamoyl group, sulfamoyl group, alkoxycarbonyl group, carboxyl group and sulfo group. Particularly preferred among these groups are hydrogen atom, halogen atom, cyano group, carboxyl group and sulfo group. Most desirable among these groups is hydrogen atom.

In the case where $Z_2$, $R_{21}$, $R_{22}$, $Y_{21}$, $Y_{22}$, $Y_{23}$ and $Y_{24}$ may further have substituents, they may further have the following substituents.

Examples of the substituents on $Z_2$, $R_{21}$, $R_{22}$, $Y_{21}$, $Y_{22}$, $Y_{23}$ and $Y_{24}$ include $C_1$-$C_{12}$ straight-chain or branched alkyl group, $C_7$-$C_{18}$ straight-chain or branched aralkyl group, $C_2$-$C_{12}$ straight-chain or branched alkenyl group, $C_2$-$C_{12}$ straight-chain or branched alkinyl group, $C_{3-12}$, straight-chain or branched cycloalkyl group, $C_3$-$C_{12}$ straight-chain or branched cycloalkenyl group (These groups each preferably have branches for the reason of dye solubility or ink stability. It is particularly preferred that these groups have asymmetric carbons. Specific examples of these groups include methyl group, ethyl group, propyl group, isopropyl group, sec-butyl group, t-butyl group, 2-ethylhexyl group, 2-methylsulfonylethyl group, 3-phenoxypropyl group, trifluoromethyl group, and cyclopentyl group), halogen atom (e.g., chlorine atom, bromine atom), aryl group (e.g., phenyl group, 4-t-butylphenyl group, 2,4-t-amylphenyl group), heterocyclic group (e.g., imidazolyl group, pyrazolyl group, triazolyl group, 2-furyl group, 2-chenyl group, 2-pyrimidinyl group, 2-benzothiazolyl group), cyano group, hydroxyl group, nitro group, carboxy group, amino group, alkyloxy group (e.g., methoxy group, ethoxy group, 2-methoxyethoxy group, 2-methanesulfohykethoxy group), aryloxy group (e.g., phenoxy group, 2-methylphenoxy group, 4-t-butylphenoxy group, 3-nitrophenoxy group, 3-t-butyloxycarbamoylphenoxy group, 3-methoxy carbamoyl group), acylamino group (e.g., acetamide group, benzamide group, 4-(3-tbutyl-4-hydroxyphenoxy) butanamide group), alkylamino group (e.g., methylamino group, butylamino group, diethylamino group, methylbutylamino group), anilino group (e.g., phenylamino group, 2-chloroanilino group), ureido group (e.g., phenylureide group, methylureide group, N,N-dibutylureide group), sulfamoylamino group (e.g., N,N-dipropylsulfamoylamino group), alkylthio group (e.g., methylthio group, octylthio group, 2-phenoxyethylthio group), arylthio group (e.g., phenylthio group, 2-butoxy-5-octylphenylthio group, 2-carboxyphenylthio group), alkyloxycarbonylamino group (e.g., methoxycarbonylamino group), sulfonamide group (e.g., methanesulfonamide group, benzene sulfonamide group, p-toluenesulfonamide group), carbamoyl group (e.g., N-ethylcarbamoyl group, N,N-dibutylcarbamoyl group), sulfamoyl group (e.g., N-ethylsulfamoyl group, N,N-dipropylsulfamoyl group, N-phenylsulfamoyl group), sulfonyl group (e.g., methanesulfonyl group, octanesulfonyl group, benzenesulfonyl group, toluenesulfonyl group), alkyloxycarbonyl group (e.g., methoxycarbonyl group, butyloxycarbonyl group), heterocyclic oxy group (e.g., 1-phenyltetrazole-5-oxy group, 2-tetrahydropyranyloxy group), azo group (e.g., phenylazo group, 4-methoxyphenylazo group, 4-pivaloylaminophenylazo group, 2-hydroxy-4-propanoylphenylazo group), acyloxy group (e.g., acetoxy group), carbamoyloxy group (e.g., N-methylcarbamoyloxy group, N-phenylcarbamoyloxy group), silyloxy group (e.g., trimethylsilyloxy group, dibutylmethylsilyloxy group), aryloxycarbonylamino group (e.g., phenoxycarbonylamino group), imide group (e.g., N-succinimide group, N-phthalimide group), heterocyclic thio group (e.g., 2-benzothiazolylthio group, 2,4-di-phenoxy-1,3,5-triazole-6-thio group, 2-pyridylthio group), sulfinyl group (e.g., 3-phenoxypropylsulfinyl group), phosphonyl group (e.g., phenoxyphosphonyl group, octyloxyphosphonyl group, phenylphosphonyl group), aryloxycarbonyl group (e.g., phenoxycarbonyl group), acyl group (e.g., acetyl group, 3-phenylpropanoyl group, benzoyl group), and ionic hydrophilic group (e.g., carboxyl group, sulfo group, phosphono group, quaternary ammonium group).

The number of ionic hydrophilic groups is preferably at least 2 per molecule of phthalocyanine-based dye. It is particularly preferred that there be contained at least two sulfo groups and/or carboxyl groups in the phthalocyanine-based dye.

The suffixes $a_{21}$ to $a_{24}$ and $b_{21}$ to $b_{24}$ each represent the number of the substituents $X_{21}$ to $X_{24}$ and $Y_{21}$ to $Y_{24}$, respectively. The suffixes $a_{21}$ to $a_{24}$ each independently represent an integer of from 0 to 4, with the proviso that the suffixes $a_1$ to $a_4$ are not 0 at the same time. The suffixes $b_{21}$ to $b_{24}$ each independently represent an integer of from 0 to 4. When any of $a_{21}$ to $a_{24}$ and $b_{21}$ to $b_{24}$ is an integer of not smaller than 2, there are a plurality of any of $X_{21}$'s to $X_{24}$'s and $Y_{21}$'s to $Y_{24}$'s. They may be the same or different.

The suffixes $a_{21}$ and $b_{21}$ satisfy the equation $a_{21}+b_{21}=4$. In a particularly preferred combination, $a_{21}$ represents 1 or 2 while $b_{21}$ represents 3 or 2. In the best combination, $a_{21}$ represents 1 while $b_{21}$, represents 3.

The combinations $a_{22}$ and $b_{22}$, $a_{23}$ and $b_{23}$, and $a_{24}$ and $b_{24}$ are similar to the combination of $a_{21}$ and $b_{21}$. Preferred examples of the combinations $a_{22}$ and $b_{22}$, $a_{23}$ and $b_{23}$, and $a_{24}$ and $b_{24}$ are also similar to that of the combination of $a_{21}$ and $b_{21}$.

M represents a hydrogen atom metal element or oxide, hydroxide or halide thereof.

Preferred examples of M other than hydrogen atom include metal elements such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi. Preferred examples of metal oxide include VO, and GeO. Preferred examples of metal hydroxide include $Si(OH)_2$, $Cr(OH)_2$, and $Sn(OH)_2$. Examples of metal halide include AlCl, $SiCl_2$, VCl, $VCl_2$, VOCl, FeCl, GaCl, and ZrCl. Preferred among these metal elements are Cu, Ni, Zn, and Al. Most desirable among these metal elements is Cu.

Pc (phthalocyanine ring) may form a diameter (e.g., Pc-M-L-M-Pe) or trimer with L (divalent connecting group) interposed therebetween. In this case, M's may be the same or different.

Preferred groups of the divalent connecting group represented by L include oxy group —O—, thio group —S—, carbonyl group —CO—, sulfonyl group —$SO_2$—, imino group —NH—, methylene group —CH2-, and group formed by combining these groups.

Referring to preferred combination of substituents on the compound represented by formula (2), the compound of formula (2) preferably has various substituents at least one of which is one of the preferred groups listed above. More preferably, more of the various substituents are the preferred groups listed above. Most preferably, all of the various substituents are the preferred groups listed above.

Preferred among the phthalocyanine dyes represented by formula (2) is a phthalocyanine dye having the structure represented by formula (2-1). The phthalocyanine dye represented by formula (2-1) which is particularly preferred in the invention will be described in detail hereinafter.

Formula (2-1):

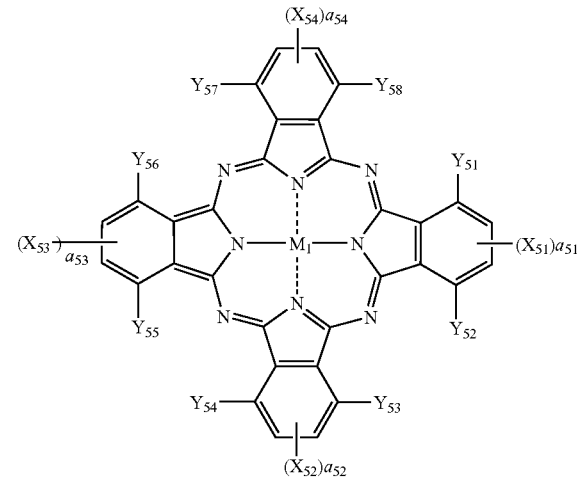

In formula (2-1), $X_{51}$ to $X_{54}$, $Y_{51}$ to $Y_{58}$ and $M_1$ are the same as $X_{21}$ to $X_{24}$, $Y_{21}$ to $Y_{24}$ and M as defined in formula (2). The suffixes $a_{51}$ to $a_{54}$ each independently represent an integer of from 1 or 2. Preferably, the sum of $a_{51}$ to $a_{54}$ is from not smaller than 4 to not greater than 6. It is particularly preferred that $a_{51}$ to $a_{54}$ be 1 at the same time.

$X_{51}$, $X_{52}$, $X_{53}$ and $X_{54}$ may be the same substituent. Alternatively, $X_{51}$, $X_{52}$, $X_{53}$ and $X_{54}$ each may be —$SO_2$—$Z_5$ in which $Z_5$ differs among $X_1$, $X_2$, $X_3$ and $X_4$. Thus, $X_{51}$, $X_{52}$, $X_{53}$ and $X_{54}$ each may be a substituent of the same kind but partially different. Alternatively, $X_{51}$, $X_{52}$, $X_{53}$ and $X_{54}$ may be different substituents, e.g., —$SO_2$—$Z_5$, —$SO_2NR_{51}R_{52}$.

Particularly preferred examples of the combination of substituents among the phthalocyanine dyes represented by formula (2-1) will be given below.

Preferably, $X_{51}$ to $X_{54}$ each independently represent —SO—$Z_5$, —$SO_2$—$Z_5$, —$SO_2NR_{51}R_{52}$ or —$CONR_{51}R_{52}$, particularly —$SO_2$—$Z_5$ or —$SO_2NR_{51}R_{52}$, most preferably —$SO_2$—$Z_5$.

$Z_5$'s each independently represent an substituted or unsubstituted alkyl group, substituted or unsubstituted aryl group or substituted or unsubstituted heterocyclic group. Most desirable among these groups are substituted alkyl group, substituted aryl and substituted heterocyclic group. Particularly for the reason of enhancement of dye solubility or fink stability, it is preferred that the substituents have asymmetric carbons (used in racemate form). Further, for the reason of enhancement of association and hence fastness, it is preferred that the substituents have a hydroxyl group, ether group, ester group, cyano group, amide group or sulfonamide group incorporated therein.

$R_{51}$ and $R_{52}$ each independently represent a hydrogen atom, substituted or unsubstituted alkyl group, substituted or unsubstituted aryl group or substituted or unsubstituted heterocyclic group, particularly a hydrogen atom, substituted alkyl group, substituted aryl group or substituted heterocyclic group. However, it is not preferred that $R_{51}$, and $R_{52}$ each are a hydrogen atom at the same time. Particularly for the reason of enhancement of dye solubility or ink stability, it is preferred that the substituents have asymmetric carbons (used in racemate form). Further, for the reason of enhancement of association and hence fastness, it is preferred that the substituents have a hydroxyl group, ether group, ester group, cyano group, amide group or sulfonamide group incorporated therein.

$Y_{51}$ to $Y_{54}$ each independently represent a hydrogen atom, halogen atom, alkyl group, aryl group, cyano group, alkoxy group, amide group, ureido group, sulfonamide group, carbamoyl group, sulfamoyl group, alkoxycarbonyl group, carboxyl group or sulfo group, particularly hydrogen atom, halogen atom, cyano group, carboxyl group or sulfo group, most preferably hydrogen atom.

The suffixes $a_{51}$ to $a_{54}$ each independently represent 1 or 2. It is particularly preferred that $a_{51}$ to $a_{54}$ each be 1 at the same time.

$M_1$ represents a, hydrogen atom, met element or oxide, hydroxide or halide thereof, particularly Cu, Ni, Zn or Al, most preferably Cu.

The phthalocyanine dye represented by formula (2-1), if it is water-soluble, preferably has an ionic hydrophilic group.

The number of ionic hydrophilic groups is preferably at least 2 per molecule of phthalocyanine-based dye. It is particularly preferred that there be contained at least two sulfo groups and/or carboxyl groups in the phthalocyanine-based dye.

Referring to preferred combination of substituents on the compound represented by formula (2-1), the compound of formula (2-1) preferably has various substituents at least one of which is one of the preferred groups listed above. More preferably, more of the various substituents are the preferred groups listed above. Most preferably, all of the various substituents are the preferred groups listed above.

Referring to the chemical structure of the phthalocyanine dye according to the invention, it is preferred that at least one electron-withdrawing group such as sulfinyl group, sulfonyl group and sulfamoyl group be incorporated in each of four benzene rings in the phthalocyanine such that up value of the substituents in the entire phthalocyanine skeleton totals not smaller than 1.6.

(Magenta Dye)

Formula (3):

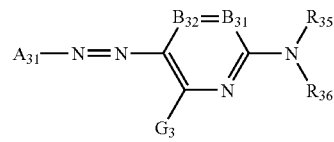

In formula (3), $A_{31}$ represents a 5-membered heterocyclic group.

$B_{31}$ and $B_{32}$ represent =$CR_{31}$— or —$CR_{32}$=, respectively. Alternatively, one of $B_{31}$ and $B_{32}$ represents a nitrogen atom and the other represents =$CR_{31}$— or —$CR_{32}$=. $R_{35}$ and $R_{36}$ each independently represent a hydrogen atom or substituent. Examples of the substituent represented by $R_{35}$ and $R_{36}$ include aliphatic groups, aromatic groups, heterocyclic groups, acyl groups, alkoxycarbonyl groups, aryoxycarbonyl groups, carbamoyl groups, alkylsulfinyl groups, arylsulfonyl groups, and sulfamoyl groups. The hydrogen atoms in these substituents may be substituted.

$G_3$, $R_{31}$, and $R_{32}$ each independently represent a hydrogen atom or substituent. Examples of the substituents represented by $G_3$, $R_{31}$ and $R_{32}$ include halogen atoms, aliphatic groups, aromatic groups, heterocyclic groups, cyano groups, carboxyl groups, carbamoyl groups, alkoxycarbonyl groups, aryloxycarbonyl groups, heterocyclic oxycarbonyl groups, acyl groups, hydroxy groups, alkoxy groups, aryloxy groups, heterocyclic oxy groups, silyloxy groups, acyloxy groups, carbamoyloxy groups, alkoxycarbonyloxy groups, aryloxycarbonyloxy groups, amino groups, acylamino groups, ureido groups, sulfamoylamino groups, alkoxycarbonylamino groups, aryloxycarbonylamino groups, alkylsulfonylamino groups, arylsulfonylamino groups, heterocyclic sulfonylamino groups, nitro groups, alkylthio groups, arylthio groups, heterocyclic thio groups, alkylsulfonyl groups, arylsulfonyl groups, heterocyclic sulfonyl groups, alkylsulfinyl groups, arylsulfinyl groups, heterocyclic sulfinyl groups, sulfamoyl groups, and sulfo groups. The hydrogen atoms in these substituents may be substituted.

$R_{31}$ and $R_{35}$ or $R_{35}$ and $R_{36}$ may be connected to each other to form a 5- or 6-membered ring.

In formula (3), $A_{31}$ represents a 5-membered heterocyclic group. Examples of the hetero atoms constituting the heterocyclic group include N, O and S atoms. The heterocyclic group represented by $A_{31}$ is preferably a nitrogen-containing 5-membered heterocyclic group to which aliphatic or aromatic rings or other heterocyclic groups may be condensed. Preferred examples of the heterocyclic group include pyrazole rings, imidazole rings, thiazole rings, isothiazole rings, thiadiazole rings, benzothiadiazole rings, benzoxazole rings, and benzoisothiazole rings. These heterocyclic groups may further contain substituents. Preferred among these substituents are pyrazole ring, imidazole ring, isothiazole ring, thiadiazole ring, benzothiazole and triazole ring represented by the following formulae (a) to (g).

In formulae (a) to (g), $R_{307}$ to $R_{322}$ represent the same substituents as represented by $G_3$, $R_{31}$ and $R_{32}$ in formula (3).

Preferred among the substituents represented by formulae (a) to (f) are pyrazole ring and isothiazole ring represented by formulae (a) and (b). Particularly preferred among these substituents is pyrazole ring represented by formula (a).

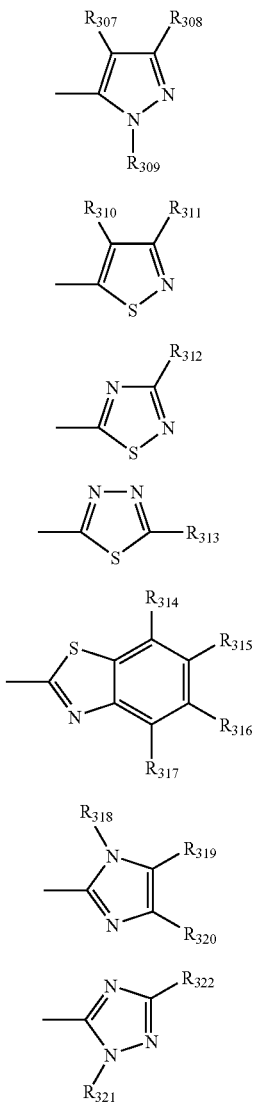

In formula (3), $B_{31}$ and $B_{32}$ represent $=CR_{31}-$ and $-CR_{32}=$, respectively. Alternatively, one of $B_{31}$ and $B_{32}$ represents a nitrogen atom and the other represents $-CR_{31}-$ or $-CR_{32}=$. Preferably, $B_{31}$ and $B_{32}$ represent $=CR_{31}-$ and $-CR_{32}=$, respectively.

$R_{35}$ and $R_{36}$ each independently represent a hydrogen atom or a substituent. Examples of the substituents represented by $R_{35}$ and $R_{36}$ include aliphatic groups, aromatic groups, heterocyclic groups, acyl groups, alkoxycarbonyl groups, aryloxycarbonyl groups, carbamoyl groups, alkylsulfonyl groups, arylsulfonyl groups, and sulfamoyl groups. The hydrogen atoms in these substituents may be substituted.

Preferred among the groups represented by $R_{35}$ and $R_{36}$ are hydrogen atom, aliphatic groups, aromatic groups, heterocyclic groups, acyl groups, alkylsulfonyl groups and arylsulfonyl groups. More desirable among these groups are hydrogen atom, aromatic groups, heterocyclic groups, acyl groups, alkylsulfonyl groups and arylsulfonyl groups. Most desirable among these groups are hydrogen atom, aryl groups and heterocyclic groups. The hydrogen atoms in these substituents may be substituted. However, $R_{35}$ and $R_{36}$ are not a hydrogen atom at the same time.

$G_3$, $R_{31}$ and $R_{32}$ each independently represent a hydrogen atom or a substituent. Examples of the substituents represented by $G_3$, $R_{31}$ and $R_{32}$ include a halogen atom or an aliphatic, aromatic, heterocyclic, cyano, carboxyl, carbamoyl, alkoxycarbonyl, aryloxycarbonyl, heterocyclic oxycarbonyl, acyl, hydroxyl, alkoxy, aryloxy, heterocyclic oxy, silyloxy, acyloxy, carbamoyloxy, alkoxycarbonyloxy, aryloxycarbonyloxy, amino, acylamino, ureido, sulfamoylamino, alkoxycarbonylamino, aryloxycarbonyl amino, alkylsulfonylamino, arylsulfonylamino, heterocyclic sulfonylamino, nitro, alkylthio, arylthio, heterocyclic thio, alkylsulfonyl, arylsulfonyl, heterocyclic sulfonyl, alkylsulfinyl, arylsulfinyl, heterocyclic sulfinyl, sulfamoyl or sulfo group. The hydrogen atoms in these substituents may be substituted.

Preferred among the groups represented by $G_3$ are hydrogen atom, halogen atom, aliphatic groups, aromatic groups, hydroxy groups, alkoxy groups, aryloxy groups, acyloxy groups heterocyclic oxy groups, amino groups, acylamino groups, ureido groups, sulfamoylamino groups, alkoxycarbonylamino groups, aryloxycarbonylamino groups, alkylthio groups, arylthio groups, and heterocyclic thio groups. More desirable among these groups are hydrogen atom, halogen atom, alkyl groups, hydroxy groups, alkoxy groups, aryloxy groups, acyloxy groups, amino groups, and acylamino groups. Most desirable among these groups are hydrogen atom, amino groups (preferably anilino group), and acylamino groups. The hydrogen atoms in these substituents may be substituted.

Preferred among the groups represented by $R_{31}$ and $R_{32}$ are hydrogen atom, alkyl groups, halogen atom, alkoxycarbonyl groups, carboxyl groups, carbamoyl groups, hydroxy groups, alkoxy groups, and cyano groups. The hydrogen atoms in these substituents may be substituted.

$R_{31}$, and $R_{35}$ or $R_{35}$ and $R_{36}$ may be connected to each other to form a 5- or 6-membered ring.

Examples of the substituents on $A_{31}$ or on the substituents by which the substituents of $R_{31}$, $R_{32}$, $R_{35}$, $R_{36}$ and $G_3$ are substituted include those listed with reference to $G_3$, $R_{31}$ and $R_{32}$.

The dye of formula (3) of the invention, if it is a water-soluble, preferably has an ionic hydrophilic group on any position on $A_{31}$, $R_{31}$, $R_{32}$, $R_{35}$, $R_{36}$ and $G_3$ as a substituent. These substituents will be described hereinafter.

Examples of the halogen atom include fluorine atom, chlorine atom and bromine atom.

The term "aliphatic group" as used herein is meant to include an alkyl group, substituted alkyl group, alkenyl group, substituted alkenyl group, alkinyl group, substituted alkinyl group, aralkyl group, and substituted all group. The term "substituted" as used in "substituted alkyl group" herein is meant to indicate that the hydrogen atoms present in "alkyl group", etc. are substituted by the substituents listed above with reference to $G_3$, $R_{31}$ and $R_{32}$.

The aliphatic group may have branches or may form a ring. The aliphatic group preferably has from 1 to 20 carbon atoms, more preferably from 1 to 16 carbon atoms. The aryl moiety of the aralkyl group or substituted aralkyl group is preferably a phenyl group or naphthyl group, particularly a phenyl group. Examples of the aliphatic group include methyl group, ethyl group, butyl group, isopropyl group, t-butyl group, hydroxyethyl group, methoxyethyl group, cyanoethyl group, trifluoromethyl group, 3-sulfopropyl group, 4-sulfobutyl group, cyclohexyl group, benzyl group, 2-phenethyl group, vinyl group, and allyl group.

The term "aromatic group" as used herein is meant to include an aryl group and substituted aryl group. The aryl group is preferably a phenyl group or naphthyl group, particularly a phenyl group. The aromatic group preferably has from 6 to 20 carbon atoms, more preferably from 6 to 16 carbon atoms.

Examples of the aromatic group include phenyl group, p-tollyl group, p-methoxyphenyl group, o-chlorophenyl group, and m-(3-sulfopropylamino)phenyl group.

The term "heterocyclic group" as used herein is meant to include substituted heterocyclic groups. The heterocyclic group may have aliphatic or aromatic rings or other heterocyclic groups condensed thereto. The heterocyclic group is preferably a 5- or 6-membered heterocyclic group. Examples of the substituents on the heterocyclic group include aliphatic groups, halogen atoms, alkylsulfonyl groups, arylsulfonyl groups, acyl groups, acylamino groups, sulfamoyl groups, carbamoyl groups, and ionic hydrophilic groups. Examples of the heterocyclic group include 2-pyridyl group, 2-chenyl group, 2-thiazolyl group, 2-benzothiazolyl group, 2-benzoxazolyl group, and 2-furyl group.

The term "carbamoyl group" as used herein is meant to include substituted carbamoyl groups. Examples of the substituents on the carbamoyl group include alkyl groups. Examples of the carbamoyl group include methylcarbamoyl group, and dimethylcarbamoyl group.

The term "alkoxycarbonyl group" as used herein is meant to include substituted alkoxycarbonyl groups. The alkoxycarbonyl group preferably has from 2 to 20 carbon atoms. Examples of the substituents on the alkoxycarbonyl group include ionic hydrophilic groups. Examples of the alkoxycarbonyl group include methoxycarbonyl group, and ethoxycarbonyl group.

The term "aryloxycarbonyl group" as used herein is meant to include substituted aryloxycarbonyl groups. The aryloxycarbonyl group preferably has from 7 to 20 carbon atoms. Examples of the substituents on the aryloxycarbonyl group include ionic hydrophilic groups. Examples of the aryloxycarbonyl group include phenoxycarbonyl group.

The term "heterocyclic oxycarbonyl group" as used herein is meant to include substituted heterocyclic oxycarbonyl groups. Examples of the heterocyclic group include those listed above with reference to the heterocyclic group. The heterocyclic oxycarbonyl group preferably has from 2 to 20 carbon atoms. Examples of the substituents on the heterocyclic oxycarbonyl group include ionic hydrophilic groups. Examples of the heterocyclic oxycarbonyl group include 2-pyridyloxycarbonyl group.

The term "acyl group" as used herein is meant to include substituted acyl groups. The acyl group preferably has from 1 to 20 carbon atoms. Examples of the substituents on the acyl group include ionic hydrophilic groups. Examples of the acyl group include acetyl group, and benzoyl group.

The term "alkoxy group" as used herein is meant to include substituted alkoxy groups. The alkoxy group preferably has from 1 to 20 carbon atoms. Examples of the substituents on the alkoxy group include alkoxy groups, hydroxyl groups, and ionic hydrophilic groups. Examples of the alkoxy group include methoxy group, ethoxy group, isopropoxy group, methoxyethoxy group, hydroxyethoxy group, and 3-carboxypropoxy group.

The term "aryloxy group" as used herein is meant to include substituted aryloxy groups. The aryoxy group preferably has from 6 to 20 carbon atoms. Examples of the substituents on the aryloxy group include alkoxy groups, and ionic hydrophilic groups. Examples of the aryloxy group include phenoxy group, p-methoxyphenoxy group, and o-methoxyphenoxy group.

The term "heterocyclic oxy group" as used herein is meant to include substituted heterocyclic oxy groups. Examples of the heterocyclic group include those listed above with reference to the heterocyclic group. The heterocyclic oxy group preferably has from 2 to 20 carbon atoms. Examples of the substituents on the heterocyclic oxy group include alkyl groups, alkoxy groups, alkoxy groups, and ionic hydrophilic groups. Examples of the heterocyclic oxy group include 3-pyridyloxy group, and 3-chenyloxy group.

The silyloxy group is preferably a $C_1$-$C_{20}$ silyloxy group having a substituted aliphatic or aromatic group. Examples of the silyloxy group include trimethylsilyloxy, and diphenylmethylsilyloxy.

The term "acyloxy group" as used herein is meant to include substituted acyloxy groups. The acyloxy group preferably has from 1 to 20 carbon atoms. Examples of the substituents on the acyloxy group include ionic hydrophilic groups. Examples of the acryloxy group include acetoxy group, and benzoyloxy group.

The term "carbamoyloxy group" as used herein is meant to include substituted carbamoyloxy groups. Examples of the substituents on the carbamoyloxy group include alkyl groups. Examples of the carbamoyloxy group include N-methylcarbamoyloxy group.

The term "alkoxycarbonyloxy group" as used herein is meant to include substituted alkoxycarbonyloxy groups. The alkoxycarbonyloxy group preferably has from 2 to 20 carbon atoms. Examples of the alkoxycarbonyloxy group include methoxycarbonyloxy group, and isopropoxy carbonyloxy group.

The term "aryloxycarbonyloxy group" as used herein is meant to include substituted aryloxycarbonyloxy groups. The aryloxycarbonyloxy preferably has from 7 to 20 carbon atoms. Examples of the aryloxycarbonyloxy group include phenoxycarbonyloxy group.

The term "amino group" as used herein is meant to include substituted amino groups. Examples of the substituents on the amino group include alkyl groups, aryl groups, and heterocyclic groups. The alkyl, aryl and heterocyclic groups may further have substituents. The term "alkylamino group" as used herein is meant to include substituted alkylamino groups. The alkylamino group preferably has from 1 to 20 carbon atoms. Examples of the substituents on the alkylamino group include ionic hydrophilic groups. Examples of the alkylamino group include methylamino group, and diethylamino group.

The term "arylamino group" as used herein is meant to include substituted arylamino groups. The arylamino group preferably has from 6 to 20 carbon atoms. Examples of the substituents on the arylamino group include halogen atoms, and ionic hydrophilic groups. Examples of the arylamino group include phenylamino group, and 2-chlorophenylamino group.

The term "heterocyclic amino group" as used herein is meant to include substituted heterocyclic amino groups. Examples of the heterocyclic group include those listed above with reference to the heterocyclic group. The heterocyclic amino group preferably has from 2 to 20 carbon atoms. Examples of the substituents on the heterocyclic amino group include alkyl groups, halogen atoms, and ionic hydrophilic groups.

The term "acylamino group" as used herein is meant to include substituted acylamino groups. The acylamino group preferably has from 2 to 20 carbon atoms. Examples of the substituents on the acylamino group include ionic hydrophilic groups. Examples of the acrylamino group include acetylamino group, propionylamino group, benzoylamino group, N-phenylacetylamino group, and 3,5-disulfobenzoylamino group.

The term "ureido group" as used herein is meant to include substituted ureido groups. The ureido group preferably has from 1 to 20 carbon atoms. Examples of the substituents on the ureido group include alkyl group, and aryl group. Examples of the ureido group include 3-methylureido group, 3,3-dimethylureido group, and 3-phenylureido group.

The term "sulfamoylamino group" as used herein is meant to include substituted sulfamoylamino groups. Examples of the substituents on the sulfamoylamino group include alkyl groups. Examples of the sulfamoylamino group include N,N-dipropylsulfamoylamino group.

The term "alkoxycarbonylamino group" as used herein is meant to include substituted alkoxycarbonylamino groups. The alkoxycarbonylamino group preferably has from 2 to 20 carbon atoms. Examples of the substituents on the alkoxycarbonylamino group include ionic hydrophilic groups. Examples of the alkoxycarbonylamino group include ethoxycarbonylamino group.

The term "aryoxycarbonylamino group" as used herein is meant to include substituted aryloxycarbonylamino groups. The aryloxycarbonylamino group preferably has from 7 to 20 carbon atoms. Examples of the substituents on the aryloxycarbonylamino group include ionic hydrophilic groups. Examples of the aryloxycarbonylamino group include phenoxycarbonyl amino group.

The term "alkylsulfonylamino group and arylsulfonylamino group" as used herein is meant to include substituted alkylsulfonylamino groups and substituted or unsubstituted arylsulfonylamino groups, respectively. The alkylsulfonylamino group and arylsulfonylamino group each preferably have from 1 to 20 carbon atoms and from 7 to 20 carbon atoms, respectively. Examples of the substituents on the alkylsulfonylamino group and arylsulfonylamino group include ionic hydrophilic groups. Examples of the alkylsulfonylamino group and arylsulfonylamino group include methylsulfonylamino group, N-phenyl-methyl sulfonylamino group, phenylsulfonylamino group, and 3 carboxyphenylsulfonylamino group.

The term "heterocyclic sulfonylamino group" as used herein is meant to include substituted heterocyclic sulfonylamino groups. The heterocyclic sulfonylamino group preferably has from 1 to 12 carbon atoms. Examples of the substituents on the heterocyclic sulfonylamino group include ionic hydrophilic groups. Examples of the heterocyclic sulfonylamino group include 2-chenylsulfonylamino group, and 3-pyridylsulfonyl amino group.

The term "alkylthio group, arylthio group and heterocyclic thio group" as used herein is meant to include substituted alkyl groups, substituted arylthio groups and substituted heterocyclic thio groups, respectively. Examples of the heterocyclic group include those listed above with reference to the heterocyclic group. The alkylthio group, arylthio group and heterocyclic thio group each preferably have from 1 to 20 carbon atoms. Examples of the substituents on the alkylthio group, arylthio group and heterocyclic thio group include ionic hydrophilic groups. Examples of the alkylthio group, arylthio group and heterocyclic thio group include methylthio group, phenylthio group, and 2-pyridylthio group.

The term "alkylsulfonyl group and arylsulfonyl group" as used herein is meant to include substituted alkylsulfonyl groups and substituted arylsulfonyl groups, respectively.

Examples of the alkylsulfonyl group and arylsulfonyl group include methylsulfonyl group and phenylsulfonyl group.

The term "heterocyclic sulfonyl group" as used herein is meant to include substituted heterocyclic sulfonyl groups. Examples of the heterocyclic group include those listed above with reference to the heterocyclic group. The heterocyclic sulfonyl group preferably has from 1 to 20 carbon atoms. Examples of the substituents on the heterocyclic sulfonyl group include ionic hydrophilic groups. Examples of the heterocyclic sulfonyl group include 2-chenylsulfonyl group and 3-pyridylsulfonyl group.

The term "alkylsulfinyl group and arylsulfinyl group" as used herein is meant to include substituted alkylsulfinyl groups and substituted arylsulfinyl groups, respectively. Examples of the alkylsulfinyl group and arylsulfinyl group include methylsulfinyl group and phenylsulfinyl group.

The term "heterocyclic sulfinyl group" as used herein is meant to include substituted heterocyclic sulfinyl groups. Examples of the heterocyclic group include those listed above with reference to the heterocyclic group. The heterocyclic sulfinyl group preferably has from 1 to 20 carbon atoms. Examples of the substituents on the heterocyclic sulfinyl group include ionic hydrophilic groups. Examples of the heterocyclic sulfinyl group include 4-pyridylsulfinyl group.

The term "sulfamoyl group" as used herein is meant to include substituted sulfamoyl groups. Examples of the substituents on the sulfamoyl group include alkyl groups. Examples of the sulfamoyl group include dimethylsulfamoyl group and di-2-hydroxyethyl) sulfamoyl group.

(Black Dye)

$$A_1-N=N-A-N=N-A_3 \qquad (4)$$

In formula (4), $A_1$, $A_2$ and $A_3$ each independently represent an aromatic or heterocyclic group which may be substituted. $A_1$ an $A_3$ each represent a monovalent group. $A_2$ is a divalent group. The azo dye represented by formula (4) is preferably a dye represented by the following formula (4-1).

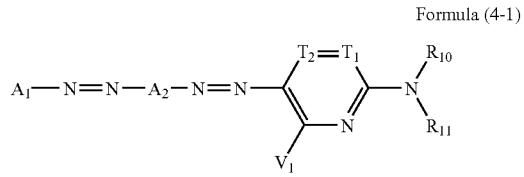

Formula (4-1)

In formula (4-1), $T_1$ and $T_2$ each represent =$CR_{12}$— or —$CR_{13}$= or one of $T_1$ and $T_2$ represents a nitrogen atom and the other represents =$CR_{12}$— or —$CR_{13}$=.

$V_1$, $R_{12}$ and $R_{13}$ each independently a hydrogen atom, halogen atom, aliphatic group, aromatic group, heterocyclic group, cyano group, carboxyl group, alkoxycarbonyl group, aryloxycarbonyl group, heterocyclic oxycarbonyl group, acyl group, hydroxyl group, alkoxy group, aryloxy group, heterocyclic oxy group, silyloxy group, acyloxy group, carbamoyloxy group, alkoxycarbonyloxy group, aryloxycarbonyloxy group, amino group (including alkylamino groups, arylamino groups and heterocyclic amino groups), acylamino group, ureido groups, sulfamoylamino group, alkoxycarbonylamino group, aryloxycarbonylamino group, alkylsulfonylamino group, arylsulfonylamino group, heterocyclic sulfonylamino group, nitro group, alkylthio group, arylthio group, heterocyclic thio group, alkylsulfonyl group, arylsulfonyl group, heterocyclic sulfonyl group, alkylsulfinyl group, arylsulfinyl group, heterocyclic sulfinyl group, sulfamoyl group or sulfo group. These groups may be further substituted.

$R_{10}$ and $R_{11}$, each independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. These groups may further have substituents.

$R_{12}$ and $R_{10}$ or $R_{10}$ and $R_{11}$ may be connected to each other to form a 5- or 6-membered ring. $A_1$ and $A_2$ are as defined formula (4).

The azo dye represented by formula (4-1) is preferably a dye represented by the following formula (4-2-1) or (4-2-2).

Formula (4-2-1):

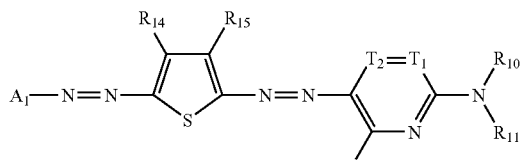

Formula (4-2-2):

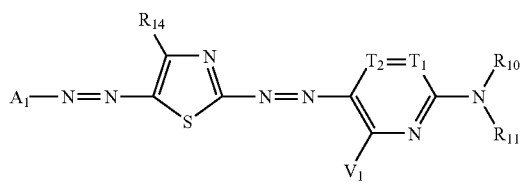

$R_{14}$ and $R_{15}$ in formulae (4-2-1) and (4-2-2) have the same meaning as $R_{12}$ in formula (4-1). $A_1$, $R_{10}$, $R_{11}$, $T_1$, $T_2$ and $V_1$ are as defied in formula (4-1).

The terms (substituents) as used in the description of formulae (4), (4-1), (4-2-1) and (4-2-2) (flue formulae (4-2-1) and (4-2-2) will be generally referred to as "formula (4-2)" hereinafter) will be described below.

Examples of the halogen atom include fluorine atom, chlorine atom, and bromine atom.

The term "aliphatic group" as used herein is meant to include an alkyl group, substituted alkyl group, alkenyl group, substituted alkenyl group, alkinyl group, substituted alkinyl group, aralkyl group and substituted aralkyl group. The aliphatic group may have branches or may form a ring. The number of carbon atoms in the aliphatic group is preferably from 1 to 20, more preferably from 1 to 16. The aryl moiety of the aralkyl group and substituted aralkyl group is preferably a phenyl group or naphthyl group, particularly phenyl group. Examples of the aliphatic group include methyl group, ethyl group, butyl group, isopropyl group, t-butyl group, hydroxyethyl group, methoxyethyl group, cyanoethyl group, trifluoromethyl group, 3-sulfopropyl group, 4-sulfobutyl group, cyclohexyl group, benzyl group, 2-phenethyl group, vinyl group, and allyl group.

The term "monovalent aromatic group" as used herein is meant to include an aryl group and substituted aryl group. The aryl group is preferably a phenyl group or naphthyl group, particularly phenyl group. The number of carbon atoms in the monovalent aromatic group is preferably from 6 to 20, more preferably from 6 to 16. Examples of the monovalent aromatic group include phenyl group, p-tollyl group, p-methoxyphenyl group, o-chlorophenyl group, and m-(3-sulfopropylamino)phenyl group. The divalent aromatic group is obtained by rendering the monovalent aromatic group divalent. Examples of such a divalent aromatic group include phenylene, p-tollylene, p-methoxyphenylene, o-chlorophenylene, m-(3-sulfopropylamino)phenylene, and naphthylene.

Examples of the heterocyclic group include substituted heterocyclic group and unsubstituted heterocyclic group. The heterocyclic group may have an aliphatic ring, aromatic ring or other heterocyclic groups condensed to its heterocyclic ring. The aforementioned heterocyclic group is preferably 5- or 6-membered heterocyclic group. Examples of the hetero atoms constituting the heterocyclic group include N, O, and S. Examples of the substituents on the aforementioned heterocyclic group include aliphatic group, halogen atom, alkylsulfonyl group, arylsulfonyl group, acyl group, acylamino group, sulfamoyl group, carbamoyl group, and ionic hydrophilic group. Specific examples of the monovalent heterocyclic group include 2-pyridyl group, 2-chenyl group, 2-thiazolyl group, 2-benzothiazolyl group, 2-benzoxazoyl group, and 2-furyl group. The divalent heterocyclic group is a bond obtained by removing the hydrogen atom from the aforementioned monovalent heterocyclic group.

Examples of the carbamoyl group include substituted carbamoyl group and unsubstituted carbamoyl group. Examples of the substituents on the carbamoyl group include alkyl group. Examples of the aforementioned carbamoyl group include methylcarbamoyl group, and dimethylcarbamoyl group.

Examples of the alkoxycarbonyl group include substituted alkoxycarbonyl group and unsubstituted alkoxycarbonyl group. The alkoxycarbonyl group is preferably a $C_2$-$C_{20}$ alkoxycarbonyl group. Examples of the substituents on the alkoxycarbonyl group include ionic hydrophilic group. Examples of the alkoxycarbonyl group include methoxycarbonyl group, and ethoxycarbonyl group.

Examples of the aryloxycarbonyl group include substituted aryloxycarbonyl group and unsubstituted aryloxycarbonyl group. The aryloxycarbonyl group is preferably a $C_7$-$C_{20}$ aryloxycarbonyl group. Examples of the substituents on the aryloxycarbonyl group include ionic hydrophilic group. Examples of the aryloxycarbonyl group include phenoxycarbonyl group.

Examples of the heterocyclic oxycarbonyl group include substituted heterocyclic oxycarbonyl group and unsubstituted heterocyclic oxycarbonyl group. The heterocyclic oxycarbonyl group is preferably a $C_2$-$C_{20}$ heterocyclic oxycarbonyl group. Examples of the substituents on the heterocyclic oxycarbonyl group include ionic hydrophilic group. Examples of the heterocyclic oxycarbonyl group include 2-pyridyloxy carbonyl group.

Examples of the acyl group include substituted acyl group and unsubstituted acyl group. The acyl group is preferably a $C_1$-$C_{20}$ acyl group. Examples of the substituents on the acyl group include ionic hydrophilic group. Examples of the acyl group include acetyl group, and benzoyl group.

Examples of the alkoxy group include substituted alkoxy group and unsubstituted alkoxy group. The alkoxy group is preferably a $C_1$-$C_{20}$ alkoxy group. Examples of the substituents on the alkoxy group include alkoxy group, hydroxyl group, and ionic hydrophilic group. Examples of the alkoxy group include methoxy group, ethoxy group, isopropoxy group, methoxyethoxy group, hydroxyethoxy group, and 3-carboxypropoxy group.

Examples of the aryloxy group include substituted aryloxy group and unsubstituted aryloxy group. The aryloxy group is preferably a $C_6$-$C_{20}$ aryloxy group. Examples of the substituents on the aryloxy group include alkoxy group, and ionic hydrophilic group. Examples of the aryloxy group include phenoxy group, p-methoxyphenoxy group, and o-methoxyphenoxy group.

Examples of the heterocyclic oxy group include substituted heterocyclic oxy group and unsubstituted heterocyclic oxy group. The heterocyclic oxy group is preferably a $C_2$-$C_{20}$ heterocyclic oxy group. Examples of the substituents on the heterocyclic oxy group include alkyl group, alkoxy group, and ionic hydrophilic group. Examples of the heterocyclic oxy group include 3-pyridyloxy group, and 3-chenyloxy group.

The silyloxy group is preferably a $C_1$-$C_{20}$ silyloxy group substituted by an aliphatic group or aromatic group. Examples of the silyloxy group include trimethylsilyloxy, and diphenylmethylsilyloxy.

Examples of the acyloxy group include substituted acyloxy group and unsubstituted acyloxy group. The acyloxy group is preferably a $C_1$-$C_{20}$ acyloxy group.

Examples of the substituents on the acyloxy group include ionic hydrophilic group. Examples of the acyloxy group include acetoxy group, and benzoyloxy group.

Examples of the carbamoyloxy group include substituted carbamoyloxy group and unsubstituted carbamoyloxy group. Examples of the substituents on the carbamoyloxy group include alkyl group. Examples of the carbamoyloxy group include N-methylcarbamoyloxy group.

Examples of the alkoxycarbonyloxy group include substituted alkoxycarbonyloxy group and unsubstituted alkoxycarbonyloxy group. The alkoxycarbonyloxy group is preferably a $C_1$-$C_{20}$ alkoxycarbonyloxy group. Examples of the alkoxycarbonyloxy group include methoxy carbonyloxy group, and isopropoxycarbonyloxy group.

Examples of the aryloxycarbonyloxy group include substituted aryloxycarbonyloxy group and unsubstituted aryloxycarbonyloxy group. The aryloxycarbonyloxy group is preferably a $C_7$-$C_{20}$ aryloxycarbonyloxy group. Examples of the aryloxycarbonyloxy group include phenoxycarbonyloxy group.

Examples of the amino group include amino groups substituted by alkyl group, aryl group or heterocyclic group which may further have substituents. The alkyl group is preferably a $C_1$-$C_{20}$ alkylamino group. Examples of the substituents on the alkylamino group include ionic hydrophilic group. Examples of the alkylamino group include methylamino group, and diethylamino group.

Examples of the arylamino group include substituted arylamino group and unsubstituted arylamino group. The arylamino group is preferably a $C_6$-$C_{20}$ arylamino group. Examples of the substituents on the arylamino group include halogen atom, and ionic hydrophilic group.

Examples of the arylamino group include anilino group, and 2-chlorophenylamino group.

Examples of the heterocyclic amino group include substituted heterocyclic amino group and unsubstituted heterocyclic amino group. The heterocyclic amino group is preferably a $C_2$-$C_{20}$ heterocyclic amino group. Examples of the substituents on the heterocyclic amino group include alkyl group, halogen atom and ionic hydrophilic group.

Examples of the acylamino group include substituted acylamino group and unsubstituted acylamino group. The acylamino group is preferably a $C_2$-$C_{20}$ acylamino group. Examples of the substituents on the acylamino group include ionic hydrophilic group. Examples of the acylamino group include acetylamino group, propionylamino group, benzoylamino group, N-phenylacetylamino group, and 3,5-sulfobenzoylamino group.

Examples of the ureido group include substituted ureido group and unsubstituted ureido group. The ureido group is preferably a $C_1$-$C_{20}$ ureido group. Examples of the substituents on the ureido group include alkyl group, and aryl group. Examples of the ureido group include 3-methylureido group, 3,3-dimethylureido group, and 3-phenylureido group.

Examples of the sulfamoylamino group include substituted sulfamoylamino group and unsubstituted sulfamoylamino group. Examples of the substituents on the sulfamoylamino group include alkyl group. Examples of the sulfamoylamino group include N,N-dipropyl sulfamoylamino group.

Examples of the alkoxycarbonylamino group include substituted alkoxycarbonylamino group and unsubstituted alkoxycarbonylamino group. The alkoxycarbonylamino group is preferably a $C_2$-$C_{20}$ alkoxycarbonylamino group. Examples of the substituents on the alkoxycarbonylamino group include ionic hydrophilic group. Examples of the alkoxycarbonylamino group include ethoxycarbonylamino group.

Examples of the aryloxycarbonylamino group include substituted aryloxycarbonylamino group and unsubstituted aryloxycarbonylamino group. The aryloxycarbonylamino group is preferably a $C_7$-$C_{20}$ aryloxycarbonylamino group. Examples of the substituents on the aryloxycarbonylamino group include ionic hydrophilic group. Examples of the aryloxycarbonylamino group include phenoxycarbonylamino group.

Examples of the alkylsulfonylamino group and arylsulfonylamino group include substituted alkylsulfonylamino group, unsubstituted alkylsulfonylamino group, substituted arylsulfonylamino group, and unsubstituted arylsulfonylamino group. The sulfonylamino group is preferably $C_1$-$C_{20}$ sulfonylamino group. Examples of the substituents on the sulfonylamino group include ionic hydrophilic group. Examples of the sulfonylamino group include methylsulfonylamino group, N-phenyl-methyl sulfonylamino group, phenylsulfonylamino group, and 3-carboxyphenylsulfonylamino group.

Examples of the heterocyclic sulfonylamino group include substituted heterocyclic sulfonylamino group and unsubstituted heterocyclic sulfonylamino group. The heterocyclic sulfonylamino group is preferably a $C_1$-$C_{12}$ heterocyclic sulfonylamino group. Examples of the substituents on the heterocyclic sulfonylamino group include ionic hydrophilic group. Examples of the heterocyclic sulfonylamino group include 2-chenylsulfonylamino group, and 3-pyridylsulfonyl amino group.

Examples of the hereinafter sulfonyl group include substituted heterocyclic sulfonyl group and unsubstituted heterocyclic sulfonyl group. The hereinafter sulfonyl group is preferably a $C_1$-$C_{20}$ heterocyclic sulfonyl group. Examples of the substituents on the heterocyclic sulfonyl group include ionic hydrophilic group. Examples of the heterocyclic sulfonyl group include 2-thiophenesulfonyl group, and 3-pyridinesulfonyl group.

Examples of the hereinafter sulfinyl group include substituted heterocyclic sulfinyl group and unsubstituted heterocyclic sulfinyl group. The hereinafter sulfinyl group is preferably a $C_1$-$C_{20}$ heterocyclic sulfinyl group. Examples of the substituents on the heterocyclic sulfinyl group include ionic hydrophilic group. Examples of the heterocyclic sulfinyl group include 4-pyridinesulfonyl) group.

Examples of the alkylthio group, arylthio group and heterocyclic thio group include substituted alkylthio group, unsubstituted alkylthio group, substituted arylthio group, unsubstituted arylthio group, substituted heterocyclic thio group, and unsubstituted heterocyclic thio group. The alkylthio group, arylthio group and heterocyclic thio group each preferably have from 1 to 20 carbon atoms. Examples of the substituents on the alkylthio group, arylthio group and heterocyclic thio group include ionic hydrophilic group.

Examples of the alkylthio group, arylthio group, and heterocyclic thio group include methylthio group, phenylthio group, and 2-pyridyl group.

Examples of the alkylsulfonyl group and arylsulfonyl group include substituted alkylsulfonyl group, unsubstituted alkylsulfonyl group, substituted arylsulfonyl group, and unsubstituted arylsulfonyl group. Examples of the alkylsulfonyl group and arylsulfonyl group include methylsulfonyl group, and phenylsulfonyl group.

Examples of the alkylsulfinyl group and arylsulfinyl group include substituted alkylsulfinyl group, unsubstituted alkylsulfinyl group, substituted arylsulfinyl group, and unsubstituted arylsulfinyl group. Examples of the alkylsulfinyl group and arylsulfinyl group include methylsulfinyl group, and phenylsulfinyl group.

Examples of the sulfamoyl group include substituted sulfamoyl group and unsubstituted sulfamoyl group. Examples of the substituents on the sulfamoyl group include alkyl group. Examples of the sulfamoyl group include dimethylsulfamoyl group, and di-2-hydroxyethyl)sulfamoyl group.

The dyes represented by formulae (1) to (4), if they are used as water-soluble dye, preferably each have at least one ionic hydrophilic group per molecule. Examples of the ionic hydrophilic group include sulfo group, carboxyl group, phosphono group, and quaternary ammonium group. Preferred among these ionic hydrophilic groups are carboxyl group, phosphono group, and sulfo group. In particular, at least one of the ionic hydrophilic groups to be incorporated is most preferably a carboxyl group. The carboxyl group, phosphono group and sulfo group may be used in the form of salt. Examples of the counter ion forming the salt include ammonium ion, alkaline metal ion (e.g., lithium ion, sodium ion, potassium ion), and organic cation (e.g., tetramethylammonium ion, tetramethylguanidium ion, tetramethylphosphonium ion). Preferred among these counter ions are alkaline metal salt ions.

Because of its high image durability, the ink composition of the invention can be used in various image recording methods. As an imaging dye, the ink composition of the invention can find wide application and use in photographic light-sensitive materials, sublimable heat transfer materials, heat-sensitive pressure-sensitive recording materials, inkjet recording methods, etc. Preferred among these applications is ink for inkjet recording.

In the case where the ink composition of the invention is used as an ink for inkjet recording (hereinafter referred to as "ink"), an ink set comprising at least three color inks is needed to allow the combination of various colors for full-color recording. The ink set preferably comprises at least one ink composition of the invention.

In the case where the ink composition and ink set of the invention are used in inkjet recording method, it is preferred that the ink be entirely or partly received in an ink cartridge. As such an ink cartridge there may be used any type of ink cartridge such as type that utilizes a sponge to supply ink continuously and type that uses a plunger pump to supply ink. For the ink composition of the invention, there is preferably used an ink cartridge the inner pressure of which is kept lower the atmospheric pressure in the initial stage.

Since it is normally thought that the atmospheric pressure may vary from 980 hPa to 1,040 hPa, it is preferred that the inner pressure of the cartridge be kept at a range of from 600 to 980 hPa, preferably from 700 to 960 hPa, particularly from 800 to 950 hPa.

In the case of the ink cartridge of the type that utilizes the pressure of a sponge packed therein to supply ink continuously, the sponge is preferably made of an urethane-based polymer.

Examples of the water-soluble dyes include direct dye, acidic dye, food dye, basic dye, and reactive dye. Preferred examples of these water-soluble dyes include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, 247, C.I. Direct Violet 7, 9, 47, 48, 51, 66, 90, 93, 94, 95, 98, 100, 101, C.I. Direct Yellow 8, 9, 11, 12, 27, 28, 29, 33, 35, 39, 41, 44, 50, 53, 58, 59, 68, 86, 87, 93, 96, 98, 100, 108, 109, 110, 130, 132, 142, 144, 161, 163, C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291, C.I. Direct Black 9, 17, 19, 22, 32, 51, 56, 62, 69, 77, 80, 91, 94, 97, 108, 112, 113, 114, 117, 1.18, 121, 122, 125, 132, 146, 154, 166, 168, 173, 199, C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397, C.I. Acid Violet 5, 34, 43, 47, 48, 90, 103, 126, C.I. Acid yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227, C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326, C.I. Acid Black 7, 24, 29, 48, 52:1, 172, C.I. Reactive Red 3, 13, 17, 19, 21, 22, 23, 24, 29, 35, 37, 40, 41, 43, 45, 49, 55, C.I. Reactive Violet 1, 3, 4, 5, 6, 7, 8, 9, 16, 17, 22, 23, 24, 26, 27, 33, 34, C.I. Reactive Yellow 2, 3, 13, 14, 15, 17, 18, 23, 24, 25, 26, 21, 29, 35, 37, 41, 42, C.I. Reactive Blue 2, 3, 5, 8, 10, 13, 14, 15, 17, 18, 19, 21, 25, 26, 27, 28, 29, 38, C.I. Reactive Black 4, 5, 8, 14, 21, 23, 26, 31, 32, 34, C.I. Basic Red 12, 13, 14, 15, 18, 22, 23, 24, 25, 27, 29, 35, 36, 38, 39, 45, 46, C.I. Basic Violet 1, 2, 3, 7, 10, 15, 16, 20, 21, 25, 27, 28, 35, 37, 39, 40, 48, C.I. Basic Yellow 1, 2, 4, 11, 13, 14, 15, 19, 21, 23, 24, 25, 28, 29, 32, 36, 39, 40, C.I. Basic Blue 1, 3, 5, 7, 9, 22, 26, 41, 45, 46, 47, 54, 57, 60, 62, 65, 66, 69, 71, and C.I. Basic Black 8.

The ink set of the invention may comprise pigments incorporated therein.

As these pigments there may be used commercially available products as well as known compounds listed in various literatures. Examples of these literatures include Color Index (compiled by The Society of Dyers and Colourists), "Kaitei Shinban Ganryo Binran (Revised Edition of Handbook of Pigments)", compiled by Japan Association of Pigment Technology, 1989, "Saishin Ganryo Ouyou Gijutsu (Modern Applied Technology of Pigments)", CMC, 1986, "Insatsu Inki Gijutsu (Printing Ink Technology)", CMC, 1984, and W. Herbst, K. Hunger, "Industrial Organic Pigments", VCH Verlagsgesellschaft, 1993. Specific examples of these pigments include organic pigments such as azo pigment (e.g., azo lake pigment, insoluble azo pigment, condensed azo pigment, chelate azo pigment), polycyclic pigment (e.g., phthalocyanine pigment, anthraquinone-based pigment, perylene-based pigment, perynone-based pigment, indigo-based pigment, quinacridone-based pigment, dioxazine-based pigment, isoindolinone-based pigment, quinophthalone-based pigment, diketopypyrrolopyrrole-based pigment), dyed lake pigment (e.g., acidic or basic dye lake pigment) and azine pigment, and inorganic pigments such as yellow pigment (e.g., C.I. Pigment Yellow 34, 37, 42, 53), red pigment (e.g., C.I. Pigment Red 101, 108), blue pigment (e.g., C.I. Pigment blue 27, 29, 17:1), black pigment (e.g., C.I. Pigment Black 7, magnetite) and white pigment (e.g., C.I. Pigment White 4, 6, 18, 21).

As a pigment having a color tone suitable for image formation there is preferably used a blue or cyan pigment such as phthalocyanine pigment, anthraquinone-based indanthrone pigment (e.g., C.I. Pigment Blue 60) and dyed lake pigment-based triarylcarbonium pigment, particularly phthalocyanine pigment (Preferred examples of the phthalocyanine pigment include copper phthalocyanine such as C.I. Pigment Blue 15:1, 15:2, 15:3, 15:4 and 15:6, monochlorophthalocyanine, low chlorination copper phthalocyanine, aluminum phthalocyanine such as pigment listed in European Patent 860475, metal-free phthalocyanine such as C.I. Pigment Blue 16, and phthalocyanine having Zn, Ni or Ti as a central metal. Particularly preferred among these phthalocyanine dyes are C.I. Pigment Blue 15:3, 15:4, and aluminum phthalocyanine).

Preferred examples of red or purple pigments include azo pigments (Preferred examples of these dyes include C.I. Pigment Red 3, 5, 11, 22, 38, 48:1, 48:2, 48:3, 48:4, 49:1, 52:1, 53:1, 57:1, 63:2, 144, 146, 184. Particularly preferred among these dyes are C.I. Pigment Red 57:1, 146, 184), quinacridone-based pigments (Preferred examples of these dyes include C.I. Pigment Red 122, 192, 202, 207, 209, and C.I. Pigment Violet 19, 42. Particularly preferred among these dyes is C.I. Pigment Red 122), dyed lake-based triarylcarbonium pigments (Preferred examples of these dyes include xanthene-based C.I. Pigment Red 81:1, C.I. Pigment Violet 1, 2, 3, 27, 39), dioxazine-based pigments (e.g., C.I. Pigment Violet 23, 37), diketopyrrolopyrrole-based pigments (e.g., C.I. Pigment Red 254), perylene pigments (e.g., C.I. Pigment Violet 29), anthraquinone-based pigments (e.g., C.I. Pigment Violet 5:1, 31, 33), and thioindigo-based pigments (e.g., C.I. Pigment Red 38, 88).

Preferred examples of yellow pigments include azo pigments (Preferred examples of these dyes include monoazo pigment-based dyes such as C.I. Pigment Yellow 1, 3, 74, 98, disazo pigment-based dyes such as C.I. Pigment Yellow 12, 13, 14, 16, 17, 83, general azo-based dyes such as C.I. Pigment Yellow 93, 94, 95, 128, 155 and benzimidazolone-based dyes such as C.I. Pigment Yellow 120, 151, 154, 156, 180. Particularly preferred among these dyes are those prepared from materials other than benzidine-based compounds), isoindoline-isoindolinone-based pigments (Preferred examples of these dyes include C.I. Pigment Yellow 109, 110, 137, 139), quinophthalone pigments (Preferred examples of these dyes include C.I. Pigment Yellow 138), and flavanthrone pigment (e.g., C.I. Pigment Yellow 24).

Preferred examples of black pigments include inorganic pigments (Preferred examples of these pigments include carbon black, and magnetite), and aniline black.

Other examples of pigments employable herein include orange pigments (C.I. Pigment Orange 13, 16), and green pigments (C.I. Pigment Green 7).

The pigments to be incorporated in the ink set may be used untreated as mentioned above or may be subjected to surface treatment before use. As surface treatment methods there may be proposed a method involving surface coat with a resin or wax, a method involving the attachment of a surface activator, and a method involving the bonding of a reactive material (e.g., silane coupling agent, radical produced from an epoxy compound, polyisocyanate or diazonium salt) to the surface of pigment. For the details of these methods, reference can be made to the following literatures and patents.

(1) Kinzoku Sekken no Seishitsu to Ouyou (Properties and Application of Metal Soap) (Saiwai Shobo)
(2) Insatsu Inki Insatsu (Printing with Printing Ink) (CMC Shuppan, 1984)
(3) Saishin Ganryo Ouyou Gijutsu (Modern Applied Technology of Pigments (CMC, 1986)
(4) U.S. Pat. Nos. 5,554,739, 5,571,311
(5) JP-A-9-151342, JP-A-10-140065, JP-A-10-292143, JP-A-11-166145

In particular, self-dispersible pigments prepared by reacting the diazonium salt disclosed in the US patents (4) with carbon black and capsulized pigments prepared according to the method disclosed in the Japanese patents (5) are useful to obtain dispersion stability without using extra dispersant in the ink.

In the invention, the pigment may be further dispersed with a dispersant. As such a dispersant there may be used any of known compounds depending on the pigment used. For example, a surface active agent type low molecular dispersant or polymer type dispersant may be used. Examples of these dispersants include those disclosed in JP-A-3-69949 and European Patent 549,486. In order to accelerate the adsorption of the pigment to the dispersant used, a pigment derivative called synergist may be added.

The particle diameter of the pigment thus dispersed is preferably from 0.01 μm to 10 μm, more preferably from 0-05 μm to 1 μm.

As a method for dispersing the pigment there may be used a known dispersion technique for use in the production of ink or toner. Examples of the dispersing machine employable herein include vertical or horizontal agitator mill, attritor, colloid mill, ball mill, three-roll mill, pearl mill, super mill, impeller, disperser, KD mill, dynatron, and pressure kneader. For the details of these dispersing machines, reference can be made to "Saishin Ganryo Ouyou Gijutsu (Modern Applied Technology of Pigments)", CMC, 1986.

As the water-soluble dye to be incorporated in the ink composition of the invention there is preferably used a magenta dye disclosed in JP-A-2002-371214, a phthalocyanine dye disclosed in JP-A-2002-309118 or a water-soluble phthalocyanine dye disclosed in JP-A-2003-12952 and JP-A-2003-12956.

The ink composition of the invention can be prepared by incorporating the dye in an aqueous medium. As a method of incorporating the dye in an aqueous medium there may be used dissolution and/or dispersion. The term "aqueous medium" as used herein is meant to indicate water optionally mixed with a solvent such as water-miscible organic solvent.

As the aforementioned water-miscible organic solvent employable herein there may be used a material having a function such as drying inhibitor, penetration accelerator and wetting agent for ink for inkjet recording in the art. A high boiling water-miscible organic solvent is mainly used. Examples of such a compound include alcohols (e.g., methanol, ethanol, propanol, isopropanol, butanol, isobutanol, sec-butanol, t-butanol, pentanol, hexanol, cyclohexanol, benzyl alcohol), polyvalent alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate ethylene glycol monomethyl ether acetate triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyl diethanolamine, morpholine, N-ethylmorpholine, ethylene diamine, diethylene triamine, triethylene tetramine, polyethyleneimine, tetramethylpropylene diamine), and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-ozolidone, 1,3-dimethyl-2-imidazolidinone, acetonitrile, acetone). Two or more of the water-miscible organic solvents may be used in combination.

Particularly preferred among these water-miscible solvents are alcohol-based solvents. The ink composition of the invention preferably comprises a water-miscible organic solvent having a boiling point of 150° C. or more incorporated therein. For example, 2-pyrrolidone, which is listed above, may be used.

These water-miscible organic solvents are preferably incorporated in the ink composition in a total amount of from 5 to 60% by weight, particularly from 10 to 45% by weight.

In order to prepare the ink composition of the invention, the aforementioned dye, if it is water-soluble, is preferably dissolved in water at first. To the aqueous solution of dye are then added various solvents and additives. The mixture is then stirred to cause dissolution. Thus, a uniform ink composition is obtained.

The dissolution of these components can be attained by various methods such as dissolution by agitation, dissolution by ultrasonic radiation and dissolution by shaking. Preferred among these methods is agitation method. Agitation can be attained by various methods known in the art such as fluid agitation and agitation utilizing shearing force developed by reverse agitator or dissolver. On the other hand, an agitation method utilizing a shearing force with respect to the bottom of a vessel such as magnetic stirrer is preferably used as well.

The ink composition of the invention may comprise a surface active agent incorporated therein to adjust the physical properties thereof making it possible to exert an excellent effect of enhancing the ejection stability thereof and the water resistance of image and preventing the bleeding of printed image.

Examples of the surf active agent employable herein include anionic surface active agents such as sodium dodecylsulfate, sodium dodecyloxysulfonate and sodium alkylbenzenesulfonate, cationic surface active agents such as cetylpyridinium chloride, trimethylacetyl ammonium chloride and tetrabutyl ammonium chloride, and nonionic surface active agents such as polyoxyethylene nonyl phenyl ether, polyoxyethylene naphthyl ether and polyoxyethylene octyl phenyl ether. Particularly preferred among these surface active agents are nonionic surface active agents.

The content of the surface active agent is from 0.001 to 20% by weight, preferably from 0.005 to 10% by weight, more preferably from 0.01 to 5% by weight based on the weight of the ink composition.

In the case where the aforementioned dye is oil-soluble, the ink composition of the invention can be prepared by dissolving the oil-soluble dye in a high boiling organic solvent and then emulsion-dispersing the solution in an aqueous medium.

The high boiling organic solvent to be used in the ink composition of the invention preferably has a boiling point of 150° C. or more, preferably 170° C. or more.

Examples of the high boiling organic solvent employable herein include phthalic acid esters (e.g., dibutyl phthalate, dioctyl phthalate, dicyclohexyl phthalate, di-2-ethylhexyl phthalate, decyl phthalate, bis(2,4-di-tert-amylphenyl)isophthalate, bis(1,1-ethylpropyl)phthalate), phosphoric or phosphonic acid esters (e.g., diphenyl phosphate, triphenyl phosphate, tricresyl phosphate, 2-ethylhexyl diphenyl phosphate, dioctyl butyl phosphate, tricyclohexyl phosphate, tri-2-ethylhexyl phosphate, tridodecyl phosphate, di-2-ethylhexyl phenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecaneamide, N,N-diethyl laurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chlorinated paraffins (e.g., paraffins having a chlorine content of from 10% to 80%), trimesic acid esters (e.g., tributyl trimesate), dodecyl benzene, diisopropylene naphthalene, phenols (e.g., 2,4-di-tert-amylphenol, 4-dodecyloxyphenol, 4-dodecyloxycarbonylphenol, 4-4-dodecyloxy phenylsulfonyl)phenol), carboxylic acids (e.g., 2-(2,4-di-tert-amylphenoxybutyric acid, 2-ethoxyoctanedecanoic acid), and alkylphosphoric acids (e.g., di-2(ethylhexyl)phosphoric acid, diphenyl phosphoric acid). The high boiling organic solvent may be used in an amount of from 0.01 to 3 times, preferably from 0.01 to 1.0 times that of the oil-soluble dye.

These high boiling organic solvents may be used singly or in admixture of two or more thereof (e.g., tricresyl phosphate and dibutyl phthalate, trioctyl phosphate and di(2-ethylhexyl) sebacate, dibutyl phthalate and poly(N-t-butylacrylamide)).

For examples of compounds other than the aforementioned high boiling organic solvents to be used in the ink composition of the invention and/or methods for the synthesis of these high boiling organic solvents, reference can be made to U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, 5,013,639, European Patents 276,319A, 286,253A, 289,820A, 309,158A, 309,159A, 309,160A, 509,311A, 510,576A, East German Patents 147,009, 157,147, 159,573, 225,240A, British Patent 2,091,124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-24239, JP-A-243541, JP-A-4-29237, JP-A-4-30165, JP-A-4-232946, and JP-A-4-346338.

The aforementioned high boiling organic solvents are used in an amount of from 0.01 to 3.0 times, preferably from 0.01 to 1.0 times that of the oil-soluble dye by weight.

In order to prepare the ink composition of the invention, the oil-soluble dye or the high boiling organic solvent are used in the form of emulsion dispersion in an aqueous medium. During emulsion dispersion, a low boiling organic solvent may be used in some cases from the standpoint of emulsifiability. As such a low boiling organic solvent there may be used an organic solvent having a boiling point of from about 30° C. to 150° C. at atmospheric pressure. Preferred examples of the organic solvent employable herein include esters (e.g., ethyl acetate, butyl acetate, ethyl propionate, β-ethoxyethyl acetate, methyl cellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone), and ethers (e.g., tetrahydrofurane, dioxane). However, the invention is not limited to these organic solvents.

The emulsion dispersion is effected to disperse an oil phase having a dye dissolved in a high boiling organic solvent optionally mixed with a low boiling organic solvent in an aqueous phase mainly composed of water and make minute oil droplets of oil phase. During this procedure, additives such as surface active agent, wetting agent, dye stabilizer, emulsion stabilizer, preservative and antifungal agent described later may be added to either or both of the aqueous phase and the oil phase as necessary.

The emulsification is normally accomplished by adding the oil phase to the aqueous phase. Alternatively, a so-called phase inversion emulsification method involving the dropwise addition of an aqueous phase to an oil phase is preferably used. The aforementioned emulsification method may be used also when the dye is water-soluble and the additives are oil-soluble.

The emulsion dispersion of the invention may be effected with various surface active agents. Preferred examples of the surface active agents employable herein include anionic surface active agents such as aliphatic acid salt, alkylsulfuric acid ester, alkylbenzenesulfonate, alkylnaphthalenesulfonate, dialkylsulfosuccinate, alkylphosphoric acid ester, naphthalenesulfonic acid-formalin condensate and polyoxyethylenealkylsulfuric acid ester, and nonionic surface active agents such as polyoxyethylenealkyl ether, polyoxyethylenealkylallyl ether, polyoxyethylene aliphatic acid ester, sorbitanaliphatic acid ester, polyoxyethylenesorbitanaliphatic acid ester, polyoxyethylenealkylamine, glycerinaliphatic acid ester and oxyethyleneoxypropylene block copolymer. Alternatively, SURFYNOLS (produced by Air Products & Chemicals Inc.), which are acetylene-based polyoxyethylene oxide surface active agents, are preferably used as well. Further, amine oxide-based amphoteric surface active agents such as N,N-dimethyl-N-alkylamine oxide may be used. Those listed as surface active agents in JP-A-59-157636, pp. 37-38, and Research Disclosure No. 308119 (1989) may be used.

For the purpose of stabilizing the ink shortly after emulsification, the aforementioned surface active agents may be used in combination with a water-soluble polymer. This water-soluble polymer is preferably a polymer of the invention but may be different from the polymer of the invention. As such a water-soluble polymer there may be preferably used a polyvinyl alcohol, polyvinyl pyrrolidone, polyethylene oxide, polyacrylic acid, polyacrylamide or copolymer thereof. Further, natural water-soluble polymers such as polysaccharides, casein and gelatin may be preferably used. For the purpose of stabilizing the dye dispersion, polyvinyls obtained by the polymerization of acrylic acid esters, methacrylic acid esters, vinyl esters, acrylamides, methacrylamides, olefins, styrenes, vinylethers or acrylonitriles, polyurethanes, polyesters, polyamides, polyureas, polycarbonates, etc., which are substantially insoluble in an aqueous medium, may be used. These polymers preferably have $—SO_3^-$ or $—COO^-$. In the case where these polymers substantially insoluble in an aqueous medium are used, they are preferably used in an amount of not greater than 20% by weight, preferably not greater than 10% by weight based on the amount of the high boiling organic solvent.

In the case where emulsion dispersion is effected to disperse the hydrophobic dye in the solvent to make an aqueous ink, a particularly important factor is control over the particle size of the aqueous ink. In order to enhance the color purity or density during the formation of an image by ink ejection, it is essential to reduce the average particle size. The volume-average particle diameter of the aqueous ink is preferably 1 µm or less, more preferably from not smaller than 5 nm to not greater than 100 nm.

The measurement of the volume-average particle diameter and the particle size distribution of the dispersed particles can be easily accomplished by any known method such as static light scattering method, dynamic light scattering method, centrifugal sedimentation method and method as disclosed in "Jikken Kagaku Koza (Institute of Experimental Chemistry)", 4th ed., pp. 417-418. For example, measurement can be easily carried out by diluting the ink with distilled water such that the particle concentration in the ink reaches 0.1% to 1% by weight, and then subjecting the solution to measurement using a commercially available volume-average particle diameter measuring instrument (e.g., Microtrack UPA (produced by NIKKISO CO, LTD.). Further, dynamic light scattering method utilizing laser doppler effect is particularly preferred because it is capable of measuring even small particle size.

The term "volume-average particle diameter" as used herein is meant to indicate average particle diameter weighted with particle volume, which is obtained by dividing the sum of the product of the diameter and the volume of individual particles in the aggregate of particles by the total volume of the particles. For the details of volume-average particle diameter, reference can be made to Souichi Muroi, "Koubunshi Ratekkusu no Kagaku (Chemistry of Polymer Letexes)", Koubunshi Kankokai, page 119.

It was also made obvious that the presence of coarse particles has an extremely great effect on the printing properties. In other words, coarse particles clog the head nozzle. Even if coarse particles do not go so far as to clog the head nozzle, the ink cannot be ejected or can be deviated when ejected, giving a serious effect on the printing properties. In order to prevent this trouble, it is important to keep the number of particles having a diameter of not smaller than 5 µm and not smaller than 1 µm in the resulting ink to 10 or less and 1,000 or less, respectively.

The removal of these coarse particles can be accomplished by any known method such as centrifugal separation method and precision filtration method. The separation step may be effected shortly after emulsion dispersion or shortly before the filling of the emulsion dispersion comprising various additives such as wetting agent and surface active agent in the ink cartridge.

As an effective unit for reducing the average particle diameter of particles and eliminating coarse particles there may be used a mechanical emulsifier.

As such an emulsifier there may be used any known device such as simple stirrer, impeller type agitator, in-line agitator, mill type agitator (e.g., colloid mill) and ultrasonic agitator. The use of a high pressure homogenizer is particularly preferred.

For the details of the mechanism of high pressure homogenizer, reference can be made to U.S. Pat. No. 4,533,254, JP-A-647264, etc. Examples of commercially available high pressure homogenizers include Gaulin homogenizer (produced by A. P. V GAULIN INC.), microfluidizer (produced by MICROFLUDEX INC.) and altimizer (produced by SUGINO MACHINE LIMITED).

In recent years, a high pressure homogenizer having a mechanism for atomizing a material in a ultrahigh pressure jet stream as disclosed in U.S. Pat. No. 5,720,551 is particularly useful in the emulsion dispersion of the invention. An example of the emulsifier using a ultrahigh jet stream is De BEE2000 (produced by BEE INTERNATIONAL LTD.).

The pressure at which emulsion is carried out by a high pressure emulsion disperser is not lower than 50 MPa, preferably not lower than 60 MPa, more preferably not lower than 180 MPa.

For example, the combined use of two or more emulsifiers as in a method involving the emulsification by an agitated emulsifier followed by the passage through a high pressure homogenizer is particularly preferred. Alternatively, a method is preferably used which comprises effecting the emulsion of the material using such an emulsifier, adding additives such as wetting agent and surface active agent, and then passing the ink composition again through the high pressure homogenizer before being filled in the cartridge.

In the case where the dye composition comprises a low boiling organic solvent incorporated therein in addition to the high boiling organic solvent, it is preferred to remove the low boiling organic solvent from the standpoint of emulsion stability and safety/hygiene. The removal of the low boiling solvent can be accomplished by any known method such as evaporation method, vacuum evaporation method and ultra ion method depending on the solvent to be removed. The step of removing the low boiling organic solvent is preferably effected as rapidly as possible shortly after emulsification.

For the details of the method of preparing an ink for inkjet recording, reference can be made to JP-A-5-148436, JP-A-5-295312, JP-A-7-97541, JP-A-7-82515, and JP-A-7-1185841. These methods can be also used to prepare the ink composition of the invention.

The ink composition of the invention may comprise functional components incorporated therein for providing the ink with various functions. Examples of these functional components include various additives such as drying inhibitor for preventing the clogging of the ejection nozzle with dried ink, penetration accelerator for helping the ink to penetrate in the page, ultraviolet absorber, oxidation inhibitor, viscosity adjustor, surface tension adjustor, dispersant, dispersion stabilizer, antifungal agent, rust preventive, pH adjustor, antifoaming agent and chelating agent. The ink composition of the invention may comprise functional components properly selected from the aforementioned group in a proper amount. These functional components include those which independently perform two or more fictions. Accordingly, in the following formulations, the functional components which independently perform two or more functions are each independently considered as each of the functional components in the calculation of mixing proportion.

As the drying inhibitor there is preferably used a water-soluble organic solvent having a lower vapor pressure than water. Specific examples of the water-soluble organic solvent include polyvalent alcohols such as ethylene glycol, propylene glycol, diethylene glycol, polyethylene glycol, thiodiglycol, dithiodigycol, 2-methyl-1,3-propanediol, 1,2,6-hexanetriol, acetylene glycol derivative, glycerin and trimethylolpropane, lower alkylethers of polyvalent alcohol such as ethylene glycol monomethyl(or ethyl) ether, diethylene glycol monomethyl(or ethyl)ether and triethylene glycol monoethyl(or butyl)ether, heterocyclic compounds such as 2-pyrrolidone, N-methyl-2-pyrrolidone, 1,3-dimethyl-2-imidazol dinone and N-ethylmorpholine, sulfur-containing compounds such as sulfolane, dimethylsulfoxide and 3-sulfolene polyfunctional compounds such as diacetone alcohol and diethanolamine, and urea derivatives. Preferred among these water-soluble organic solvents are polyvalent alcohols such as glycerin and diethylene glycol. These drying inhibitors may be used singly or in combination of two or more thereof. These drying inhibitors are preferably incorporated in the ink in an amount of from 10% to 50% by weight.

Examples of the penetration accelerator employable herein include alcohols such as ethanol, isopropanol, butanol di(tri) ethylene glycol monobutyl ether and 1,2-hexanediol, sodium laurylsulfate, sodium oleate, and nonionic surface active agents. These penetration accelerators can exert a sufficient effect when incorporated in the ink in an amount of from 10% to 30% by weight. These penetration accelerators are preferably used in an amount such that no print bleeding or print through occurs.

Examples of the ultraviolet absorber to be used to enhance the preservability of the image formed by the ink for ink set according to the invention include benzotriazole-based compounds as disclosed in JP-A-58-185677, JP-A-61-190537, JP-A-2-782, JP-A-5-197075 and JP-A-9-34057, benzophenone-based compounds as disclosed in JP-A-46-2784, JP-A-5-194483 and U.S. Pat. No. 3,214,463, cinnamic acid-based compounds as disclosed in JP-B-48-30492, JP-A-56-21141 and JP-A-10-88106, triazine-based compounds as disclosed in JP-A-4-298503, JP-A-8-53427, JP-A-8-239368, JP-A-10-182621 and JP-A-8-501291, compounds as disclosed in Research Disclosure No. 24239, and compounds which absorb ultraviolet rays to emit fluorescence, i.e., so-called fluorescent brighteners, such as stilbene-based and benzoxazole-based compounds.

As the oxidation inhibitor to be used to enhance the image preservability there may be used any of various organic and metal complex-based fading inhibitors. Examples of the organic fading inhibitors include hydroquinones, alkoxyphenols, dialkoxyphenols, phenols, anilines, amines, indanes, chromans, alkoxyanilines, and heterocyclic compounds. Examples of the metal complex-based fading inhibitors include nickel complex, and zinc complex. Specific examples of these oxidation inhibitors include compounds listed in the patents cited in Research Disclosure No. 17643, Articles VII-I and J, Research Disclosure No. 15162, Research Disclosure No. 18716, left column, page 650, Research Disclosure No. 36544, page 527, Research Disclosure No. 307105, page 872, and Research Disclosure No. 15162, and compounds included in formula and examples of representative compounds listed in JP-A-62-215272, pp. 127-137.

Examples of the antifungal agent to be incorporated in the ink include sodium dehydroacetate, sodium benzoate, sodium pyridinethione-1-oxide, ethyl p-hydroxybenzoate, 1,2-benzoisothiazoline-3-one, and salts thereof. These antifungal agents are preferably incorporated in the ink in an amount of from 0.02% to 5.00% by weight.

For the details of these antifungal agents, reference can be made to "Bokin Bobizai Jiten (Dictionary of Anti-bacterial and Antifungal Agents")", compiled by Dictionary Compilation Committee of The Society for Antibacterial and Antifungal Agents, Japan.

Examples of the rust preventive employable herein include acidic sulfites, sodium thiosulfate, ammonium thioglycolate, diisopropylammonium nitrite, pentaerthyritol tetranitrate, dicyclohexylammonium nitrite, and benzotriazole. These rust preventives are preferably incorporated in the ink in an amount of from 0.02% to 5.00% by weight.

The pH adjustor to be incorporated in the ink for ink set of the invention is preferably used for the purpose of adjusting the pH value of the ink, providing dispersion stability or like purposes. It is preferred that the pH value of the ink be adjusted to a range of from 8 to 11 at 25° C. When the pH value of the ink falls below 8, the resulting dye composition exhibits a deteriorated solubility, causing nozzle clogging. On the contrary, when the pH value of the ink exceeds 11, the resulting ink tends to exhibit a deteriorated water resistance. Examples of the pH adjustor include basic pH adjustors such as organic base and inorganic alkali, and acidic pH adjustors such as organic acid and inorganic acid.

Examples of the basic compounds employable herein include inorganic compounds such as sodium hydroxide, potassium hydroxide, sodium carbonate, potassium carbonate, sodium hydrogencarbonate, potassium hydrogencarbonate, sodium acetate, potassium acetate, sodium phosphate and disodium hydrogenphosphate, and organic bass such as aqueous ammonia, methylamine, ethylamine, diethylamine, triethylamine, ethanolamine, diethanolamine, triethanolamine, ethylenediamine, piperidine, diazbicyclooctane, diazabicycloundecene, pyridine, quinolin, picoline, lutidine and collidine.

Examples of the acidic compounds employable herein include inorganic compounds such as hydrochloric acid, sulfuric acid, phosphoric acid, boric acid, sodium hydrogensulfate, potassium hydrogensulfate, potassium dihydrogenphosphate and sodium dihydrogenphosphate, and organic compounds such as acetic acid, tartaric acid, benzoic acid, trifluoroacetic acid, methanesulfonic acid, ethanesulfonic acid, benzenesulfonic acid, p-toluenesulfonic acid, saccharinic acid, phthalic acid, picolic acid and quinolinic acid.

The electric conductance of the ink composition of the invention falls within a range of from 0.01 to 10 S/m, preferably from 0.05 to 5 S/m.

The measurement of electric conductance can be accomplished by en electrode method using a commercially available saturated potassium chloride.

The electric conductance of the inks can be controlled mainly by the ionic concentration of the aqueous solution. In the case where the salt concentration is high, desalting may be effected using an ultrafiltration membrane or the like. Further, in the case where salts or the like are added to adjust electric conductance, various organic or inorganic salts may be added.

Examples of the inorganic salts employable herein include potassium halide, sodium halide, sodium sulfate, potassium sulfate, sodium hydrogensulfate, potassium hydrogensulfate, sodium nitrate, potassium nitrate, sodium hydrogencarbonate, potassium hydrogencarbonate, sodium phosphate, disodium hydrogenphosphate, boric acid, potassium dihydrogenphosphate and sodium dihydrogenphosphate. Examples of the organic salts employable herein include organic compounds such as sodium acetate, potassium acetate, potassium tartrate, sodium tartrate, sodium benzoate, potassium benzoate, sodium p-toluenesulfonate, potassium saccharinate, potassium phthalate and sodium picolate.

Alternatively, the selection of the aqueous media listed below makes it possible to adjust the electric conductance of the ink.

The ink composition of the invention exhibits a viscosity of from 1 to 30 mPa·s, more preferably from 2 to 15 mPa·s, particularly preferably from 2 to 10 mPa·s at 25° C. When the viscosity of the ink exceeds 30 mPa·s, the resulting recorded image can be fixed only at a reduced rate. Further, the resulting ink exhibits a deteriorated ejectability. On the contrary, when the viscosity of the ink falls below 1 mPa·s, the resulting recorded image undergoes bleeding and thus exhibits a deteriorated quality.

The adjustment of viscosity can be arbitrarily carried out by controlling the added amount of the ink solvent. Examples of the ink solvent employable herein include glycerin, diethylene glycol, triethanolamine, 2-pyrrolidone, diethylene glycol monobutyl ether, and triethylene glycol monobutyl ether.

Further, a viscosity adjustor may be used. Examples of the viscosity adjustor employable herein include celluloses, water-soluble polymers such as polyvinyl alcohol, and nonionic surface active agents. For the details of these viscosity adjustors, reference can be made to "Nendo Chousei Gijutsu (Technology for Viscosity Adjustment)", Gijutsu Joho Kyoukai, Article 9, 1999, and "bib Jetto Purintayou Kemikaruzu (98 zouho)—Zairyou no Kaihatsu Doko/Tenbo Chousa (Chemicals for Inkjet printer (98 enlarged edition)—Research on Trend and View of Development of Materials)", CMC, pp. 162-174, 1997.

For the details of the method for the measurement of viscosity of liquid, reference can be made to JIS Z8803. In practice, however, the viscosity of liquid can be simply measured using a commercially available viscometer. Examples of the rotary viscometer include Type B viscometer and Type E viscometer produced by Tokyo Keiki Kogyo K.K. In the invention, a Type VM-100a-L vibration viscometer (produced by YAMAICHI ELECTRONICS CO., LTD.) was used to measure viscosity at 25° C. The unit of viscosity is Pa·s. In practice, however, mPa·s is used.

The surface tension, regardless of which it is static or dynamic, of the ink to be used in the invention is preferably from 20 to not greater than 50 mN/m, more preferably from 20 to not greater than 40 mN/m at 25° C. When the surface tension of the ink exceeds 50 mN/m, the resulting ink exhibits a drastic deterioration in print quality such as ejection stability and resistance to bleeding and whisker during color mixing. On the contrary, when the surface tension of the ink falls below 20 mN/m, the resulting ink can be attached to hard surface when ejected, causing defective printing.

The aforementioned various cationic, anionic and nonionic surface active agents may be added also for the purpose of adjusting surface tension. Two or more of these surface active agents may be used in combination.

Known examples of the static surface tension measuring method include capillary rise method, dropping method, and ring method. In the invention, as the static surface tension measuring method there is used a perpendicular plate method.

When a thin glass or platinum plate is hanged partially dipped in a liquid, surface tension of the liquid acts downward along the length of the plate in contact with the liquid. The surface tension is measured by balancing this force by an upward force.

As dynamic surface tension measuring methods there are known vibration jet method, meniscus dropping method and maximum bubble pressure method as disclosed in "Shinjikken Kagaku Koza (New institute of Experimental Chemistry), 18th ed., Kaimen to Koroido (Interface and Colloid)". Maruzen, pp. 69-90 (1977). Further, a liquid film destruction method is known as disclosed in JP-A-3-2064. In the invention, as the dynamic viscosity measuring method there is used a differential bubble pressure method. The principle and method of effecting this measuring method will be described hereinafter.

When bubbles are formed in a solution which has been stirred to uniformity, a new gas-liquid interface is produced. Surface active agent molecules in the solution then gather on the surface of water at a constant rate. When the bubble rate (rate of formation of bubbles) is changed, as the formation rate decreases, more surface active agent components gather on the surface of bubbles, reducing the maximum bubble pressure shortly before the burst of bubbles. Thus, the maximum bubble pressure (surface tension) with respect to bubble rate can be detected. As a method for the measurement of dynamic surface tension there is preferably used a method which comprises forming bubbles in a solution using a large probe and a small probe, measuring the differential pressure of the two probes in the state of maximum bubble pressure, and then calculating the dynamic surface tension from the differential pressure.

The content of no-volatile components in the ink composition of the invention is preferably from 10% to 70% by weight based on the total amount of the ink from the standpoint of enhancement of ejection stability of ink, printed image quality and various fastnesses of image and elimination of bleeding of printed image and stickiness of printed surface, more preferably from 20% to 60% by weight from the standpoint of enhancement of ejection stability of ink and elimination of bleeding of printed image.

The term "non-volatile component" as used herein is meant to indicate a liquid, solid or polymer component (including a polymer of the invention) having a boiling point of not lower than 150° C. at 1 atm. Examples of the non-volatile components to be incorporated in the ink composition of the inverter circuit include dyes, and high boiling solvents, and polymer latexes, surface active agents, dye stabilizers, anti-fungal agents and buffers which are optically added. Most of these non-volatile components but polymer of the invention and dye stabilizers deteriorate the dispersion stability of the ink. Further, these nonvolatile components are still present on the inkjet image-receiving paper after printing, inhibiting the stabilization of dyes by association on the image-receiving paper and hence deteriorating various fastnesses of the image area and worsening the image bleeding at high temperature and humidity.

The ink composition of the invention may comprise a polymer component incorporated therein. The term "polymer component" as used herein is meant to indicate all polymer compounds having a number-average molecular weight of not smaller than 5,000 contained in the ink composition. Examples of these polymer components include water-soluble polymer compounds substantially-soluble in an aqueous medium, water-dispersible polymer compounds such as polymer latex and polymer emulsion, and alcohol-soluble polymer compounds soluble in polyvalent alcohols used as auxiliary solvents. All polymer compounds are included in the polymer compounds of the invention so far as they can be substantially uniformly dissolved or dispersed in the ink composition.

Specific examples of the water-soluble polymer compounds employable herein include water-soluble polymers such as polyvinyl alcohol, silanol-modified polyvinyl alcohol, carboxymethyl cellulose, hydroxyethyl cellulose, polyvinyl pyrrolidone, polyalkylene oxide (e.g., polyethylene oxide, polypropylene oxide) and polyalkylene oxide derivative, natural water-soluble polymers such as polysaccharide, starch, cationated starch, casein and gelatin, aqueous acrylic resins such as polyacrylic acid, polyacrylamide and copolymer thereof, aqueous alkyd resins, and water-soluble compounds which have —$SO_3^-$ or —$COO^-$ group and thus are substantially soluble in an aqueous medium.

Examples of the polymer latexes include styrene-butadiene latexes, styrene-acryl latexes, and polyurethane latexes. Examples of the polymer emulsions include acryl emulsions.

These water-soluble polymer compounds may be used singly or in combination of two or more thereof.

As already described, such a water-soluble polymer compound is used as a viscosity adjustor to adjust the ink viscosity to a value tilling within a range that provides the ink a good ejectability. When the added amount of the water-soluble polymer compound is too great, the resulting ink composition exhibits too high a viscosity that deteriorates the ejection stability of the ink composition. Thus, when time elapses, the ink undergoes precipitation, causing clogging of the nozzle.

The added amount of the polymer compound to be used as a viscosity adjustor depends on the molecular weight of the polymer compound added (The greater the molecular weight of the polymer compound to be added is, the smaller is the added amount thereof) but is normally from 0% to 5% by weight, preferably from 0% to 3% by weigh more preferably from 0% to 1% by weight based on the total amount of the ink composition.

The polymer compound as a viscosity adjustor may be a polymer of the invention but may be different from the polymer of the invention.

In the invention, as the dispersant and dispersion stabilizer there may be used the aforementioned various cationic, anionic, nonionic surface and betaine-based surface active agents as necessary. As the anti-forming agent there may be used a fluorine-based or silicone-based compound or a chelating agent such as EDTA as necessary.

The reflective medium which is a printing medium that can be preferably used in the invention will be further described hereinafter. Examples of the reflective medium include recording paper and recording film. As the support in the recording paper or recording film there may be used one obtained by processing a chemical pulp such as LBKP and NBKP, a mechanical pulp such as GP, PGW, RMP, TMP, CTMP, CMP and CGP, used paper pulp such as DIP or the like, optionally mixed with known additives such as pigment, binder, sizing agent, fixing agent, cationic agent and paper strength improver, through various paper machines such as foundrinier paper machine and cylinder paper machine. As the support there may be used either a synthetic paper or plastic film sheet besides these support materials. The thickness of the support is preferably from 10 μm 250 μm. The basis weight of the support is preferably from 10 to 250 g/m².

An image-receiving layer and a back coat layer may be provided on the support directly or with a size press or anchor coat layer of starch, polyvinyl alcohol or the like interposed therebetween to prepare a material for receiving the ink composition and ink set of the invention. The support may be further subjected to leveling using a calendering machine such as machine calender, TG calender and soft calender.

As the support there is preferably used a paper or plastic film laminated with a polyolefin (e.g., polyethylene, polystyrene; polybutene, copolymer thereof or polyethylene terephthalate on both sides thereof. The polyolefin preferably comprises a white pigment (e.g., titanium oxide, zinc oxide) or a tinting dye (e.g., cobalt blue, ultramarine, neodymium oxide) incorporated therein.

The image-receiving layer to be provided on the support comprises a porous material or aqueous binder incorporated therein. The image-receiving layer also preferably comprises a pigment incorporated therein. As such a pigment there is preferably used a white pigment. Examples of the white pigment employable herein include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfite, titanium dioxide, zinc sulfate and zinc carbonate, and organic pigments such as styrene-based pigment, acrylic pigment, urea resin and melamine resin. Particularly preferred among these pigments are porous inorganic white pigments. In particular, synthetic amorphous silica having a large pore area, etc. are preferred. As the synthetic amorphous silica there may be also used anhydrous silicate obtained by dry method (gas phase method) or hydrous silicate obtained by wet method.

Specific examples of the recording paper comprising the aforementioned pigments incorporated in the image-receiving layer include those disclosed in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-174992, JP-A-11-192777, and JP-A-2001-301314.

Examples of the aqueous binder to be incorporated in the image-receiving layer include water-soluble polymers such as polyvinyl alcohol, silanol-modified polyvinyl alcohol, starch, cationated starch, casein, gelatin, carboxymethyl cellulose, hydroxyethyl cellulose, polyvinyl pyrrolidone, polyalkylene oxide and polyalkylene oxide derivative, and water-dispersible polymers such as styrene butadiene latex and acryl emulsion. These aqueous binders may be used singly or in combination of two or more thereof. In the invention, particularly preferred among these aqueous binders are polyvinyl alcohol and silanol-modified polyvinyl alcohol from the standpoint of adhesion to pigment and exfoliation resistance of ink-receiving layer.

The ink-receiving layer may comprise a mordant, a waterproofing agent, a light-resistance improver, a gas resistance improver, a surface active agent, a film hardener and other additives incorporated therein besides the pigments and aqueous binders.

The mordant to be incorporated in the image-receiving layer is preferably passivated. To this end, a polymer mordant is preferably used.

For the details of the polymer mordant, reference can be made to JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-6122942, JP-A-60-235134, JP-A-1-161236, U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing a polymer mordant disclosed in JP-A-1-161236, pp. 212 to 215. The use of the polymer mordant disclosed in the above cited patent makes it possible to obtain an image having an excellent quality and hence improve the light-resistance of the image.

The waterproofing agent can be used to render the image waterproof. As such a waterproofing agent there is preferably used a cationic resin in particular. Examples of such a cationic resin include polyamide polyamine epichlorohydrin, polyethylenimine, polyamine sulfone, dimethyl diallyl ammonium chloride polymer, and cation polyacrylamide. The content of such a cation resin is preferably from 1% to 15% by weight, particularly from 3% to 10% by weight based on the total solid content of the ink-receiving layer.

Examples of the light-resistance improver and gas resistance improver include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl-containing compounds compounds, amide compounds, ether compounds, alcohol compounds, sulfinic acid compounds, saccharides, water-soluble reducing compounds, organic acids, inorganic acids hydroxyl-containing organic acids, benzotriazole compounds, benzophenone compounds, triazine compounds, heterocyclic compounds, water-soluble metal salts, organic metal compounds, and metal complexes.

Specific examples of these compounds include those disclosed in JP-A-10-182621, JP-A-2001-260519, JP-A-2000-260519, JP-B-4-34953, JP-B-4-34513, JP-B-4-34512, JP-A-11-170686, JP-A-60-47190, JP-A-7-276808, JP-A-2000-94829, JP-T-8-512258, and JP-A-11-321090.

The surface active agent acts as a coating aid, releasability improver, slipperiness improver or antistat. For the details of the surface active agent, reference can be made to JP-A-62-173463 and JP-A-62-183457.

An organic fluoro-compounds may be used instead of the surface active agent. The organic fluoro-compound is preferably hydrophobic. Examples of the organic fluoro-compound include fluorine-based surface active agents, oil-based fluorine compounds (e.g., fluorine-based oil), and solid fluorine-based compound resins (e.g., tetrafluoroethylene resin). For the details of the organic fluoro-compound, reference can be made to JP-B-57-9053 (8th to 17th columns), JP-A-61-20994, and JP-A-62-135826.

As the film hardener there may be used any of materials disclosed in JP-A-1-161236, page 222, JP-A-9-263036, JP-A-10-119423, and JP-A-2001-310547.

Other examples of additives to be incorporated in the image-receiving layer include pigment dispersants, thickening agents, antifoaming agents, dyes, fluorescent brighteners, preservatives, pH adjustors, marring agents, and film hardeners. There may be provided one or two ink-receiving layers.

The recording paper and recording film may comprise a back coat layer provided thereon. Examples of the components which can be incorporated in the back coat layer include white pigments, aqueous binders, and other components.

Examples of the white pigments to be incorporated in the back coat layer include inorganic white pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, hydrated halloysite, magnesium carbonate and magnesium hydroxide, and organic pigments such as styrene-based plastic pigment, acrylic plastic pigment, polyethylene, microcapsule, urea resin and melamine resin.

Examples of the aqueous binder to be incorporated in the back coat layer include water-soluble polymers such as styrene/maleate copolymer, styrene/acrylate copolymer, polyvinyl alcohol, silanol-modified polyvinyl alcohol, starch, cationated starch, casein, gelatin, carboxymethyl cellulose, hydroxyethyl cellulose and polyvinylpyrrolidone, and water-dispersible polymers such as styrenebutadiene latex and acryl emulsion. Examples of other components to be incorporated in the back coat layer include antifoaming agents, foaming inhibitors, dyes, fluorescent brightening agents, preservatives, and waterproofing agents.

The layers (including back layer) constituting the inkjet recording paper and film may comprise a fine dispersion of polymer incorporated therein. The fine dispersion of polymer is used for the purpose of improving physical properties of film, e.g., stabilizing dimension, inhibiting curling, adhesion and film cracking. For the details of the fine dispersion of polymer, reference can be made to JP-A-62-245258, JP-A-62-1316648, and JP-A-62-110066. The incorporation of a fine dispersion of polymer having a glass transition temperature as low as not higher than 40° C. in a layer containing a mordant makes it possible to prevent the cracking or curling of the layer. The incorporation of a fine dispersion of polymer having a high glass transition temperature, too, in the back layer makes it possible to prevent the curling of the back layer.

The ink composition of the invention can be used for purposes other than inkjet recording. These purposes include display image material image-forming material for interior decoration material, and image-forming material for exterior decoration material.

Examples of the display image material include various materials such as poster, wall paper, small decoration articles (ornament, doll, etc.), commercial flyer, wrapping paper, wrapping material, paper bag, vinyl bag, packaging material, signboard, picture drawn or attached to the side of traffic facilities (automobile, bus, train, etc.) and clothing with logogram. In the case where the dye of the invention is used as a material for forming a display image, the term "image" as used herein means an image in a narrow sense as well as all patterns perceivable by human being such as abstract design, letter and geometrical pattern.

The term "interior decoration material" as used herein is meant to include various materials such as wall paper, small decoration articles (ornament, doll, etc.), members of lighting fixture, members of furniture and design members of floor and ceiling. In the case where the dye of the invention is used as an image-forming material, the term "image" as used herein means an image in a narrow sense as well as all dye patterns perceivable by human being such as abstract design, letter and geometrical pattern.

The term "exterior decoration material" as used herein is meant to include various materials such as wall material, roofing material, signboard, gardening material, small exterior decoration articles (ornament, doll, etc.) and members of exterior lighting fixture. In the case where the ink composition of the invention is used as an image-forming material, the term "image" as used herein means an image in a narrow sense as well as all dye patterns perceivable by human being such as abstract design, letter and geometrical pattern.

Examples of the media on which patterns are formed in these uses include various materials such as paper, fiber, cloth (including nonwoven cloth), plastic, metal and ceramics. Dyeing can be carried out by mordanting or printing. Alternatively, a dye can be fixed in the form of reactive dye having a reactive group incorporated therein. Preferred among these dyeing methods is mordanting.

During the production of the ink, dissolution of additives such as dye may be assisted by sound vibration.

Sound vibration is effected to prevent the ink from forming bubbles when given pressure by the recording head. In some detail, a sound energy which is not smaller than that given by the recording head is given during the production of the ink to remove bubbles.

Sound vibration normally indicates ultrasonic wave having a frequency of not lower than 20 kHz, preferably not lower than 40 kHz, more preferably 50 kHz. The energy which is given to the ink solution by sound vibration is normally not lower than $2\times10^7$ J/m$^3$, preferably not lower than $5\times10^7$ J/m$^3$, more preferably not lower than $1\times10^8$ J/m$^3$. The time during which sound vibration is given to the ink solution is normally from about 10 minutes to 1 hour.

Sound vibration can be effected at any time after the provision of the dye to the media to exert the desired effect.

Sound vibration may be effected also after the storage of the finished ink to exert the desired effect. However, it is preferred that sound vibration be given during dissolution and/or dispersion of the dye in the media to exert a higher defoaming effect and accelerate the dissolution and/or dispersion of the dye in the media.

In some detail, the step at which at least sound vibration is given may be effected at any time during or after the dissolution and/or dispersion of the dye in the media. In other words, the step at which at least sound vibration is given may be arbitrarily effected once or more times between after the production of the ink and the completion of the product.

In a preferred embodiment, the step of dissolving and/or dispersing the dye in the medium consists of a step of dissolving the dye in part of the medium and a step of adding the rest of the medium to the solution. Preferably, sound vibration is given at at least any one of the two steps. More preferably, at least sound vibration is given at the step of dissolving the dye in part of the medium.

The step of adding the rest of the medium to the solution may be a single step or may consist of a plurality of steps.

During the production of the ink according to the invention, heat deaeration or vacuum deaeration is preferably effected to enhance the effect of removing bubbles from the ink. Heat deaeration or vacuum deaeration is preferably effected at the same time with or after the step of adding the rest of the medium to the solution.

Examples of the unit for generating sound vibration at the step of giving sound vibration include known devices such as ultrasonic dispersing machine.

In the process for the preparation of the ink of the invention, it is important to effect a step of removing dust as solid content by filtration after the preparation of the ink. For this job, a filter is used. As such a filter there is used a filter having an effective pore diameter of not greater than 1 μm, preferably from not smaller than 0.05 gum to not greater than 0.3 pin, particularly from not smaller than 0.25 μm to not greater than 0.3 μm. As the filter material there may be used any of various known materials. In the case where a water-soluble dye ink is used, a filter prepared for aqueous solvent is preferably used. In particular, a filter made of a polymer material which can difficultly give dust is preferably used. Filtration may be accomplished by pumping the solution through the filter or may be effected under pressure or reduced pressure.

Filtration is often accompanied by the entrapment of air in the solution. Bubbles due to air thus entrapped can often cause disturbance in image in the inkjet recording. Thus, the deaeration step is preferably provided separately. Deaeration may be accomplished by allowing the solution thus filtered to stand or by the use of various methods such as ultrasonic deaeration and vacuum deaeration using a commercially available apparatus. The ultrasonic deaeration may be effected preferably for about 30 seconds to 2 hours, more preferably for about 5 minutes to 1 hour.

These jobs are preferably effected in a space such as clean room and clean bench to prevent the contamination by dust. In the invention, these jobs are preferably effected in a space having a cleanness degree of not greater than 1,000 class. The term "cleanness degree" as used herein is meant to indicate the value measured by a dust counter.

The volume of the droplet to be ejected onto the ink recording material of the invention is from not smaller than 0.1 pl to not greater than 100 pl, preferably from not smaller than 0.5 pl to not greater than 50 pl, particularly from not smaller than 2 pl to not greater than 50 pl.

In the invention, the inkjet recording method is not limited. The invention can be applied to any known inkjet recording method such as electrostatic control method which utilizes electrostatic attraction to eject ink, drop-on-demand method (pressure pulse method) utilizing vibrational pressure of piezoelectric element, acoustic inkjet method which comprises converting electrical signal to acoustic beam with which the ink is irradiated to produce a radiation pressure that is utilized to eject the ink and thermal inkjet (bubble jet) method which comprises heating the ink to form bubbles that raise the pressure to eject the ink.

Examples of the inkjet recording method include a method which comprises ejecting many portions of an ink having a low concentration called photoink in a small volume, a method which comprises using a plurality of inks having substantially the same hue but different densities to improve the image quality, and a method involving the use of a colorless transparent ink. The volume of the ink droplet to be ejected is controlled mainly by the print head.

For example, in the thermal inkjet recording system the volume of the ink droplet to be ejected can be controlled by the structure of the print head. In some detail the ink droplet can be ejected in a desired size by properly changing the size of the ink chamber, bating zone and nozzle. Even in the thermal inkjet recording system, the ink droplet can be ejected in a plurality of sizes by using a plurality of print heads comprising heating zones and nozzles having different sizes.

In the case of drop-on-demand system using a piezoelectric element, the volume of the ink droplet to be ejected can be varied due to the structure of the print head as in the thermal inkjet recording system. As described later, however, by controlling the waveform of the driving signal for driving the piezoelectric element, the ink droplet can be ejected in a plurality of sizes by the same structure of print head.

The frequency at which the ink composition of the invention is ejected onto the recording material is preferably not lower than 1 kHz.

In order to record a high quality image as in photographic system, it is necessary that the ejection density be not smaller than 600 dpi (number of dots per inch) to reproduce an image having a high sharpness with small ink droplets.

In the system involving the ejection of the ink droplet through a head having a plurality of nozzles, on the other hand, the number of heads which can be driven at the same time in a type of recording system involving the cross movement of the recording paper and the head is from scores to about 200. Even in a type having heads called line heads fixed therein, the number of heads which can be driven at the same time is limited to hundreds. This is because the driving electric power is limited or the heat generated on the head gives an adverse effect on the image thus formed, making it impossible to drive a large number of head nozzles at the same time.

By raising the riving frequency, the recording rate can be raised.

The control over the ejection frequency in the case of thermal inkjet recording system can be accomplished by controlling the frequency of the head driving signal for heating the head.

In the piezoelectric system, the control over the ejection frequency can be accomplished by controlling the frequency of the signal for driving the piezoelectric element.

The driving of piezoelectric element will be described hereinafter. The image signal to be printed is made as follows. In some detail, the size of ink droplet to be ejected, the ejection rate and the ejection frequency are determined at the printer control. Thus, the signal for driving the print head is developed. The driving signal thus developed is then supplied into the print head. The size of ink droplet to be ejected, the ejection rate and the ejection frequency are controlled by the signal for driving the piezoelectric element. The size of ink droplet to be ejected and the ejection rate are determined by the shape and amplitude of the driving waveform and the ejection frequency is determined by the repetition frequency of the signal.

When the ejection frequency is predetermined to 10 kHz, the head is driven every 100 microseconds. One line of recording is finished in 400 microseconds. By predetermining the moving rate of the recording paper such that it moves at a rate of 1/600 inch or about 42 micrometers per 400 microseconds, printing can be made at a rate of one sheet per 1.2 seconds.

The configuration of the printing device to which the invention can be applied is preferably in an embodiment disclosed in JP-A-11-170527. The configuration of the ink cartridge to which the invention can be applied is preferably in an embodiment disclosed in JP-A-5-229133. The configuration of the suction system and the cap covering the print head are preferably in an embodiment disclosed in JP-A-7-276671. It is preferred that a filter for evacuating bubbles as disclosed in JP-A-9-277552 be provided in the vicinity of the head.

The surface of the nozzle is preferably subjected to water repellent treatment as disclosed in JP-A-2002-292878. The invention may be used with a printer connected to computer. The invention may be used also with an apparatus dedicated for printing photograph.

In the inkjet recording method which can be applied to the invention, the ink is preferably ejected onto the recording material at an avenge rate of not smaller than 2 n/sec, preferably not smaller than 5 m/sec.

The control over the ejection rate is accomplished by controlling the form and amplitude of the signal for driving tee head.

By using a plurality of driving waveforms properly, ink droplets having a plurality of sizes can be ejected by the same head.

EXAMPLE

The invention will be further described in the following examples, but the invention is not construed as being limited thereto. The dyes used in the following examples will be given below.

MD-1
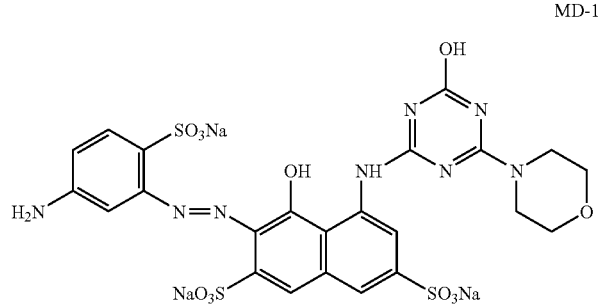
MD-2
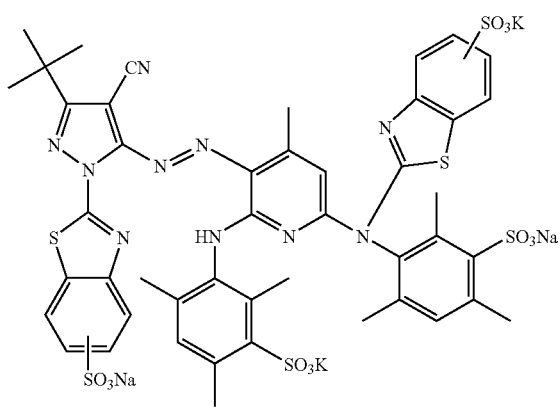
MD-3
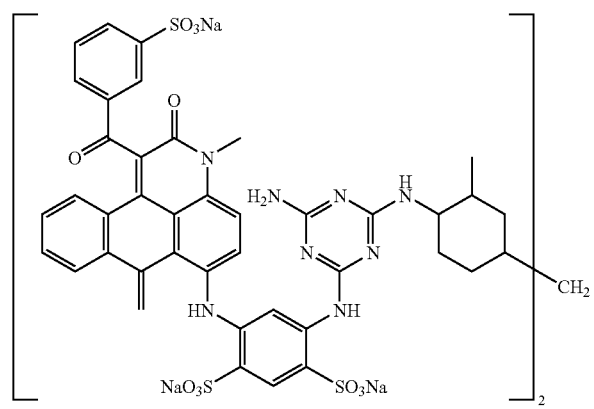
CD-1
C.I. Direct Blue 199
CD-2
C.I. Direct Yellow 120
YD-1
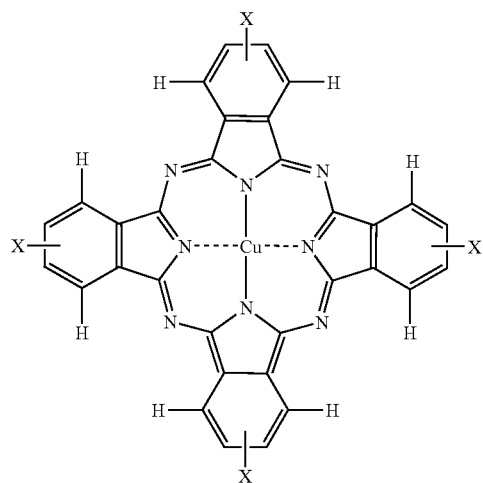
X = A or B
  A: SO$_2$(CH$_2$)$_3$SO$_3$Li
  B: SO$_2$(CH$_2$)$_3$SO$_2$NHCH$_2$CH(CH$_3$)OH
A/B = 75/25

-continued

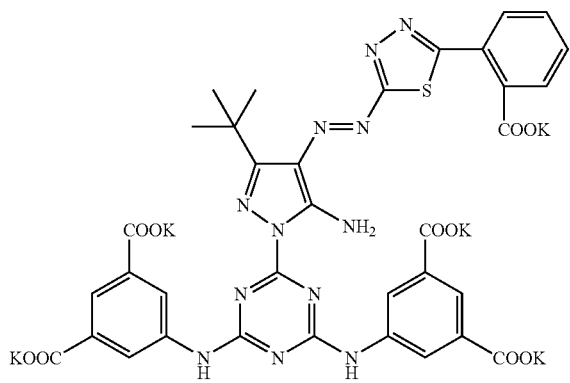
YD-2

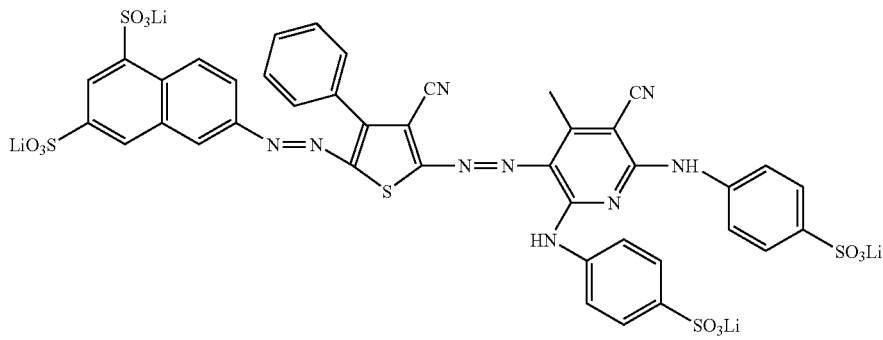
BD-1

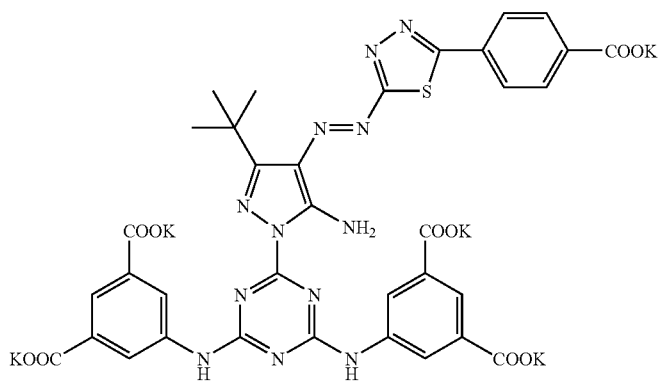
BD-2

Example 1

To the following components was added ultrapure water having a resistivity of 18 MΩ or more to make 1 l. The mixture was then heated to a temperature of from 30° C. to 40° C. with stirring for 1 hour. Thereafter, the solution was filtered through a microfilter having an average pore diameter of 0.25 μm under reduced pressure to prepare a magenta ink (M-101). The unit of mixing proportion is the concentration after the preparation of the ink.

(Formulation of Magenta Ink (M-101))

|  | Mixing proportion |
|---|---|
| (Solid content) |  |
| Magenta dye (MD-1) | 30 g/l |
| Urea | 15 g/l |
| Proxel | 5 g/l |

|  | Mixing proportion |
|---|---|
| (Liquid component) |  |
| Diethylene glycol (DEG) | 115 g/l |
| Glycerin (GR) | 145 g/l |
| Triethylene glycol monobutyl ether (TGB) | 135 g/l |
| Triethanolamine | 8 g/l |
| Surfynol STG | 10 g/l |

Ink compositions M-102 to M-108 were prepared in the same manner as M-101 except that additives were further added as set forth in Table 1 below in an amount of 10 g/l as calculated in terms of concentration after the preparation of ink. The capability of these additives of accelerating the association of the dye ($\epsilon 0/\epsilon 1$) was determined according to the aforementioned definition.

TABLE 1

| Experimental level | Additives | Molecular weight of additives (Mw) | ε0/ε1 |
|---|---|---|---|
| M-101 (comparative) | None | | |
| M-102 (comparative) | POEN-1 added to M-101 in an amount of 10 g/l | 20,000 | 1.05 |
| M-103 (comparative) | POEN-2 added to M-101 in an amount of 10 g/l | 30,000 | 1.06 |
| M-104 (comparative) | PA-1 added to M-101 in an amount of 10 g/l | 20,000 | 1.07 |
| M-105 (inventive) | JS-1 added to M-101 in an amount of 10 g/l | 17,000 | 1.32 |
| M-106 (inventive) | JS-5 added to M-101 in an amount of 10 g/l | 23,000 | 1.33 |
| M-107 (inventive) | JS-8 added to M-101 in an amount of 10 g/l | 28,000 | 1.27 |
| M-108 (inventive) | JS-11 added to M-101 in an amount of 10 g/l | 25,000 | 1.28 |

POEN-1: Polyoxyethylene naphthyl ether (weight-average molecular weight: 1,000,000)
POEN-2: Polyoxyethylene naphthyl ether (weight-average molecular weight: 1,000)
PA-1: Poly-styrene/divinylbenzene latex (10 g/l as calculated in terms of solid content; Tg: >140° C.)

These inks were each then received in the magenta ink cartridge of a Type CL-760 inkjet printer (produced by SEIKO EPSON CORPORATION). As other color inks there were used CL-760 inks. With these inks, a monochromatic magenta image was then printed. As the image-receiving sheet on which the image is printed there was used "Gasai", which is an inkjet paper photographic quality output medium produced by Fuji Photo Film Co., Ltd. The image thus printed was then evaluated for image fastness.

<Experimental Method for Evaluation of Image Fastness>

For the evaluation of image storage properties, a stepwise monochromatic magenta print sample having a stepwise gradation of density was prepared. The sample was then evaluated for the following properties.

(1) For the evaluation of light fastness, the density Ci of an image printed on the sample was immediately measured using a Type X-rite 310 TR reflection densitometer. The sample was then irradiated with xenon ray (85 klux) from a weatherometer produced by Atlas Electric Devices, Inc.) for 15 days. The sample thus irradiated was then measured for image density Cf to determine the percent remaining of dye (Cf/Ci×100) which was then used for evaluation. For the evaluation of percent remaining of dye, the reflection density was evaluated on three points of reflection density, i.e., 0.7, 1.0 and 1.5. Those showing a percent dye remaining of not smaller than 75% at any density were ranked A. Those showing a percent magenta dye remaining of less than 75% at two density points were ranked B. Those showing a percent magenta dye remaining of less than 75% at all densities were ranked C.

(2) For the evaluation of heat fastness, the sample was aged at a temperature of 80° C. and 70% RH for 15 days. The sample was measured for density using the aforementioned Type X-rite 310 TR reflection densitometer before and after aging to determine the percent dye remaining which was then evaluated. The percent dye remaining was then evaluated at three reflection density points, i.e., 0.7, 1.0 and 1.5. Those showing a percent dye remaining of not smaller than 90% at any density were ranked A. Those showing a percent dye remaining of less than 90% at two density points were ranked B. Those showing a percent magenta dye remaining of less than 90% at all densities were ranked C.

(3) For the evaluation of ozone gas resistance, the medium on which an image had been formed was allowed to stand in a box the ozone gas concentration of which had been adjusted to 5 ppm for 5 days. The sample was measured for image density using a Type X-Rite 310TR reflection densitometer before and after aging to determine the percent dye remaining which was then evaluated. The reflection density was measured at three yellow density points, i.e., 0.7, 1.0 and 1.5. The ozone gas concentration in the box was adjusted by the use of a Type OZG-EM-01 ozone gas monitor (produced by APPLICS CO., LTD.).

The evaluation of percent dye remaining was made according to the following four-step criterion. Those showing a percent dye remaining of not smaller than 80% at any density were ranked A. Those showing a percent dye remaining of less than 80% at at least one density point were ranked B. Those showing a percent dye remaining of less than 70% at all densities were ranked C. Those showing a percent dye remaining of less than 50% at all densities were ranked D.

The reciprocal of the ozone degradation rate ratio (T2/T1), i.e., T1/T2 required until the percent dye remaining reaches 80% of that of M-101 (comparative) was defined as relative value 1.

The results are set forth in Table 2.

TABLE 2

| | Light-fastness | Heat fastness | Ozone gas resistance | T1/T2 |
|---|---|---|---|---|
| Authentic ink (CL-760) produced by SEIKO EPSON CORPORATION | C | B | D | — |
| M-101 (comparative) | C | B | D | 1 |
| M-102 (comparative) | C | B | D | 0.95 |
| M-103 (comparative) | C | B | D | 1.06 |
| M-104 (comparative) | C | B | D | 1.10 |
| M-105 (inventive) | C | A | A | 17.2 |
| M-106 (inventive) | C | A | A | 18.3 |
| M-107 (inventive) | C | A | A | 20.4 |
| M-108 (inventive) | C | A | A | 17.8 |

As can be seen in the aforementioned results, the ink compositions of the invention showed improvements in heat fastness and ozone resistance, particularly ozone resistance.

Example 2

Ink compositions M-109 to 116 were prepared in the same manner as M-101 to 108, respectively, except that the dye was changed from MD-1 to MD-2. Ink compositions M-117 to 124 were prepared in the same manner as M-101 to 108, respectively, except that the dye was changed from MD-1 to MD-3. These ink compositions were each then evaluated for image fastness in the same manner as mentioned above. The reciprocal of the ozone degradation rate ratio (T2/T1), i.e., T1/T2 required until the percent dye remaining reaches 80% of that of M-109 (comparative) was defined as relative value 1.

The results are set forth in Table 3 below.

TABLE 3

|  | Light-fastness | Heat fastness | Ozone gas resistance | T1/T2 |
|---|---|---|---|---|
| M-109 (comparative) | B | B | B | 1 |
| M-110 (comparative) | B | B | B | 1.30 |
| M-111 (comparative) | B | B | B | 1.25 |
| M-112 (comparative) | B | B | B | 1.16 |
| M-113 (inventive) | A | A | A | 6.25 |
| M-114 (inventive) | A | A | A | 7.36 |
| M-115 (inventive) | A | A | A | 7.51 |
| M-116 (inventive) | A | A | A | 6.52 |
| M-117 (comparative) | C | B | B | 1 |
| M-118 (comparative) | C | B | B | 1.15 |
| M-119 (comparative) | C | B | B | 1.21 |
| M-120 (comparative) | C | B | B | 1.23 |
| M-121 (inventive) | A | A | A | 7.35 |
| M-122 (inventive) | A | A | A | 7.41 |
| M-123 (inventive) | A | A | A | 6.42 |
| M-124 (inventive) | A | A | A | 7.10 |

The inventive ink compositions comprising dyes different from that of Example 1, too, showed a remarkable effect of the invention. Further, the use of the heterocyclic dye described herein makes it possible to exert a drastic effect of improving light-fastness.

Example 3

The ejection stability of the ink composition was examined in the case where the cartridge was changed. A sample (X) was prepared by filling the cartridge of CL-760 with the ink composition of the invention under a pressure as low as 800 hPa, and then closing the ejection nozzle. Another sample (Y) was prepared by fling the cartridge of CL-760 with the ink composition of the invention at the atmospheric pressure, and then closing the ejection nozzle. As sponges there were used a sponge made of urethane resin and a sponge made of polyethylene. The ink compositions to be tested were selected from the group consisting of the aforementioned ink compositions of the invention.

<Ejection Stability Testing Method>

For the evaluation of ejection stability, the cartridge was mounted on the printer. The ejection of ink from all the nozzles of the printer was then confirmed. Under four conditions, i.e., 35° C.-80% RH, 35° C.10% RH, 10° C.80% RH and 10° C.20% RH, the printer was then operated on the various cartridges to print a monochromatic image of magenta gradation pattern on 200 sheets of A4 size paper in total. The print quality was then evaluated according to the following criterion.

A: No disturbance in print between the beginning and the end of printing under all environmental conditions;

B: Some disturbance in print under one environmental condition; and

C: Disturbance in print between the beginning and the end of printing under trio or more environmental conditions.

TABLE 4

|  | Urethane | | Polyethylene | |
|---|---|---|---|---|
|  | X | Y | X | Y |
| M-105 | A | B | B | C |
| M-107 | A | C | B | C |
| M-108 | A | B | B | C |
| M-113 | A | C | C | C |
| M-114 | A | B | B | C |
| M-116 | A | C | B | C |
| M-121 | A | C | B | C |
| M-124 | A | C | C | C |

As can be seen in the results of Table 4, the ejection stability is excellent in the order of (1) combination of sample (X) prepared by closing the ejection nozzle under reduced pressure and a sponge (urethane) made of urethane resin, (2) combination of sample (Y) prepared by closing the ejection nozzle at the atmospheric pressure and urethane sponge or combination of sample X and polyethylene sponge and (3) combination of sample Y and polyethylene sponge.

Example 4

To the following components was added ultrapure water having a resistivity of 18 MΩ or more to make 1 l. The mixture was then heated to a temperature of from 30° C. to 40° C. with stinting for 1 hour. Thereafter, the solution was filtered through a microfilter having an average pore diameter of 0.25 µm under reduced pressure to prepare a cyan ink (C-201). The unit of mixing proportion is the concentration after the preparation of the ink.

(Formulation of Cyan Ink (C-201))

|  | Mixing proportion |
|---|---|
| (Solid content) |  |
| Cyan dye (CD-1) | 37 g/l |
| Urea | 15 g/l |
| Proxel | 5 g/l |
| (Liquid component) |  |
| Diethylene glycol (DEG) | 110 g/l |
| Glycerin (GR) | 135 g/l |
| Triethylene glycol monobutyl ether (TGB) | 100 g/l |
| 2-pyrrolidone (PRD) | 30 g/l |
| Triethanolamine | 8 g/l |
| Surfynol STG | 10 g/l |

Ink compositions C-202 to C-208 were prepared in the same manner as C-201 except that additives were further added as set forth in Table 5 below in an amount of 10 gA as calculated in terms of concentration after the preparation of ink. The capability of these additives of accelerating the association of the dye (ε0/ε1) was determined according to the aforementioned definition.

TABLE 5

| Experimental level | Additives | Molecular weight of additives (Mw) | ε0/ε1 |
|---|---|---|---|
| C-201 (comparative) | None | | |
| C-202 (comparative) | POEN-1 added to C-201 in an amount of 10 g/l | 20,000 | 1.12 |
| C-203 (comparative) | POEN-2 added to C-201 in an amount of 10 g/l | 30,000 | 1.13 |
| C-204 (comparative) | PA-1 added to C-201 in an amount of 10 g/l | 20,000 | 1.11 |
| C-205 (inventive) | JS-2 added to C-201 in an amount of 10 g/l | 16,000 | 1.27 |
| C-206 (inventive) | JS-7 added to C-201 in an amount of 10 g/l | 27,000 | 1.28 |
| C-207 (inventive) | JS-9 added to C-201 in an amount of 10 g/l | 30,000 | 1.31 |
| C-208 (inventive) | JS-16 added to C-201 in an amount of 10 g/l | 15,000 | 1.32 |

Ink compositions C-209 to C-216 were prepared in the same manner as C-201 to C-208 except that the dye of ink was changed from CD-1 to CD-2.

The ink compositions C-201 to C-216 were each then received in the cyan ink cartridge of a Type CL-760 inkjet printer (produced by SEIKO EPSON CORPORATION). As other color inks there were used CL-760 inks. With these inks, a monochromatic cyan image was then printed. As the image-receiving sheet on which the image is printed there was used "Gasai", which is an inkjet paper photographic quality output medium produced by Fuji Photo Film Co., Ltd. The image thus printed was then evaluated for image fastness.

<Experimental Method for Evaluation of Image Fastness>

For the evaluation of image storage properties, a stepwise monochromatic cyan print sample having a stepwise gradation of density was prepared. The sample was then evaluated for various properties in the same manner as in Example 1 except that irradiation was effected for 30 days in the light-fastness experiment and storage was effected for 30 days in the heat fastness experiment. The reciprocal of the ozone degradation rate ratio (T2/T1), i.e., T1/T2 required until the percent dye remaining reaches 80% of that of C-201 (comparative) was defined as relative value 1.

The results are set forth in Table 6.

TABLE 6

| | Light-fastness | Heat fastness | Ozone gas resistance | T1/T2 |
|---|---|---|---|---|
| Authentic ink (CL-760) produced by SEIKO EPSON CORPORATION | B | B | D | — |
| C-201 (comparative) | B | B | D | 1 |
| C-202 (comparative) | B | B | D | 1.23 |
| C-203 (comparative) | B | B | D | 1.31 |
| C-204 (comparative) | B | B | D | 1.44 |
| C-205 (inventive) | B | A | A | 20.3 |
| C-206 (inventive) | B | A | A | 21.2 |
| C-207 (inventive) | B | A | A | 25.3 |
| C-208 (inventive) | B | A | A | 22.3 |
| C-209 (comparative) | A | B | B | 1 |
| C-210 (comparative) | A | B | B | 1.43 |
| C-211 (comparative) | A | B | B | 1.22 |
| C-212 (comparative) | A | B | B | 1.32 |
| C-213 (inventive) | A | A | A | 7.35 |
| C-214 (inventive) | A | A | A | 8.22 |
| C-215 (inventive) | A | A | A | 7.42 |
| C-216 (inventive) | A | A | A | 8.51 |

As can be seen in the aforementioned results, the ink compositions of the invention showed improvements in heat fastness and ozone resistance, particularly ozone resistance.

Example 5

To the following components was added ultrapure water having a resistivity of 18 MΩ or more to make 1 l. The mixture was then heated to a temperature of from 30° C. to 40° C. with stirring for 1 hour. Thereafter, the solution was filtered through a microfilter having an average pore diameter of 0.25 µm under reduced pressure to prepare a yellow ink (Y-301), the unit of mixing proportion is the concentration after the preparation of the ink.

(Formulation of Yellow Ink (Y-301))

| | Mixing proportion |
|---|---|
| (Solid content) | |
| Yellow dye (YD-1) | 45 g/l |
| Proxel | 5 g/l |
| Urea | 10 g/l |
| (Liquid component) | |
| Triethylene glycol manobutyl ether (TGB) | 100 g/l |
| Glycerin (GR) | 115 g/l |
| Diethylene glycol (DEG) | 70 g/l |
| 2-Pyrrolidone | 35 g/l |
| Triethanolamine (TEA) | 8 g/l |
| Surfynol STG (SW) | 10 g/l |

Ink compositions Y-302 to Y-308 were prepared in the same manner as Y-301 except that additives were further added as set forth in Table 7 below in an amount of 10 g/l as calculated in terms of concentration after the preparation of ink. The capability of these additives of accelerating the association of the dye (ε0/ε1) was determined according to the aforementioned definition.

TABLE 7

| Experimental level | Additives | Molecular weight of additives (Mw) | ε0/ε1 |
|---|---|---|---|
| Y-301 (comparative) | None | | |
| Y-302 (comparative) | PEG-1 added to Y-301 in an amount of 10 g/l | 20,000 | 1.10 |
| Y-303 (comparative) | PEG-2 added to Y-301 in an amount of 10 g/l | 30,000 | 1.09 |
| Y-304 (comparative) | PA-1 added to Y-301 in an amount of 10 g/l | 20,000 | 1.08 |
| Y-305 (inventive) | JS-1 added to Y-301 in an amount of 10 g/l | 17,000 | 1.22 |
| Y-306 (inventive) | JS-4 added to Y-301 in an amount of 10 g/l | 22,000 | 1.27 |
| Y-307 (inventive) | JS-10 added to Y-301 in an amount of 10 g/l | 24,000 | 1.23 |
| Y-308 (inventive) | JS-18 added to Y-301 in an amount of 10 g/l | 29,000 | 1.25 |

PEG:1 Polyethylene glycol (weight-average molecular weight: 2,000,000)
PEG-2: Polyethylene glycol (weight-average molecular weight: 1,000)
PA-1: Polystyrene/divinylbenzene latex (10 g/l as calculated in terms of solid content; Tg: >140° C.)

The ink composition Y-301 to Y-308 were each then received in the yellow ink cartridge of a Type CL-760 inkjet printer (produced by SEIKO EPSON CORPORATION). As other color inks there were used CL-760 inks. With these inks, a monochromatic yellow image was then printed. As the image-receiving sheet on which the image is printed there was used "Gasai", which is an inkjet paper photographic quality output medium produced by Fuji Photo Film Co., Ltd. The image thus printed was then evaluated for image fastness.

Ink compositions Y-309 to Y-316 were prepared in the same manner as Y-301 to Y-308, respectively, except that the dye of ink was changed from YD-1 to YD-2. These ink compositions were evaluated for image fastness in the same manner as mentioned above.

<Experimental Method for Evaluation of Image Fastness>

For the evaluation of image stomp properties, a stepwise monochromatic yellow print sample having a stepwise gradation of density was prepared. The sample was then evaluated for various properties in the same manner as in Example 1. The reciprocal of the ozone degradation rate ratio (T2/T1), i.e., TIM required until the percent dye remaining reaches 80% of that of Y-301 (comparative) was defined as relative value 1.

The results are set forth in Table 8.

TABLE 8

| | Light-fastness | Heat fastness | Ozone gas resistance | T1/T2 |
|---|---|---|---|---|
| Authentic ink (CL-760) produced by SEIKO EPSON CORPORATION | C | B | C | — |
| Y-301 (comparative) | C | B | C | 1 |
| Y-302 (comparative) | C | B | C | 1.22 |
| Y-303 (comparative) | C | B | C | 1.32 |
| Y-304 (comparative) | C | B | C | 1.22 |
| Y-305 (inventive) | C | A | A | 12.5 |
| Y-306 (inventive) | C | A | A | 16.3 |
| Y-307 (inventive) | C | A | A | 15.2 |
| Y-308 (inventive) | C | A | A | 14.2 |
| Y-309 (comparative) | B | B | B | 1 |
| Y-310 (comparative) | B | B | B | 1.43 |
| Y-311 (comparative) | B | B | B | 1.25 |
| Y-312 (comparative) | B | B | B | 1.33 |
| Y-313 (inventive) | A | A | A | 8.25 |
| Y-314 (inventive) | A | A | A | 7.44 |
| Y-315 (inventive) | A | A | A | 8.22 |
| Y-316 (inventive) | A | A | A | 7.53 |

As can be seen in the aforementioned results, the ink compositions Y-305 to Y-308 of the invention showed improvements in heat fastness and ozone resistance, particularly ozone resistance. The ink compositions Y-313 to Y-316 of the invention, which each comprise dyes different from that of Y-305 to Y-308, showed improvements in light-fastness in addition to heat fastness and ozone resistance.

Example 6

To the following components was added ultrapure water having a resistivity of 1 MΩ or more to make 1 l. The mixture was then heated to a temperature of from 30° C. to 40° C. with stirring for 1 hour. Thereafter, the solution was filtered through a microfilter having an average pore diameter of 0.25 μm under reduced pressure to prepare a black ink (Bk-401). The unit of mixing proportion is the concentration after the preparation of the ink.

(Formulation of Black Ink (Bk-401))

| (Solid content) | Mixing proportion |
|---|---|
| Black dye (L: long wavelength side)(BD-1) | 75 g/l |
| Black dye (S: short wavelength side)(BD-2) | 30 g/l |
| Proxel | 5 g/l |
| Urea | 10 g/l |
| Benzotriazole | 3 g/l |
| (Liquid component) | |
| Diethylene glycol monobutyl ether (DGB) | 120 g/l |
| Glycerin (GR) | 135 g/l |
| Diethylene glycol (DEG) | 100 g/l |
| 2-Pyrrolidone | 35 g/l |
| Triethanolamine (TEA) | 8 g/l |
| Surfynol STG (SW) | 10 g/l |

Ink compositions Bk-402 to Bk-408 were prepared in the same manner as Bk-401 except that additives were further added as set forth in Table 9 below in an amount of 10 g/l as calculated in terms concentration after the preparation of ink.

The capability of these additives of accelerating the association of the dye (ϵ0/ϵ1) was determined according to the aforementioned definition.

TABLE 9

| Experimental level | Additives | Molecular weight of additives (Mw) | ϵ0/ϵ1 |
|---|---|---|---|
| Bk-401 (comparative) | None | | |
| Bk-402 (comparative) | PEG-1 added to Bk-401 in an amount of 10 g/l | 20,000 | 1.15 |
| Bk-403 (comparative) | PEG-2 added to Bk-401 in an amount of 10 g/l | 30,000 | 1.12 |
| Bk-404 (comparative) | PA-1 added to Bk-401 in an amount of 10 g/l | 20,000 | 1.13 |
| Bk-405 (inventive) | JS-2 added to Bk-401 in an amount of 10 g/l | 16,000 | 1.31 |
| Bk-406 (inventive) | JS-7 added to Bk-401 in an amount of 10 g/l | 27,000 | 1.33 |
| Bk-407 (inventive) | JS-9 added to Bk-401 in an amount of 10 g/l | 30,000 | 1.30 |
| Bk-408 (inventive) | JS-16 added to Bk-401 in an amount of 10 g/l | 15,000 | 1.29 |

The ink compositions Bk-401 to Bk-409 were each then received in the black ink cartridge of a Type CL-760 inkjet printer (produced by SEIKO EPSON CORPORATION). As other color inn there were used CL-760 inks. With these inks, a monochromatic gray image was then printed. As the image-receiving sheet on which the image is printed there was used "Gasai", which is an inkjet paper photographic quality output medium produced by Fuji Photo Film Co., Ltd. The image thus printed was then evaluated for image fastness.

<Experimental Method for Evaluation of Image Fastness>

For the evaluation of image storage properties, a stepwise monochromatic gray print sample having a stepwise gradation of density was prepared. The sample was then evaluated for various properties in the same manner as in Example 4. The reciprocal of the ozone degradation rate ratio (T2/T1), i.e., T1/T2 required until the percent dye remaining reaches 80% of that of BK-401 (comparative) was defined as relative value 1.

The results are set forth in Table 10.

TABLE 10

| | Light-fastness | Heat fastness | Ozone gas resistance | T1/T2 |
|---|---|---|---|---|
| Authentic ink (CL-760) produced by SEIKO EPSON CORPORATION | B | B | D | — |
| Bk-401 (comparative) | B | B | B | 1 |
| Bk-402 (comparative) | B | B | B | 1.33 |
| Bk-403 (comparative) | B | B | B | 1.27 |
| Bk-404 (comparative) | B | B | B | 1.34 |
| Bk-405 (inventive) | A | A | A | 6.51 |
| Bk-406 (inventive) | A | A | A | 6.77 |
| Bk-407 (inventive) | A | A | A | 6.53 |
| Bk-408 (inventive) | A | A | A | 6.44 |

As can be seen in the aforementioned results, the ink compositions of the invention showed improvements in light-fastness, heat fastness and ozone resistance also in the present example.

The entire disclosure of each and every foreign patent application from which the benefit of foreign priority has been claimed in the present application is incorporated herein by reference, as if rally set forth herein.

While the invention has been described in detail and with reference to specific embodiments thereof, it will be apparent to one skilled in the art that various changes and modifications can be made then in without departing from the spirit and scope thereof.

What is claimed is:

1. An ink composition comprising:

a dye; and a polymer containing an aminic nitrogen atom, the polymer having a weight-average molecular weight of 3,000 to 10,000,000, wherein the polymer is a homopolymer of an amine monomer selected from the group consisting of

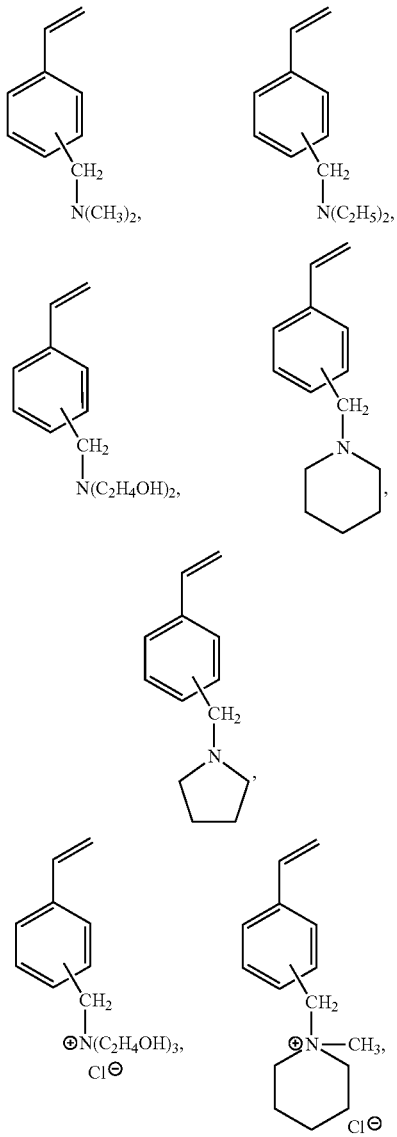

-continued

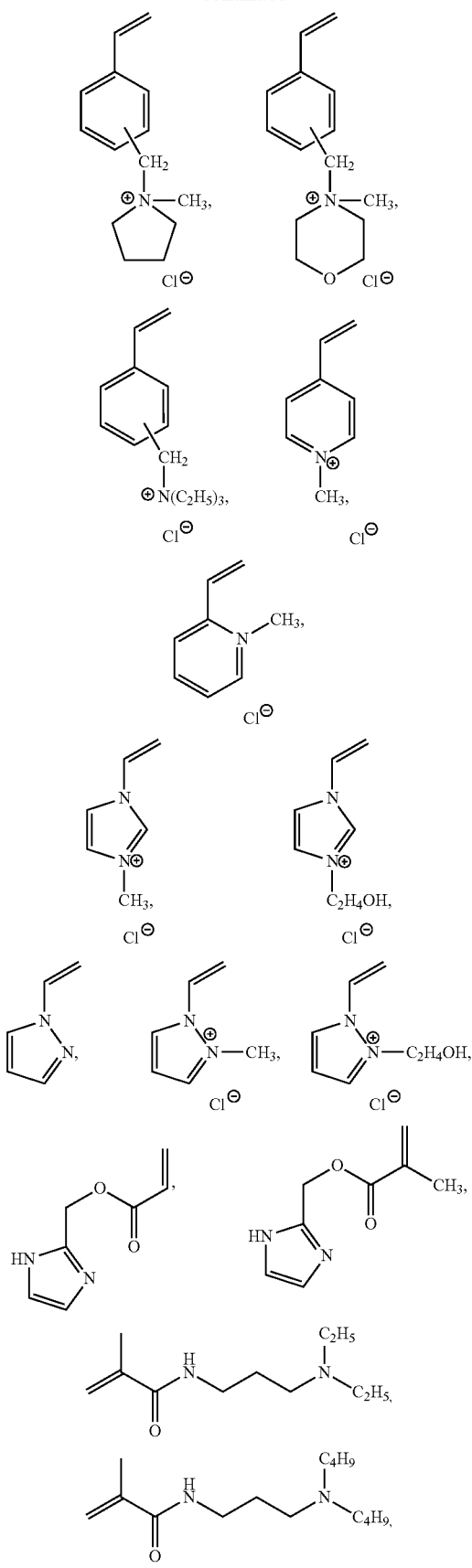

-continued

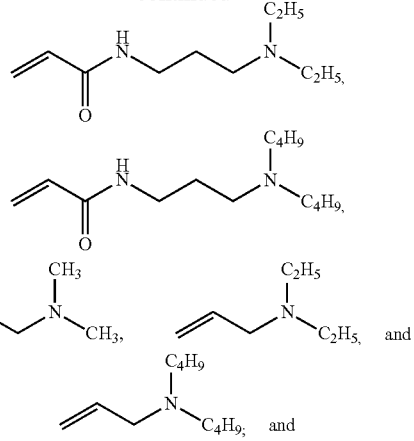

wherein an image printed with the ink composition has an ozone degradation rate of 1/5 or less of that of an image printed with an ink composition free of the polymer.

2. The ink composition according to claim 1, wherein the polymer is obtained by a polymer dispersion.

3. The ink composition according to claim 1, wherein the polymer is a water-soluble polymer.

4. The ink composition according to claim 1, wherein the dye comprises a dye having at least two aromatic heterocyclic groups.

5. The ink composition according to claim 1, wherein the dye comprises a dye having an oxidation potential of nobler than 1.0 V versus SCE.

6. An inkjet recording ink comprising an ink composition according to claim 1.

7. An ink set comprising an ink composition according to claim 1.

8. An ink cartridge comprising an ink composition according to claim 1.

9. The ink cartridge according to claim 8, which is for inkjet recording.

10. The ink cartridge according to claim 9, which comprise an ink loading chamber having a pressure before printing lower than an atmospheric pressure.

11. The ink cartridge according to claim 9, which comprises a sponge.

12. The ink cartridge according to claim 11, wherein the sponge comprises a urethane polymer.

13. The ink composition according to claim 1, wherein the polymer has the following chemical structure:

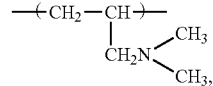
JS-3

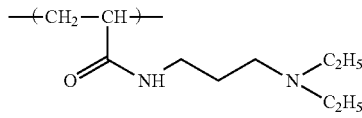
JS-10

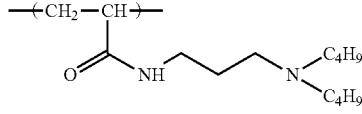
JS-11

-continued
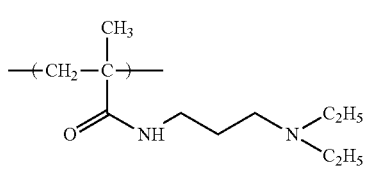
JS-12
14. An ink composition comprising:
a dye; and
a polymer containing an aminic nitrogen atom, the polymer having a weight-average molecular weight of 3,000 to 10,000,000, wherein the polymer is a homopolymer or a copolymer of at least one amine monomer selected from the group consisting of
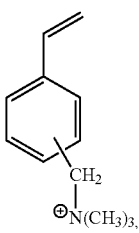
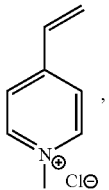
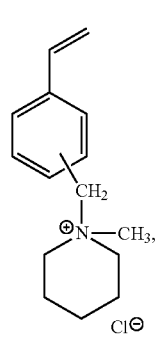 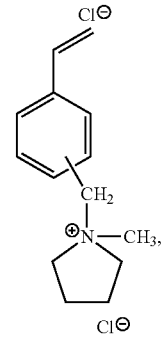 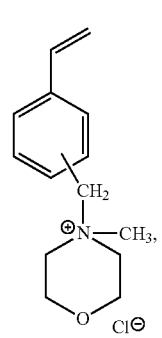
-continued
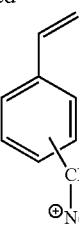
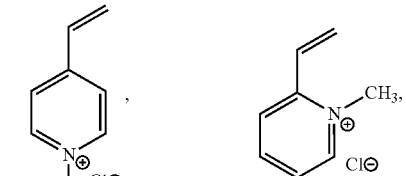
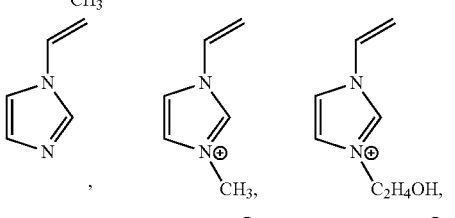
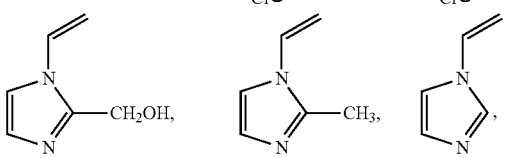
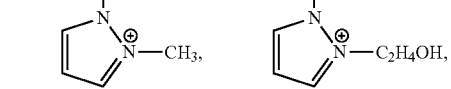
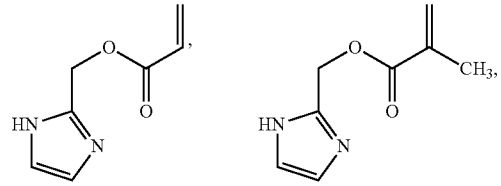
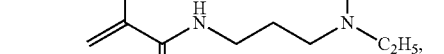
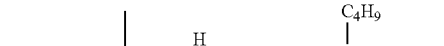
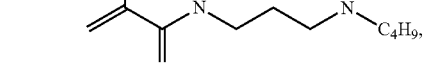

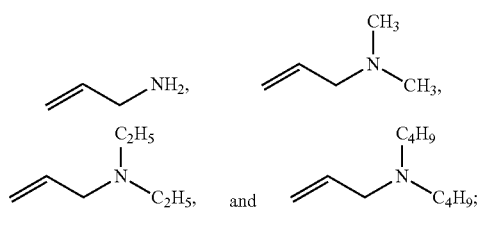
wherein the polymer has the following chemical structure:
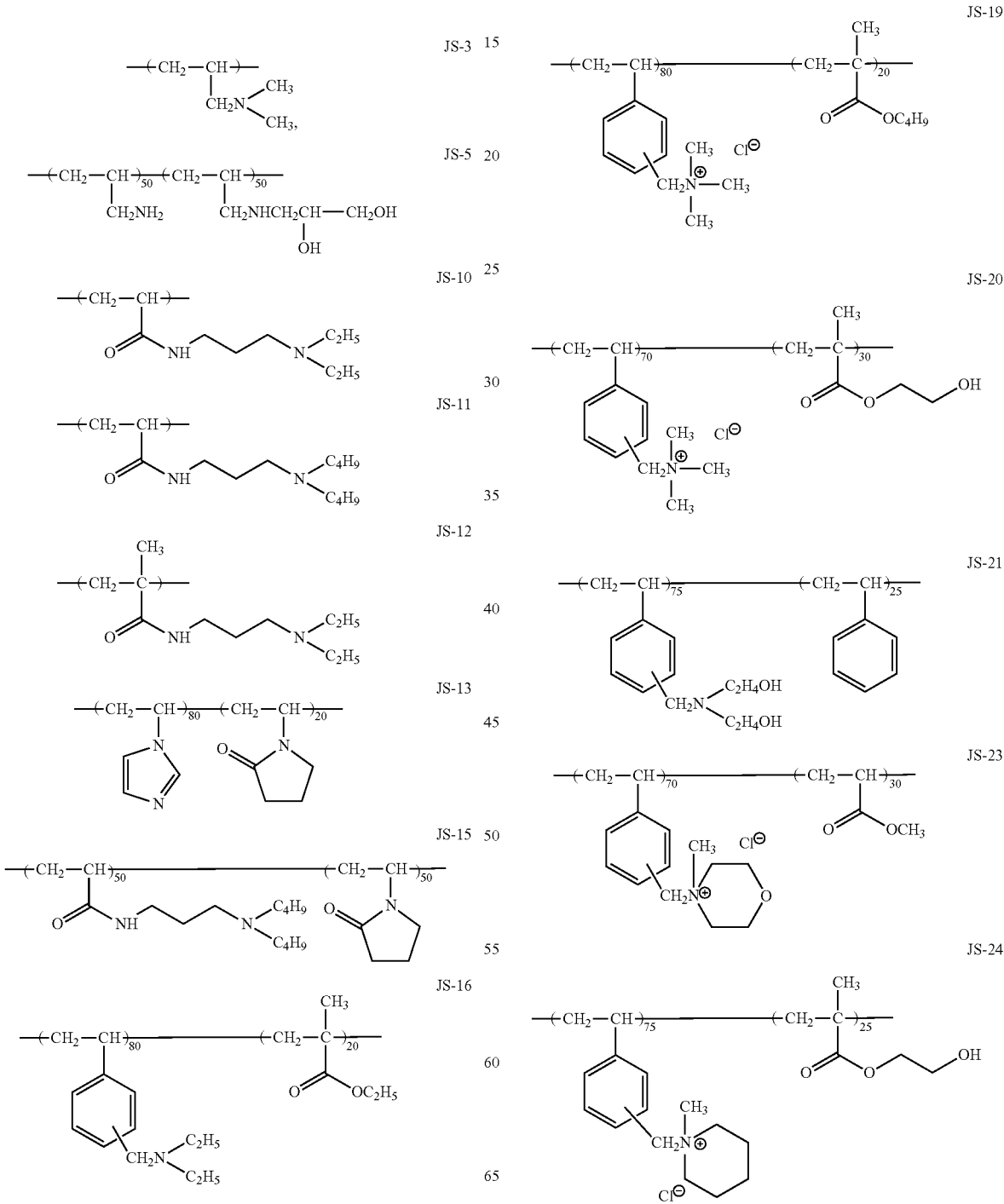

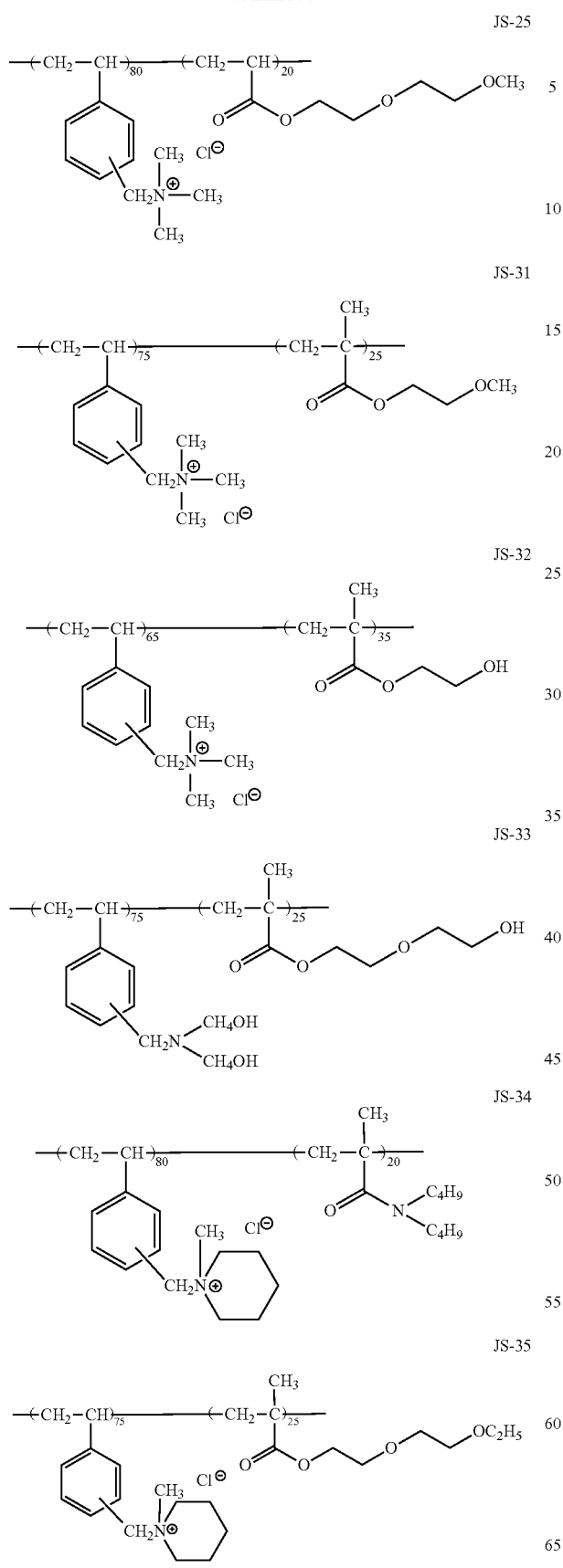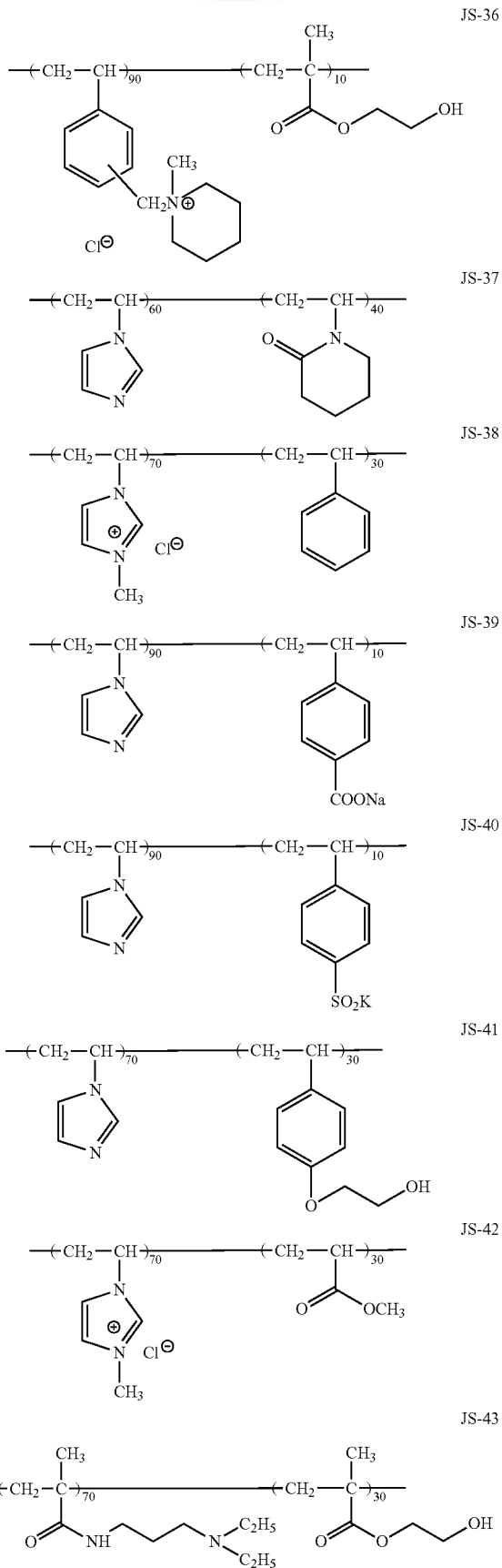

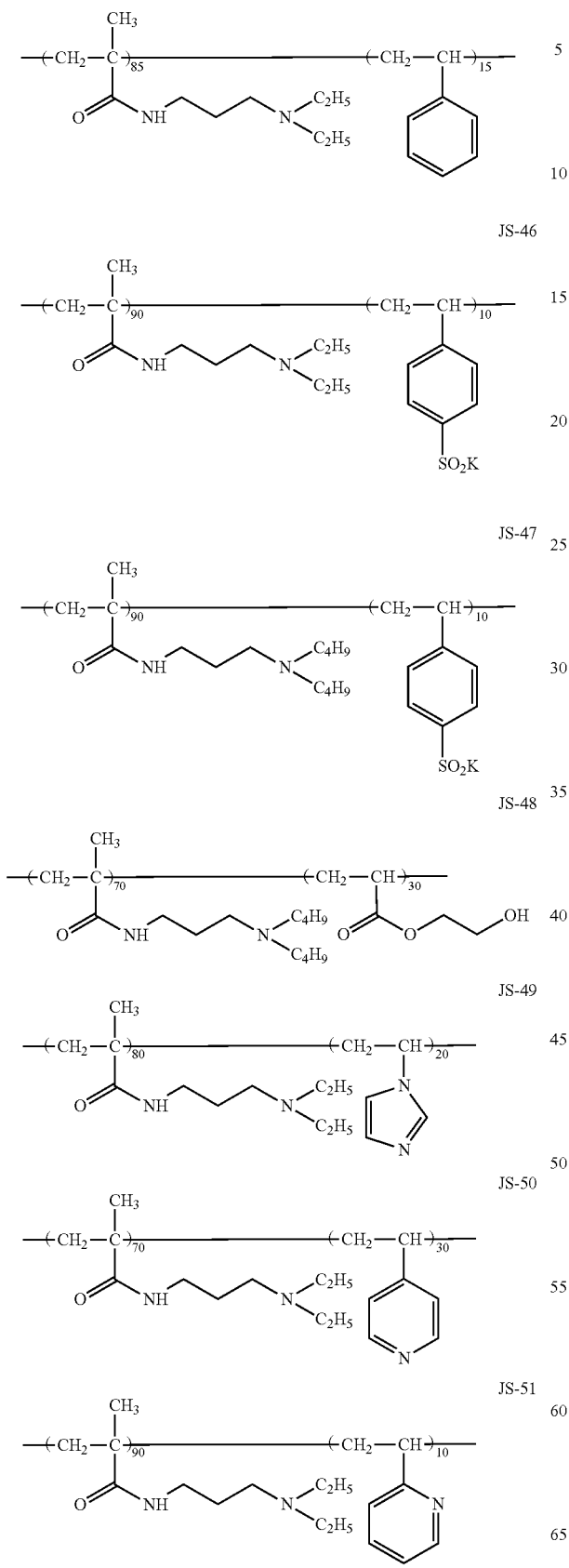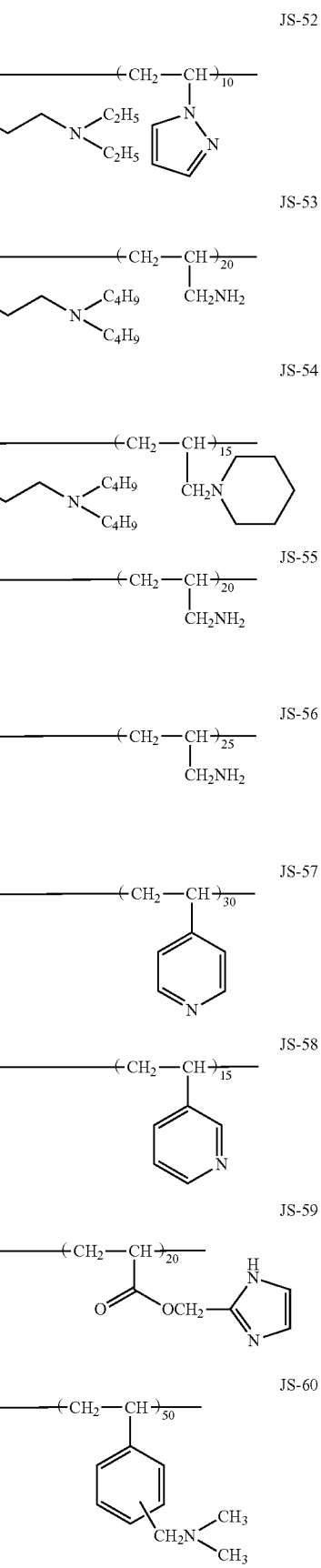

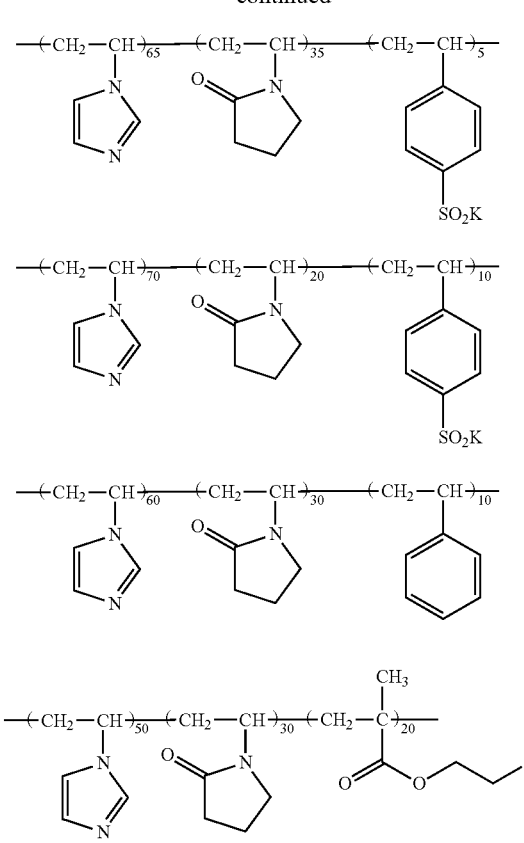
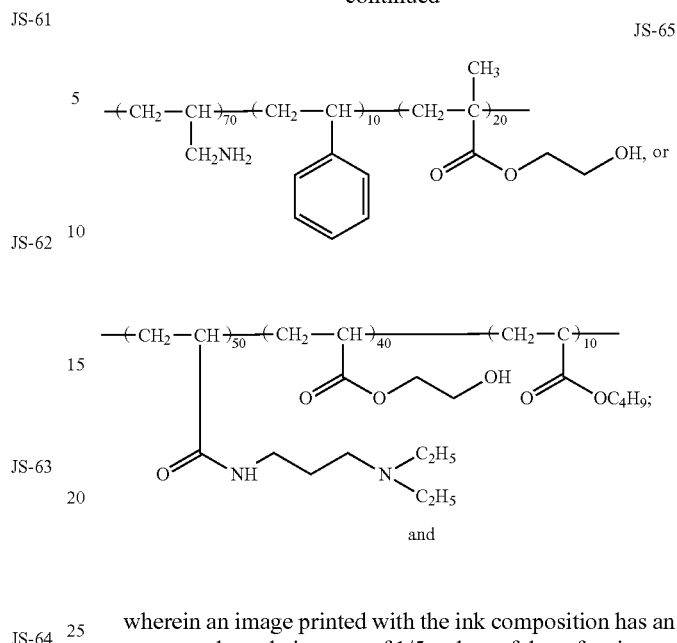
wherein an image printed with the ink composition has an ozone degradation rate of 1/5 or less of that of an image printed with an ink composition free of the polymer.
15. The ink composition according to claim 14, wherein the dye comprises a dye having at least two aromatic heterocyclic groups.
* * * * *